US006362852B2

(12) United States Patent
Ito

(10) Patent No.: US 6,362,852 B2
(45) Date of Patent: *Mar. 26, 2002

(54) FOCUS CONTROL APPARATUS AND METHOD FOR USE WITH A VIDEO CAMERA OR THE LIKE

(75) Inventor: Yujiro Ito, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,209

(22) PCT Filed: Jan. 10, 1997

(86) PCT No.: PCT/JP97/00034

§ 371 Date: Dec. 22, 1997

§ 102(e) Date: Dec. 22, 1997

(87) PCT Pub. No.: WO97/25812

PCT Pub. Date: Jul. 17, 1997

(30) Foreign Application Priority Data

Jan. 11, 1996 (JP) ............................................. 8-003311

(51) Int. Cl.[7] ................................................ H04N 5/232
(52) U.S. Cl. ........................ 348/345; 348/349; 348/351; 348/354
(58) Field of Search ................................ 348/326, 345, 348/346, 347, 348, 349, 351, 352, 354, 355, 356; 250/201.2, 201.3, 201.8; 396/121, 125

(56) References Cited

U.S. PATENT DOCUMENTS

| 4,853,788 | A | * | 8/1989 | Murashima et al. ........ 348/355 |
| 4,922,346 | A | * | 5/1990 | Hidaka et al. ............... 348/355 |
| 4,928,170 | A | * | 5/1990 | Soloveychik et al. ....... 348/345 |
| 5,083,150 | A | * | 1/1992 | Nagasaki et al. .............. 396/49 |
| 5,115,262 | A | * | 5/1992 | Komiya ........................ 348/352 |
| 5,212,557 | A | * | 5/1993 | Ueda ........................... 348/356 |
| 5,235,375 | A | * | 8/1993 | Yamana et al. ............. 396/101 |
| 5,249,058 | A | * | 9/1993 | Murata et al. .............. 348/354 |
| 5,319,462 | A | * | 6/1994 | Haruki et al. ................ 348/347 |
| 5,428,391 | A | * | 6/1995 | Murata et al. .............. 348/241 |
| 5,432,552 | A | * | 7/1995 | Takuma et al. ............. 348/354 |

(List continued on next page.)

FOREIGN PATENT DOCUMENTS

| EP | 0 437 629 A1 | 7/1991 |
| JP | 62-203485 | 9/1987 |
| JP | 3-70273 | 3/1991 |
| JP | 4-330411 | 11/1992 |
| JP | 4-333010 | 11/1992 |
| WO | WO 91/02428 | 2/1991 |

Primary Examiner—Wendy R. Garber
Assistant Examiner—Mitchell White
(74) Attorney, Agent, or Firm—Frommer Lawrence & Haug LLP; William S. Frommer; Dennis M. Smid

(57) ABSTRACT

A focus control technique for use in a video camera or the like. An image of an object passes through a focus lens and an electric signal corresponding thereto is formed. High frequency components are extracted from the electric signals to generate estimation values indicative of focus states. A plurality of estimation values that are changed as the focus lens moves are stored in a storage device. A plurality of the stored estimation values are selected and along with the lens positions corresponding to the selected estimation values are used to calculate the just focus position. As a result, even if the estimation value includes noise or the estimation value constantly includes noise when the luminance is low, focus control may be performed with high accuracy. Furthermore, even if the focus lens is passed by the just focus position only once, it is possible to calculate the just focus position. Therefore, the just focus position may be determined at a high speed.

38 Claims, 24 Drawing Sheets

U.S. PATENT DOCUMENTS

| | | | |
|---|---|---|---|
| 5,475,429 A | * 12/1995 | Kodama | 348/355 |
| 5,565,917 A | * 10/1996 | Takeda | 348/354 |
| 5,566,380 A | * 10/1996 | Honma | 396/125 |
| 5,604,537 A | * 2/1997 | Yamazaki et al. | 348/346 |
| 5,619,264 A | * 4/1997 | Yoshimura et al. | 348/352 |
| 5,629,735 A | * 5/1997 | Kaneda et al. | 348/345 |
| 5,666,562 A | * 9/1997 | Kaneda et al. | 396/125 |
| 5,715,483 A | * 2/1998 | Omata et al. | 396/127 |
| 5,757,429 A | * 5/1998 | Haruki | 348/354 |
| 5,933,187 A | * 8/1999 | Hirasawa et al. | 348/347 |
| 6,067,115 A | * 5/2000 | Suda | 348/350 |
| 6,222,588 B1 | * 4/2001 | Yamazaki et al. | 348/355 |

* cited by examiner

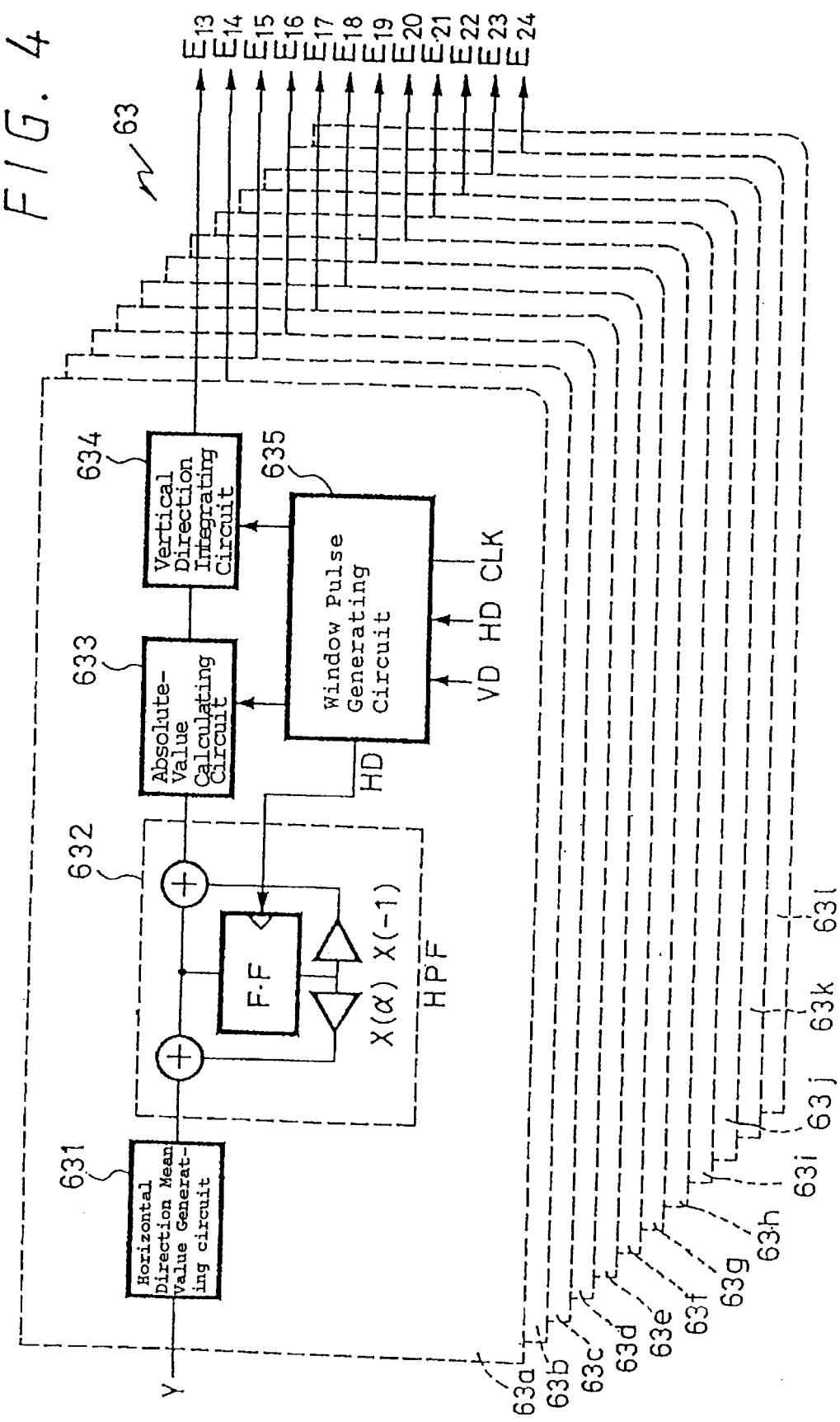

FIG. 5A

| | α | H × V |
|---|---|---|
| First Horizontal Direction Estimation Value Generating Ckt | 0.5 | 192 × 60 |
| Second Horizontal Direction Estimation Value Generating Ckt | 0.5 | 132 × 60 |
| Third Horizontal Direction Estimation Value Generating Ckt | 0.5 | 384 × 120 |
| Fourth Horizontal Direction Estimation Value Generating Ckt | 0.5 | 264 × 120 |
| Fifth Horizontal Direction Estimation Value Generating Ckt | 0.5 | 768 × 240 |
| Sixth Horizontal Direction Estimation Value Generating Ckt | 0.5 | 548 × 240 |
| Seventh Horizontal Direction Estimation Value Generating Ckt | 0.92 | 192 × 60 |
| Eighth Horizontal Direction Estimation Value Generating Ckt | 0.92 | 132 × 60 |
| Ninth Horizontal Direction Estimation Value Generating Ckt | 0.92 | 384 × 120 |
| Tenth Horizontal Direction Estimation Value Generating Ckt | 0.92 | 264 × 120 |
| Eleventh Horizontal Direction Estimation Value Generating Ckt | 0.92 | 768 × 240 |
| Twelfth Horizontal Direction Estimation Value Generating Ckt | 0.92 | 548 × 240 |

FIG. 5B

| | α | H × V |
|---|---|---|
| First Vertical Direction Estimation Value Generating Ckt | 0.5 | 120 × 80 |
| Second Vertical Direction Estimation Value Generating Ckt | 0.5 | 120 × 60 |
| Third Vertical Direction Estimation Value Generating Ckt | 0.5 | 240 × 160 |
| Fourth Vertical Direction Estimation Value Generating Ckt | 0.5 | 240 × 120 |
| Fifth Vertical Direction Estimation Value Generating Ckt | 0.5 | 480 × 320 |
| Sixth Vertical Direction Estimation Value Generating Ckt | 0.5 | 480 × 240 |
| Seventh Vertical Direction Estimation Value Generating Ckt | 0.92 | 120 × 80 |
| Eighth Vertical Direction Estimation Value Generating Ckt | 0.92 | 120 × 60 |
| Ninth Vertical Direction Estimation Value Generating Ckt | 0.92 | 240 × 160 |
| Tenth Vertical Direction Estimation Value Generating Ckt | 0.92 | 240 × 120 |
| Eleventh Vertical Direction Estimation Value Generating Ckt | 0.92 | 480 × 320 |
| Twelfth Vertical Direction Estimation Value Generating Ckt | 0.92 | 480 × 240 |

FIG. 7

| Estimation Value $E_i$ | Weight Data $W_i$ |
|---|---|
| $E_1$ | 20 |
| $E_2$ | 15 |
| $E_3$ | 10 |
| $E_4$ | 10 |
| $E_5$ | 8 |
| $E_6$ | 8 |
| $E_7$ | 15 |
| $E_8$ | 12 |
| $E_9$ | 8 |
| $E_{10}$ | 8 |
| $E_{11}$ | 6 |
| $E_{12}$ | 6 |
| $E_{13}$ | 5 |
| $E_{14}$ | 5 |
| $E_{15}$ | 3 |
| $E_{16}$ | 3 |
| $E_{17}$ | 2 |
| $E_{18}$ | 2 |
| $E_{19}$ | 4 |
| $E_{20}$ | 4 |
| $E_{21}$ | 2 |
| $E_{22}$ | 2 |
| $E_{23}$ | 1 |
| $E_{24}$ | 1 |

F I G. 17
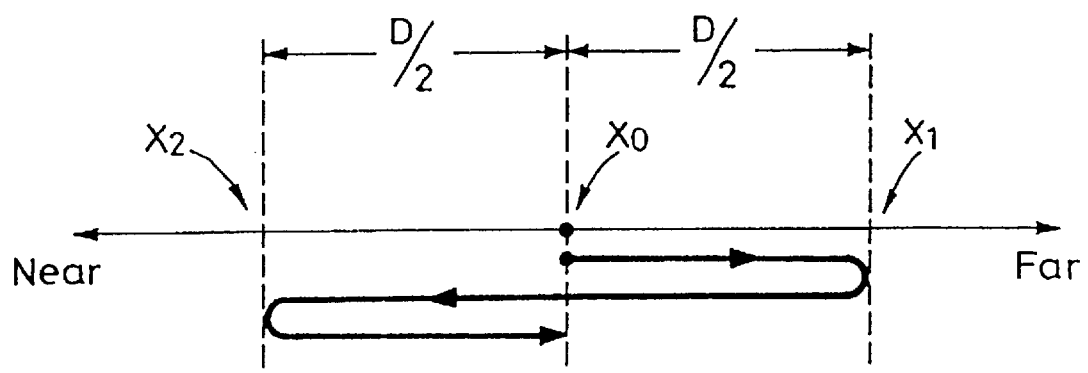

| | $X_0$ | ... | $X_{k-3}$ | U/D | $X_{k-2}$ | U/D | $X_{k-1}$ | U/D | $X_k$ | U/D | $X_{k+1}$ | U/D | $X_{k+2}$ |
|---|---|---|---|---|---|---|---|---|---|---|---|---|---|
| $E_1$ | $E_1(X_0)$ | --- | $E_1(X_{k-3})$ | ↗ | $E_1(X_{k-2})$ | ↖ | $E_1(X_{k-1})$ | ↖ | $E_1(X_k)$ | ↖ | $E_1(X_{k+1})$ | ↗ | $E_1(X_{k+2})$ |
| $E_2$ | $E_2(X_0)$ | --- | $E_2(X_{k-3})$ | ↖ | $E_2(X_{k-2})$ | ↗ | $E_2(X_{k-1})$ | ↗ | $E_2(X_k)$ | ↖ | $E_2(X_{k+1})$ | ↗ | $E_2(X_{k+2})$ |
| $E_3$ | $E_3(X_0)$ | --- | $E_3(X_{k-3})$ | ↖ | $E_3(X_{k-2})$ | ↖ | $E_3(X_{k-1})$ | ↑ | $E_3(X_k)$ | ↑ | $E_3(X_{k+1})$ | ↗ | $E_3(X_{k+2})$ |
| $E_4$ | $E_4(X_0)$ | --- | $E_4(X_{k-3})$ | ↗ | $E_4(X_{k-2})$ | ↗ | $E_4(X_{k-1})$ | ↑ | $E_4(X_k)$ | ↗ | $E_4(X_{k+1})$ | ↗ | $E_4(X_{k+2})$ |
| $E_5$ | $E_5(X_0)$ | --- | $E_5(X_{k-3})$ | ↑ | $E_5(X_{k-2})$ | ↑ | $E_5(X_{k-1})$ | ↑ | $E_5(X_k)$ | ↖ | $E_5(X_{k+1})$ | ↗ | $E_5(X_{k+2})$ |
| $E_6$ | $E_6(X_0)$ | --- | $E_6(X_{k-3})$ | ↖ | $E_6(X_{k-2})$ | ↖ | $E_6(X_{k-1})$ | ↑ | $E_6(X_k)$ | ↗ | $E_6(X_{k+1})$ | ↗ | $E_6(X_{k+2})$ |
| $E_7$ | $E_7(X_0)$ | --- | $E_7(X_{k-3})$ | ↑ | $E_7(X_{k-2})$ | ↑ | $E_7(X_{k-1})$ | ↑ | $E_7(X_k)$ | ↗ | $E_7(X_{k+1})$ | ↑ | $E_7(X_{k+2})$ |
| $E_8$ | $E_8(X_0)$ | --- | $E_8(X_{k-3})$ | ↖ | $E_8(X_{k-2})$ | ↖ | $E_8(X_{k-1})$ | ↖ | $E_8(X_k)$ | ↖ | $E_8(X_{k+1})$ | ↗ | $E_8(X_{k+2})$ |
| $E_9$ | $E_9(X_0)$ | --- | $E_9(X_{k-3})$ | ↗ | $E_9(X_{k-2})$ | ↗ | $E_9(X_{k-1})$ | ↗ | $E_9(X_k)$ | ↖ | $E_9(X_{k+1})$ | ↑ | $E_9(X_{k+2})$ |
| $E_{10}$ | $E_{10}(X_0)$ | --- | $E_{10}(X_{k-3})$ | ↖ | $E_{10}(X_{k-2})$ | ↖ | $E_{10}(X_{k-1})$ | ↖ | $E_{10}(X_k)$ | ↗ | $E_{10}(X_{k+1})$ | ↗ | $E_{10}(X_{k+2})$ |
| $E_{11}$ | $E_{11}(X_0)$ | --- | $E_{11}(X_{k-3})$ | ↗ | $E_{11}(X_{k-2})$ | ↗ | $E_{11}(X_{k-1})$ | ↑ | $E_{11}(X_k)$ | ↗ | $E_{11}(X_{k+1})$ | ↗ | $E_{11}(X_{k+2})$ |
| $E_{12}$ | $E_{12}(X_0)$ | --- | $E_{12}(X_{k-3})$ | ↑ | $E_{12}(X_{k-2})$ | ↑ | $E_{12}(X_{k-1})$ | ↑ | $E_{12}(X_k)$ | ↖ | $E_{12}(X_{k+1})$ | ↗ | $E_{12}(X_{k+2})$ |
| $E_{13}$ | $E_{13}(X_0)$ | --- | $E_{13}(X_{k-3})$ | ↗ | $E_{13}(X_{k-2})$ | ↗ | $E_{13}(X_{k-1})$ | ↗ | $E_{13}(X_k)$ | ↗ | $E_{13}(X_{k+1})$ | ↗ | $E_{13}(X_{k+2})$ |
| $E_{14}$ | $E_{14}(X_0)$ | --- | $E_{14}(X_{k-3})$ | ↗ | $E_{14}(X_{k-2})$ | ↗ | $E_{14}(X_{k-1})$ | ↖ | $E_{14}(X_k)$ | ↖ | $E_{14}(X_{k+1})$ | ↖ | $E_{14}(X_{k+2})$ |
| $E_{15}$ | $E_{15}(X_0)$ | --- | $E_{15}(X_{k-3})$ | ↖ | $E_{15}(X_{k-2})$ | ↑ | $E_{15}(X_{k-1})$ | ↑ | $E_{15}(X_k)$ | ↗ | $E_{15}(X_{k+1})$ | ↗ | $E_{15}(X_{k+2})$ |
| $E_{16}$ | $E_{16}(X_0)$ | --- | $E_{16}(X_{k-3})$ | ↖ | $E_{16}(X_{k-2})$ | ↑ | $E_{16}(X_{k-1})$ | ↑ | $E_{16}(X_k)$ | ↗ | $E_{16}(X_{k+1})$ | ↗ | $E_{16}(X_{k+2})$ |
| $E_{17}$ | $E_{17}(X_0)$ | --- | $E_{17}(X_{k-3})$ | ↑ | $E_{17}(X_{k-2})$ | ↑ | $E_{17}(X_{k-1})$ | ↑ | $E_{17}(X_k)$ | ↑ | $E_{17}(X_{k+1})$ | ↖ | $E_{17}(X_{k+2})$ |
| $E_{18}$ | $E_{18}(X_0)$ | --- | $E_{18}(X_{k-3})$ | ↗ | $E_{18}(X_{k-2})$ | ↗ | $E_{18}(X_{k-1})$ | ↗ | $E_{18}(X_k)$ | ↖ | $E_{18}(X_{k+1})$ | ↗ | $E_{18}(X_{k+2})$ |
| $E_{19}$ | $E_{19}(X_0)$ | --- | $E_{19}(X_{k-3})$ | ↗ | $E_{19}(X_{k-2})$ | ↗ | $E_{19}(X_{k-1})$ | ↗ | $E_{19}(X_k)$ | ↗ | $E_{19}(X_{k+1})$ | ↗ | $E_{19}(X_{k+2})$ |
| $E_{20}$ | $E_{20}(X_0)$ | --- | $E_{20}(X_{k-3})$ | ↑ | $E_{20}(X_{k-2})$ | ↑ | $E_{20}(X_{k-1})$ | ↑ | $E_{20}(X_k)$ | ↖ | $E_{20}(X_{k+1})$ | ↖ | $E_{20}(X_{k+2})$ |
| $E_{21}$ | $E_{21}(X_0)$ | --- | $E_{21}(X_{k-3})$ | ↗ | $E_{21}(X_{k-2})$ | ↗ | $E_{21}(X_{k-1})$ | ↗ | $E_{21}(X_k)$ | ↗ | $E_{21}(X_{k+1})$ | ↗ | $E_{21}(X_{k+2})$ |
| $E_{22}$ | $E_{22}(X_0)$ | --- | $E_{22}(X_{k-3})$ | ↖ | $E_{22}(X_{k-2})$ | ↗ | $E_{22}(X_{k-1})$ | ↗ | $E_{22}(X_k)$ | ↑ | $E_{22}(X_{k+1})$ | ↖ | $E_{22}(X_{k+2})$ |
| $E_{23}$ | $E_{23}(X_0)$ | --- | $E_{23}(X_{k-3})$ | ↖ | $E_{23}(X_{k-2})$ | ↖ | $E_{23}(X_{k-1})$ | ↖ | $E_{23}(X_k)$ | ↖ | $E_{23}(X_{k+1})$ | ↗ | $E_{23}(X_{k+2})$ |
| $E_{24}$ | $E_{24}(X_0)$ | --- | $E_{24}(X_{k-3})$ | ↗ | $E_{24}(X_{k-2})$ | ↗ | $E_{24}(X_{k-1})$ | ↗ | $E_{24}(X_k)$ | ↗ | $E_{24}(X_{k+1})$ | ↗ | $E_{24}(X_{k+2})$ |

| Line Position | Start Pixel Position | End Pixel Position | Object Identification Number |
|---|---|---|---|
| 161 | 245 | 246 | 1 |
| 162 | 240 | 249 | 1 |
| 163 | 232 | 257 | 1 |
| 164 | 220 | 265 | 1 |
| ⋮ | ⋮ | ⋮ | ⋮ |
| 190 | 219 | 260 | 1 |
| 191 | 221 | 258 | 1 |
| 191 | 318 | 319 | 2 |
| 192 | 224 | 255 | 1 |
| 192 | 315 | 325 | 2 |
| 193 | 228 | 251 | 1 |
| 193 | 312 | 331 | 2 |
| ⋮ | ⋮ | ⋮ | ⋮ |
| 230 | 338 | 348 | 2 |
| 231 | 344 | 345 | 2 |

FIG. 24

| Field Number | Window X-Axis Direction | Window Y-Axis Direction | Window Center Vector ($\Delta X$  $\Delta Y$) |
|---|---|---|---|
| 17 | 312 ~ 362 | 186 ~ 228 | (-47  +87) |
| 18 | 311 ~ 361 | 190 ~ 229 | (-48  +89) |
| 19 | 310 ~ 360 | 191 ~ 230 | (-49  +89) |
| 20 | | | |
| 21 ⋮ | | | |

FOCUS CONTROL APPARATUS AND METHOD FOR USE WITH A VIDEO CAMERA OR THE LIKE

TECHNICAL FIELD

The present invention relates to a focus control apparatus and a focus control method suitable for use in a video camera or the like.

BACKGROUND ART

A consumer video camera has employed an autofocus apparatus for automatically focusing a lens on an object.

It is well known that, in order to discriminate whether or not a lens is in focus or out of focus, it is sufficient to discriminate whether contrast of a video signal obtained by an image pickup is high or low. In other words, if the contrast is high, then the lens is in focus. If on the other hand the contrast is low, then the lens is out of focus. A high-frequency component is extracted from the video signal obtained by an image pickup, and a data obtained by integrating the high-frequency component in a predetermined set area is generated. It is possible to discriminate whether the contrast is high or low, by using the integrated data. The integrated data is indicative of how much there is the high-frequency component in the predetermined area. In general, this data is called an estimation value. Accordingly, it is possible to realize the autofocus method by driving a focus lens so that the estimation value should be maximum (i.e., the contrast should be maximum).

When an object, a background and an image pickup condition are not changed, a noise resulting from an external disturbance is seldom included in the estimation value. However, when a video camera for imaging a moving picture is used, the object, the background and the image pickup condition are changed on a real time base. As a result, the estimation value sometimes includes the noise. Therefore, it is very difficult to detect a precise estimation value from a picture of an object changed on a real time base.

Moreover, if the estimation value includes any noise, when the focus lens is passed by a focus position, the estimation value does not become maximum, and, conversely, when the focus lens is not located on the focus position, the estimation value becomes maximum. This may lead to misjudgment of the focus position.

As a result, in order to detect a lens position where the estimation value is maximum, the focus lens is reciprocated in the vicinity of the focus position where the estimation value should be maximum. Therefore, it takes a considerable time to focus the focus lens.

If luminance is low, the estimation value obtain in this case constantly includes the noise, which makes it difficult to detect the focus position. Therefore, it is impossible to carry out a high-accuracy focus control.

A sampling point used for obtaining the estimation value does not always coincide with the position where the estimation value becomes maximum. Moreover, since the focus lens is reciprocated plural times in the vicinity of this maximum estimation value position, i.e., the focus position to determine the focus position, it takes a considerable time to determine the focus position.

For example, it is sometimes observed that an image picked up by a high-end video camera apparatus for use in a broadcasting station or for professional use is transmitted on the air as a live relay broadcast. If it takes a considerable time to carry out the autofocus operation when such live relay broadcast is carried out, consequently a video signal indicative of a blurred picture is transmitted on air. Therefore, a simplified, inexpensive and small autofocus apparatus such as that used in a consumer video camera is not necessary for the video camera for use in the broadcasting station or for professional use, but a high-accuracy focus control and a high-speed focus control are required therefor.

DISCLOSURE OF THE INVENTION

It is an object of the present invention to provide a focus control apparatus and a focus control method which can control a focus at high speed with high accuracy.

A focus control apparatus according to the present invention is a focus control apparatus having an imaging means for imaging an object through a focus lens to output an electric signal corresponding to the object, including an extracting means for extracting a high-frequency component of the electric signal output from the imaging means, an estimation value generating means for generating an estimation value indicative of a focus state of the object based on the high-frequency component output from the extracting means, a storage means for storing the plurality of estimation values changed as the focus lens is moved in response to a focus lens position in order to obtain a just focus position, a selecting means for selecting a plurality of estimation values to be used for calculation of the just focus position from the estimation values stored in the storage means, and a control means for calculating the just focus position based on the plurality of estimation values selected by the selecting means and lens positions corresponding to the plurality of selected estimation values.

A focus control method according to the present invention is a focus control method of moving a focus lens of a video camera to a just focus position, including a) a step of extracting a high-frequency component of an electric signal output from an imaging means, b) a step of generating an estimation value indicative of a focus state of an object based on the high-frequency component extracted in the step a), c) a step of storing the plurality of estimation values changed as the focus lens is moved in response to a focus lens position, d) a step of selecting a plurality of estimation values to be used for calculation of the just focus position from the estimation values stored in the step c), e) a step of calculating the just focus position based on the plurality of estimation values selected in the step d) and lens positions corresponding to the plurality of selected estimation values, and f) a step of moving the focus lens to the just focus position.

According to the present invention, since the just focus position is calculated based on a plurality of selected estimation values and the lens positions corresponding to the plurality of selected estimation values, even if the estimation value includes a noise or the estimation value constantly includes a noise when the luminance is low, it is possible to carry out the focus control with high accuracy. Even if the focus lens is passed by the just focus position only once, then it is possible to calculate the just focus position. Therefore, it is possible to determine the just focus position at high speed to that extent.

BRIEF DESCRIPTION OF DRAWINGS

FIG. 4 is a diagram showing a specific arrangement of a vertical-direction estimation value generating circuit 63;

FIG. 5 is a table showing a filter coefficient α and a window size set for respective circuits of the horizontal-direction estimation value generating circuit 62 and the vertical-direction estimation value generating 63;

FIG. 7 is a table showing weight data W set for respective estimation values E;

FIG. 17 is a diagram showing a movement of a lens when a lens movement direction is determined in order to focus the lens on an object;

FIG. 20 is a table showing data stored in the RAM 66 during the autofocus operation;

FIG. 23 is a table of information about an object; and

FIG. 24 is a log table of a target object.

BEST MODE FOR CARRYING OUT THE INVENTION

Initially, a focus control method and a video camera employing the above focus control method according to an embodiment of the present invention will hereinafter be described with reference to FIGS. 1 to 24.

Figure 1:
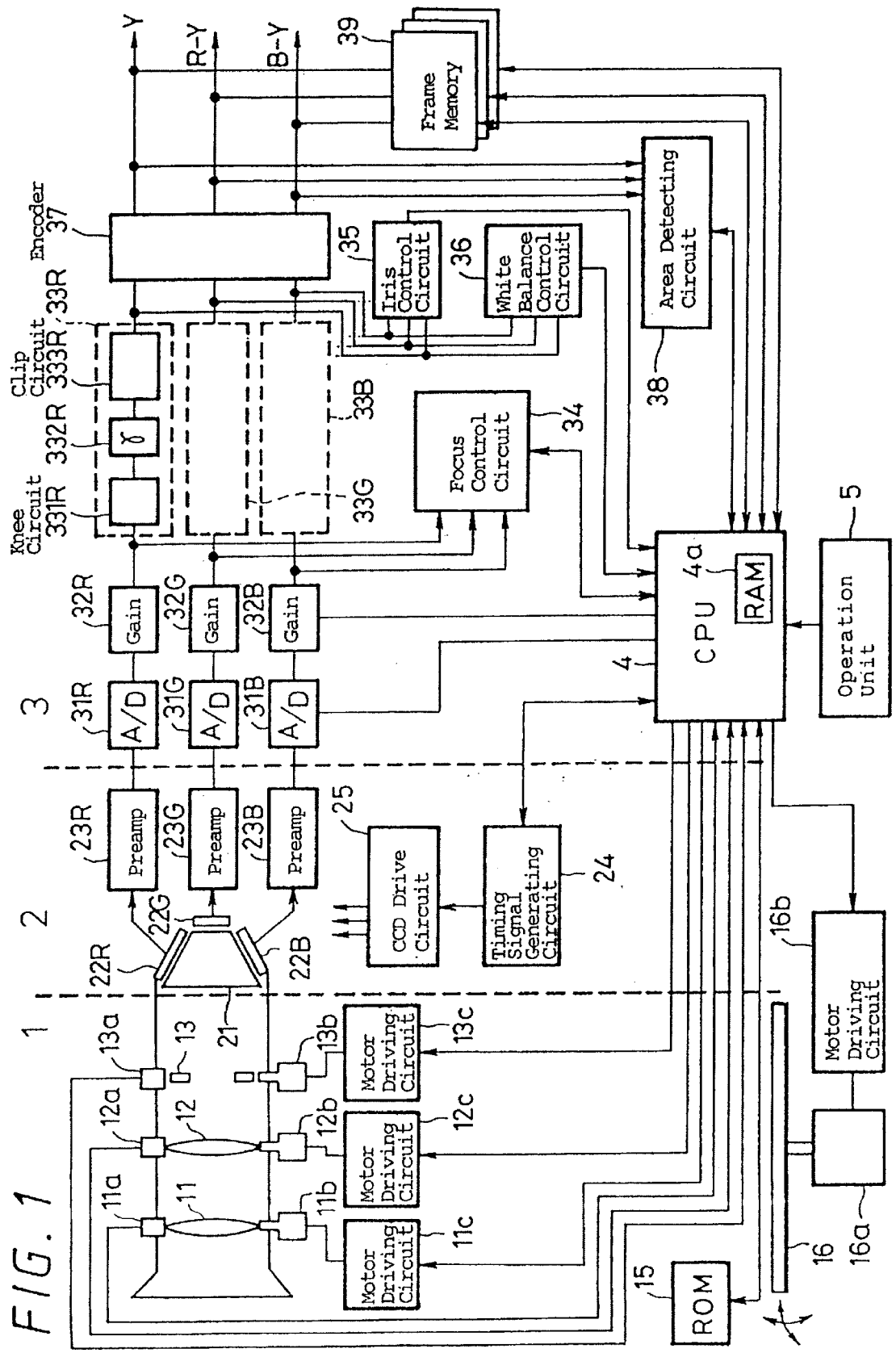
FIG. 1 is a diagram showing an entire arrangement of an imaging apparatus formed of a video camera.

A total arrangement of the video camera apparatus according to the present invention will be described with reference to FIG. 1. The video camera apparatus includes a lens block 1 for optically condensing incident light to the front of an imaging device, an imaging block 2 for converting light incident from the lens block into RGB electric video signals obtained by an image pickup, a signal processing block 3 for subjecting the video signals to a predetermined signal processing, and a CPU 4 for controlling the lens block 1, the imaging block 2, and the signal processing block.

The lens block 1 is detachably provided in a video camera apparatus body. This lens block 1 includes, as optical elements, a zoom lens 11 for, by moving along an optical axis, continuously change a focal length without changing a position of an image point to thereby zoom an image of an object, a focus lens 12 for bringing the object into focus, and an iris mechanism 13 for adjusting an amount of light incident on the front of the imaging device by changing its aperture area.

The lens block 1 further includes a position detecting sensor 11a for detecting an optical-axis direction position of the zooming lens 11, a drive motor 11b for moving the zooming lens 11 in the optical-axis direction, a zoom-lens drive circuit 11c for supplying a drive control signal to the drive motor 11b, a position detecting sensor 12a for detecting an optical-axis direction position of the focus lens 12, a drive motor 12b for moving the focus lens 12 in the optical-axis direction, a focus-lens drive circuit 12c for supplying a drive control signal to the drive motor 12b, a position detecting sensor 13a for detecting an aperture position of the iris mechanism 13, a drive motor 13b for opening and closing the iris mechanism 13, and an iris mechanism drive circuit 13c for supplying a drive control signal to the drive motor 13b.

Detection signals from the position detecting sensors 11a, 12a, 13a are always supplied to the CPU 4. The zooming lens drive circuit 11c, the focus lens drive circuit 12c, and the iris mechanism drive circuit 13c are electrically connected to the CPU 4 so as to be supplied with control signals from the latter.

The lens block 1 has an EEPROM 15 for storing a focal length data of the zoom lens 11 and an aperture ratio data thereof, a focal length data of the focus lens 12 and an aperture ratio thereof, and a manufacturer name of the lens block 1 and a serial number thereof. The EEPROM 15 is connected to the CPU 4 so that the respective data stored therein are read out therefrom based on a read command from the CPU 4.

The imaging block 2 has a color separation prism 21 for color-separating incident light from the lens block 1 into three primary-color lights of red (R), green (G) and blue (B) and imaging devices 22R, 22G and 22B for converting lights of R component, G component and B component, which are obtained by separating light at the color separation prism 21 and are focused on image surfaces thereof, into electric video signals (R), (G), (B) to output the signals. Each of these imaging devices 22R, 22G and 22B is formed of a CCD (Charge Cupled Device), for example.

The imaging block 21 has preamplifiers 23R, 23G, 23B for respectively amplifying levels of the video signals (R), (G), (B) output from the imaging devices 22R, 22G, 22B and for carrying out correlated double sampling for removing a reset noise.

The imaging block 2 further has a timing signal generating circuit 24 for generating a VD signal, an HD signal and a CLK signal each serving as a basic clock used for operation of each of circuits in the video camera apparatus based on a reference clock from a reference clock circuit provided therein, and a CCD drive circuit 25 for supplying a drive clock to the imaging device 22R, the imaging device 22G and the imaging device 22B based on the VD signal, the HD signal and the CLK signal supplied from the timing signal generating circuit. The VD signal is a clock signal representing one vertical period. The HD signal is a clock signal representing one horizontal period. The CLK signal is a clock signal representing one pixel clock. The timing clock formed of these VD, HD and CLK signals is supplied to each of the circuits in the video camera apparatus through the CPU 4, though not shown.

The signal processing block 3 is a block provided in the video camera apparatus for subjecting the video signals (R), (G), (B) supplied from the imaging block 2 to a predetermined signal processing. The signal processing block 3 has A/D converter circuits 31R, 31G, 31B for respectively converting the analog video signals (R), (G), (B) into digital video signals (R), (G), (B), gain control circuits 32R, 32G, 32B for respectively controlling gains of the digital video signals (R), (G), (B) based on a gain control signal from the CPU 4, and signal processing circuits 33R, 33G, 33B for respectively subjecting the digital video signals (R), (G), (B) to a predetermined signal processing. The signal processing circuits 33R, 33G, 33B have knee circuits 331R, 331G, 331B for compressing the video signals to a certain degree or more, γ correction circuits 332R, 332G, 332B for correcting the levels of the video signals in accordance with a preset γ curve, and B/W clip circuits 333R, 333G, 333B for clipping a black level smaller than a predetermined level and a white level larger than a predetermined level. Each of the signal processing circuits 33R, 33G, 33B may have a known black γ correction circuit, a known contour emphasizing circuit, a known linear matrix circuit and so on other than the knee circuit, the γ correction circuit, and the B/W clip circuit.

The signal processing block 3 has an encoder 37 for receiving the video signals (R), (G), (B) output from the signal processing circuits 33R, 33G, 33B and for generating a luminance signal (Y) and color-difference signals (R–Y), (B–Y) from the video signals (R), (G), (B).

The signal processing block 3 further has a focus control circuit 34 for receiving the video signals (R), (G), (B) respectively output from the gain control circuit 32R, 32G, 32B and for generating an estimation data E and a direction data Dr both used for controlling the focus based on the video signals (R), (G), (B), an iris control circuit 35 for receiving the video signals (R), (G), (B) respectively output from the signal processing circuits 33R, 33G, 33B and for controlling the iris based on the levels of the received signals so that an amount of light incident on each of the imaging devices 22R, 22G, 22B should be a proper amount of light, and a white balance controlling circuit 36 for receiving the video signals (R), (G), (B) respectively output from the signal processing circuits 33R, 33G, 33B and for carrying out white balance control based on the levels of the received signals.

The iris control circuit 35 has an NAM circuit for selecting a signal having a maximum level from the supplied video signals (R), (G), (B), and an integrating circuit for dividing the selected signal with respect to areas of a picture corresponding thereto to totally integrate each of the video signals corresponding to the areas of the picture. The iris control circuit 35 considers every illumination condition of an object such as back lighting, front lighting, flat lighting, spot lighting or the like to generate an iris control signal used for controlling the iris, and supplies this iris control signal to the CPU 4. The CPU 4 supplies a control signal to the iris drive circuit 13c based on the iris control signal.

The white balance controlling circuit 36 generates a white balance control signal from the supplied video signals (R), (G), (B) so that the generated signal should satisfy (R–Y)=0 and (B–Y)=0, and supplies this white balance control signal to the CPU 4. The CPU 4 supplies a gain control signal to the gain controlling circuits 32R, 32G, 32B based on the white balance control signal.

The signal processing block 3 further has an area detecting circuit 38 and a frame memory 39.

The area detecting circuit 38 is a circuit for receiving a luminance signal (Y) and color difference signals (R–Y), (B–Y) from the encoder 37, and for, based on the luminance signal and the color difference signals, selecting an area, where a pixel data having the same color as that of an object designated as a target object exists, from areas set in the whole picture. The area detecting circuit will be described in detail later on.

The frame memory 39 is a memory for receiving the luminance signal (Y) and the color difference signals (R–Y), (B–Y) from the encoder 37, and for temporarily storing the luminance signal and the color difference signals. The frame memory is formed of three memories of a frame memory for the luminance signal (Y), a frame memory for the color difference signal (R–Y) and a frame memory for the color difference signal (B–Y). The luminance signal and the color difference signals stored in the respective frame memories are read out therefrom based on read addresses supplied from the CPU 4, and the read luminance and color difference signals are supplied to the CPU 4.

Figure 2:
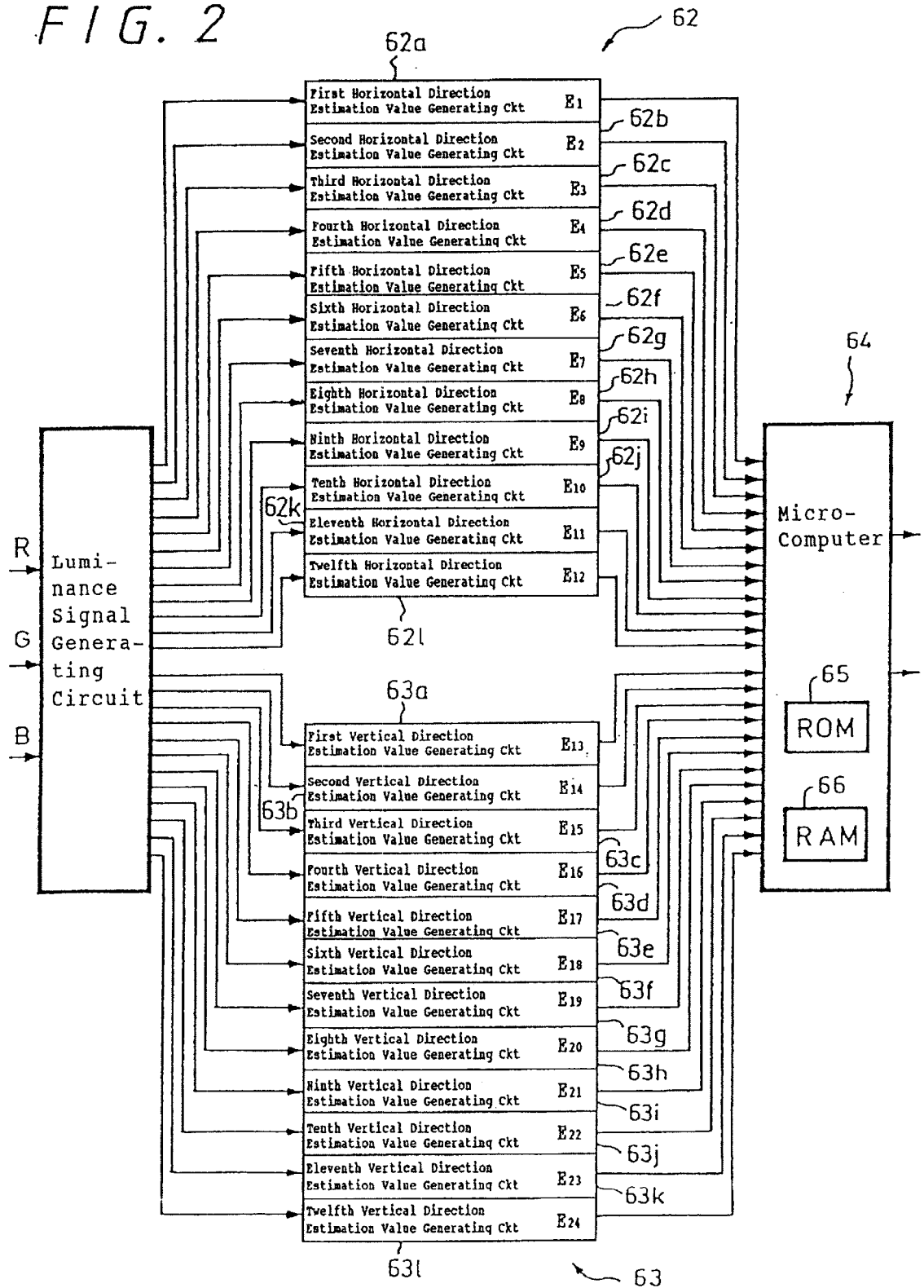
FIG. 2 is a diagram showing a specific arrangement of an autofocus controlling circuit 34.

The focus control circuit 34 will hereinafter be described in detail with reference to FIG. 2.

The focus control circuit 34 has a luminance signal generating circuit 61, a horizontal-direction estimation value generating circuit 62, a vertical-direction estimation value generating circuit 63, and a microcomputer 64.

The luminance-signal generating circuit 61 is a circuit for generating a luminance signal from the supplied video signals R, G, B. In order to determine whether the lens is in focus or out of focus, it is sufficient to determine whether the contrast is high or low. Therefore, since change of the contrast has no relation with change of a level of a color difference signal, it is possible to determine whether the contrast is high or low, by detecting only the change of a level of the luminance signal.

The luminance-signal generating circuit 61 can generate the luminance signal Y by subjecting the supplied video signals R, G, B to a known calculation based on $$Y=0.3R+0.59G+0.11B \qquad (1)$$

The horizontal-direction estimation value generating circuit 62 is a circuit for generating a horizontal-direction estimation value. The horizontal-direction estimation value is a data indicating how much the level of the luminance signal is changed when the luminance signal is sampled in the horizontal direction, i.e., a data indicating how much contrast there is in the horizontal direction.

The horizontal-direction estimation value generating circuit 62 has a first horizontal-direction estimation value generating circuit 62a for generating a first horizontal-direction estimation value $E_1$, a second horizontal-direction estimation value generating circuit 62b for generating a second horizontal-direction estimation value $E_2$, a third horizontal-direction estimation value generating circuit 62c for generating a third horizontal-direction estimation value $E_3$, a fourth horizontal-direction estimation value generating circuit 62d for generating a fourth horizontal-direction estimation value $E_4$, a fifth horizontal-direction estimation value generating circuit 62e for generating a fifth horizontal-direction estimation value $E_5$, a sixth horizontal-direction estimation value generating circuit 62f for generating a sixth horizontal-direction estimation value $E_6$, a seventh horizontal-direction estimation value generating circuit 62g for generating a seventh horizontal-direction estimation value $E_7$, an eighth horizontal-direction estimation value generating circuit 62h for generating an eighth horizontal-direction estimation value $E_8$, a ninth horizontal-direction estimation value generating circuit 62i for generating a ninth horizontal-direction estimation value $E_9$, a tenth horizontal-direction estimation value generating circuit 62j for generating a tenth horizontal-direction estimation value $E_{10}$, an eleventh horizontal-direction estimation value generating circuit 62k for generating an eleventh horizontal-direction estimation value $E_{11}$, and a twelfth horizontal-direction estimation value generating circuit 62l for generating a twelfth horizontal-direction estimation value $E_{12}$.

Figure 3:
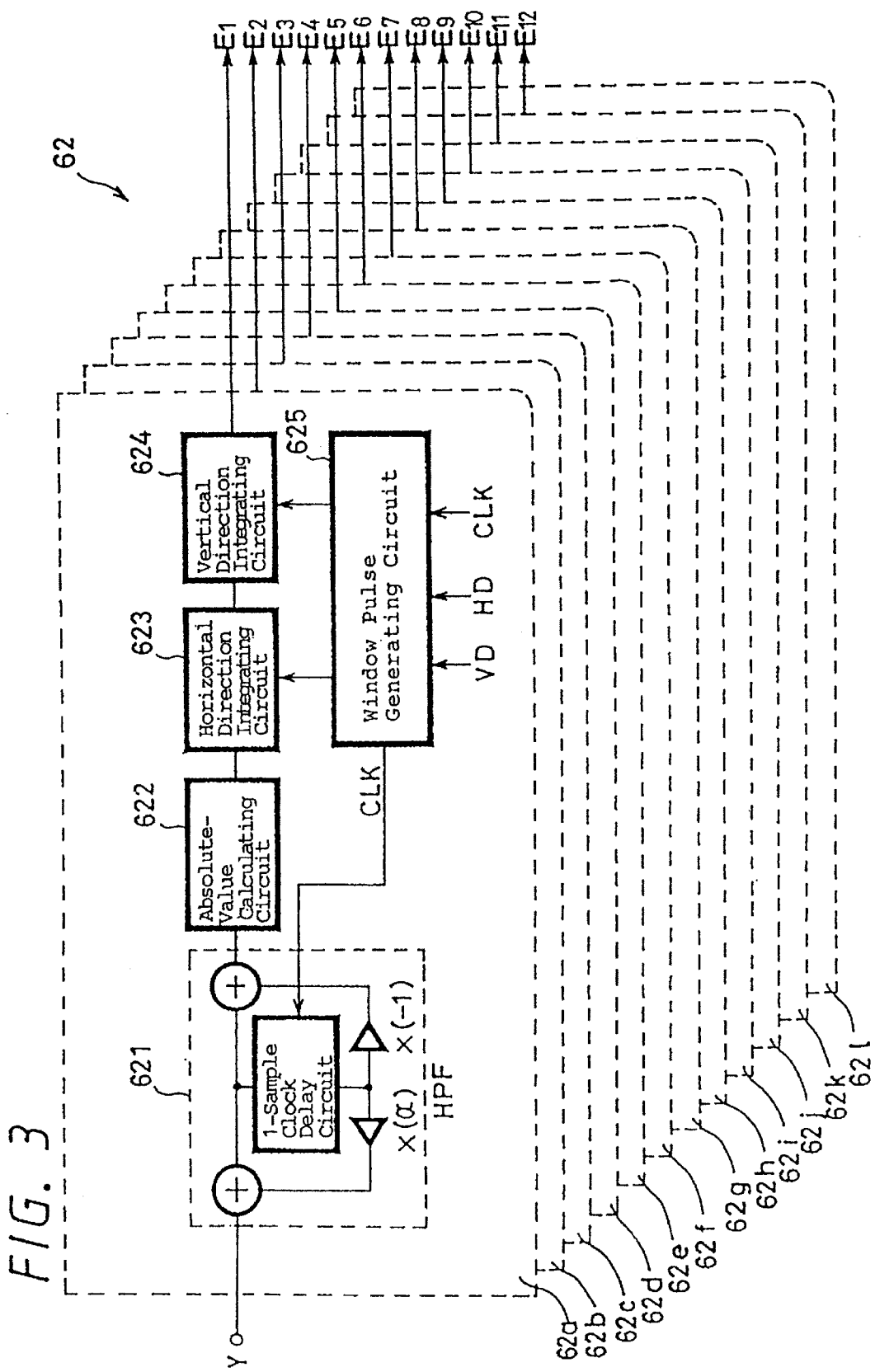
FIG. 3 is a diagram showing a specific arrangement of a horizontal-direction estimation value generating circuit 62.

A detailed arrangement of the horizontal-direction estimation value generating circuit 62 will hereinafter be described with reference to FIG. 3.

The first horizontal-direction estimation value generating circuit 62a of the horizontal-direction estimation value generating circuit 62 has a high-pass filter 621 for extracting a high-frequency component of the luminance signal, an absolute-value calculating circuit 622 for converting the extracted high-frequency component into an absolute value to thereby obtain a data having positive values only, a horizontal-direction integrating circuit 623 for integrating an absolute-value data in the horizontal direction to thereby cumulatively add the data of the high-frequency component in the horizontal direction, a vertical-direction integrating circuit 624 for integrating the data integrated in the vertical direction, and a window pulse generating circuit 625 for supplying an enable signal used for allowing integrating operations of the horizontal-direction integrating circuit 623 and the vertical-direction integrating circuit 624.

The high-pass filter 621 is formed of a one-dimension finite impulse response filter for filtering the high-frequency component of the luminance signal in response to one sample clock CLK from the window pulse generating circuit 625. The high-pass filter 621 has a cutoff frequency characteristic expressed by $$(1-Z^{-1})/(1-\alpha Z^{-1}) \qquad (2)$$

The first horizontal-direction estimation value generating circuit 62a has a value of $\alpha=0.5$ and has a frequency characteristic corresponding to the value of $\alpha$.

The window pulse generating circuit 625 has a plurality of counters operated based on the clock signal VD representing one vertical period, on the clock signal HD representing one horizontal period and on the clock signal CLK representing one sample clock. The window pulse generating circuit 625 supplies the enable signal to the horizontal-direction integrating circuit 623 based at every one sample clock signal CLK and supplies the enable signal to the vertical-direction integrating circuit 624 at every one horizontal period based on the counted value of the counter. The window pulse generating circuit 625 of the first horizontal-direction estimation value circuit 62a has a counter whose initial count value is set so that a size of a window should be that of 192 pixels×60 pixels. Therefore, the first horizontal-direction estimation value $E_1$ output from the horizontal-direction estimation value generating circuit 62 indicates data obtained by integrating all the high-frequency components in the window of 192 pixels×60 pixels. The counter is connected to the CPU 4 so as to be supplied with an offset value from the latter. The initial count value is a count value set so that a window center should be agreed with a center of a picture obtained by image pickup. The offset value supplied from the CPU 4 means a count value to be added to the initial count value. Therefore, when the offset value is supplied from the CPU 4, the count value of the counter is changed and consequently a center position of the window is changed.

Similarly to the first horizontal-direction estimation value generating circuit 62a, each of the second to twelfth horizontal-direction estimation value generating circuits 62b to 62 has a high-pass filter 621, an absolute-value calculating circuit 622, a horizontal-direction integrating circuit 623, a vertical-direction integrating circuit 624, and a window pulse generating circuit 625. A different point among the respective circuits lies in that the respective circuits (62a to 62l) have different combinations of their filter coefficients $\alpha$ and their window sizes.

Therefore, the estimation values $E_1$ to $E_{12}$ generated by the respective circuits are different from one another.

FIG. 5A shows the filter coefficients $\alpha$ and the window sizes which are respectively set for the first horizontal-direction estimation value generating circuit 62a to the twelfth horizontal-direction estimation value generating circuit 62l. The reason for setting such different filter coefficients will hereinafter be described.

For example, the high-pass filter having a high cutoff frequency is very suitable for use when the lens is substantially in a just focus state (which means a state that a lens is in focus). The reason for this is that the estimation value is changed at a considerably large rate as compared with a lens movement in the vicinity of the just focus point. Since the estimation value is changed at a small rate when the lens is considerably out of focus, it is not too much to say that the high-pass filter having the high cutoff frequency is not suitable for use when the lens is considerably out of focus.

On the other hand, the high-pass filter having a low cutoff frequency is suitable for use when the lens is considerably out of focus. The reason for this is that when the lens is moved while being considerably out of focus, the estimation value is changed at a considerably large rate. Since the estimation value is changed at a small rate when the lens is moved in the substantial just focus state, then it is not too much to say that the high-pass filter having the low cutoff frequency is not suitable for use in the substantial just focus state.

In short, each of the high-pass filter having the high cutoff frequency and the high-pass filter having the low cutoff frequency has both of advantage and disadvantage. It is difficult to determine which of the high-pass filters is more suitable. Therefore, preferably, a plurality of high-pass filters having different filter coefficients are used and generate a plurality of estimation values in order to select a most proper estimation value.

Figure 6A:
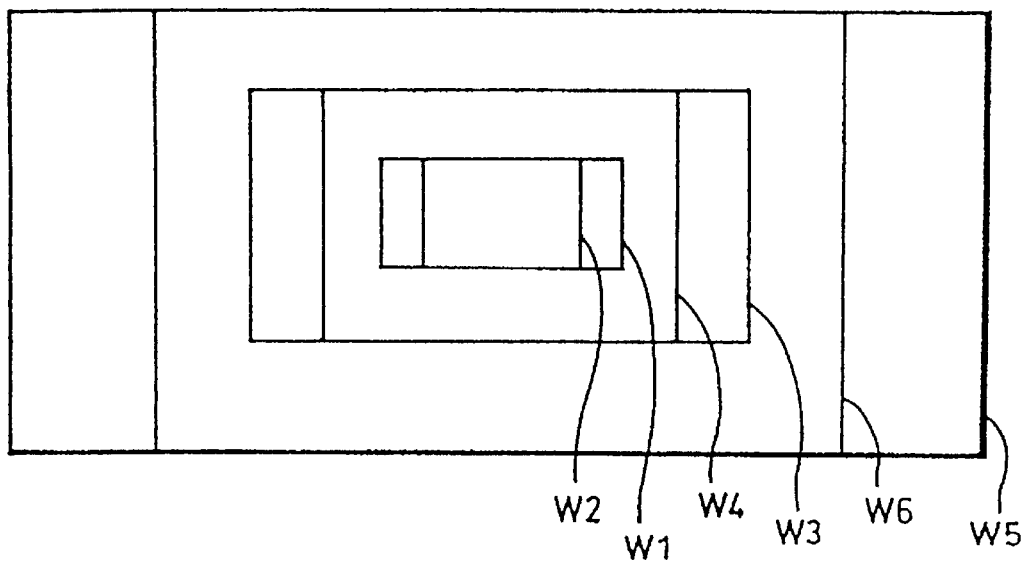
FIG. 6 is a diagram used to explain the respective window sizes.

The horizontal-direction estimation value generating circuit 63 according to this embodiment has plural kinds of preset windows shown in FIG. 6A. When the offset value is not supplied from the CPU 4 to the counter provided in the window pulse generating circuit 625, centers of these plurality of windows are agreed with the centers of the pictures obtained by image pickup. A window W1 is a window of 192 pixels×60 pixels. A window W2 is a window of 132 pixels× 60 pixels. A window W3 is a window of 384 pixels×120 pixels. A window W4 is a window of 264 pixels×120 pixels. A window W5 is a window of 768 pixels×240 pixels. A window W6 is a window of 548 pixels×240 pixels.

It is possible to generate different estimation values corresponding to the respective windows by setting a plurality of windows as described above. Therefore, regardless of a size of an object to be brought into focus, it is possible to obtain a proper estimation value from any of the first horizontal-direction estimation value generating circuit 62a to the twelfth horizontal-direction estimation value generating circuit 62l.

An arrangement of the vertical-direction estimation value generating circuit 63 will be described with reference to FIGS. 2 and 4.

The vertical-direction estimation value generating circuit 63 is a circuit for generating an estimation value in the vertical direction. The estimation value in the vertical direction is a data indicating how much the level of the luminance signal is changed when the luminance signal is sampled in the vertical direction, i.e., a data indicating how much there is the contrast in the vertical direction.

The vertical-direction estimation value generating circuit 62 has a first vertical-direction estimation value generating circuit 63a for generating a first vertical-direction estimation value $E_{13}$, a second vertical-direction estimation value generating circuit 63b for generating a second vertical-direction estimation value $E_{14}$, a third vertical-direction estimation value generating circuit 63c for generating a third vertical-direction estimation value $E_{15}$, a fourth vertical-direction estimation value generating circuit 63d for generating a fourth vertical-direction estimation value $E_{16}$, a fifth vertical-direction estimation value generating circuit 63e for generating a fifth vertical-direction estimation value $E_{17}$, a sixth vertical-direction estimation value generating circuit 63f for generating a sixth vertical-direction estimation value $E_{18}$, a seventh vertical-direction estimation value generating circuit 63g for generating a seventh vertical-direction estimation value $E_{19}$, an eighth vertical-direction estimation value generating circuit 63h for generating an eighth vertical-direction estimation value $E_{20}$, a ninth vertical-direction estimation value generating circuit 63i for generating a ninth vertical-direction estimation value $E_{21}$, a tenth vertical-direction estimation value generating circuit 63j for generating a tenth vertical-direction estimation value $E_{22}$, an eleventh vertical-direction estimation value generating circuit 63k for generating an eleventh vertical-direction estimation value $E_{23}$, and a twelfth vertical-direction estimation value generating circuit 63l for generating a twelfth vertical-direction estimation value $E_{24}$.

A detailed arrangement of the vertical-direction estimation value generating circuit 63 will hereinafter be described with reference to FIG. 4.

The first vertical-direction estimation value generating circuit 63a of the vertical-direction estimation value generating circuit 63 has a horizontal-direction mean value generating circuit 631 for generating a mean value data of levels of luminance signals in the horizontal direction, a high-pass filter 632 for extracting a high-frequency component of the mean-value data of the luminance signals, an absolute-value calculating circuit 633 for converting the extracted high-frequency component into an absolute value to thereby obtain a data having positive values only, a vertical-direction integrating circuit 634 for integrating an absolute-value data in the vertical direction to thereby cumulatively add the data of the high-frequency component in the vertical direction, and a window pulse generating circuit 635 for supplying an enable signal used for allowing integrating operations of the horizontal-direction mean value generating circuit 631 and the vertical-direction integrating circuit 634.

The high-pass filter 632 is formed of a one-dimension finite impulse response filter for filtering the high-frequency component of the luminance signal in response to one horizontal period signal HD from the window pulse generating circuit 625. The high-pass filter 632 has the same cutoff frequency characteristic as that of the high-pass filter 621 of the first horizontal-direction estimation value generating circuit 62a. The first vertical-direction estimation value generating circuit 63a has a value of α=0.5 and has a frequency characteristic corresponding to the value of α.

The window pulse generating circuit 635 has a plurality of counters operated based on the clock signal VD representing one vertical period, the clock signal HD representing one horizontal period and the clock signal CLK representing one sample clock supplied from the CPU 4. The window pulse generating circuit 635 supplies the enable signal to the horizontal-direction mean value generating circuit 631 based on the counted value of the counter at every one sample clock signal CLK and supplies the enable signal to the vertical-direction integrating circuit 634 at every one horizontal period. The window pulse generating circuit 635 of the first vertical-direction estimation value generating circuit 63a has a counter whose initial count value is set so that a size of a window should be that of 120 pixels×80 pixels. Therefore, the first vertical-direction estimation value $E_{13}$ output from the vertical-direction estimation value generating circuit 63 indicates data obtained by integrating all the high-frequency components in the window of 120 pixels×80 pixels. The counter is connected to the CPU 4 so as to be supplied with an offset value from the latter. The initial count value is a count value set so that a window center should be agreed with a center of a picture obtained by image pickup. The offset value supplied from the CPU 4 means a count value to be added to the initial count value. Therefore, when the offset value is supplied from the CPU 4, the count value of the counter in the window pulse generating circuit 635 is changed and consequently a center position of the window is changed.

Similarly to the above first vertical-direction estimation value generating circuit 63a, each of the second to twelfth vertical-direction estimation value generating circuits 63b to 63lh has a horizontal-direction mean value generating circuit 631, a high-pass filter 632, an absolute-value calculating circuit 633, a vertical-direction integrating circuit 634, and a window pulse generating circuit 635. A different point among the respective circuits lies in that the respective circuits have different combinations of their filter coefficients α and their window sizes similarly to those of the horizontal-direction estimation value generating circuit 62.

Therefore, the estimation values $E_1$ to $E_{12}$ generated by the respective circuits are different from one another.

FIG. 5B shows the filter coefficients α and the window sizes both of which are respectively set for the first vertical-direction estimation value generating circuit 62a to the twelfth vertical-direction estimation value generating circuit 62l.

Figure 6B:
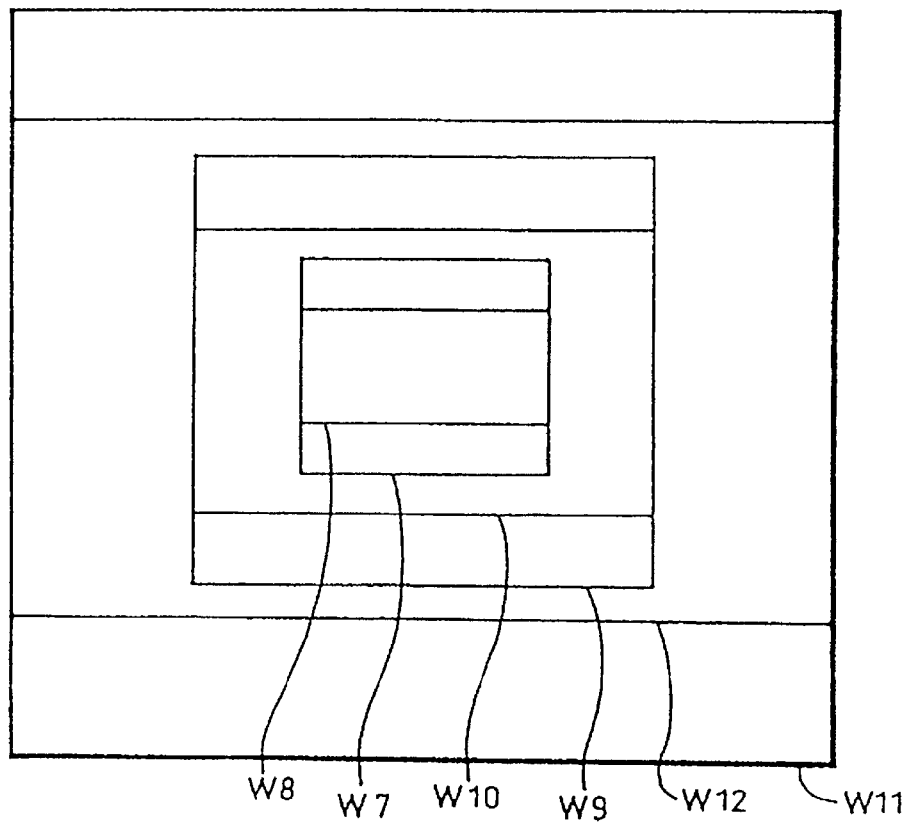

The vertical-direction estimation value generating circuit 63 according to this embodiment has plural kinds of preset windows shown in FIG. 6B. When the offset value is not supplied from the CPU 4 to the counter provided in the window pulse generating circuit 625, centers of these plurality of windows are agreed with the centers of the pictures obtained by image pickup. A window W7 is a window of 120 pixels×80 pixels. A window W8 is a window of 120 pixels× 60 pixels. A window W9 is a window of 240 pixels×160 pixels. A window W10 is a window of 240 pixels×120 pixels. A window W11 is a window of 480 pixels×320 pixels. A window W12 is a window of 480 pixels×240 pixels.

It is possible to generate different estimation values corresponding to the respective combinations of filter coefficients and windows by providing circuits having a plurality of filter characteristics and a plurality of windows as described above. Therefore, since the estimation value is totally generated from a plurality of estimation values regardless of an image pickup state of an object to be brought into focus, it is possible to obtain a precise total estimation value even if any one of the estimation values is not proper.

Therefore, according to this embodiment, since the focus control circuit has twenty-four estimation value generating circuits for generating twenty-four kinds of estimation values obtained from combination of twelve window sizes and two filter coefficients, it is possible to obtain plural kinds of estimation values. Moreover, since the estimation value is totally obtained based on the respective estimation values, it is possible to improve the accuracy of the estimation value.

The microcomputer 64 will be described with respect to FIGS. 2 and 7.

The microcomputer 64 is a circuit for receiving twenty-four estimation values $E_1$ to $E_{24}$ generated by the horizontal-direction estimation value generating circuit 62 and the vertical-direction estimation value generating circuit 63 and for calculating, based on these twenty-four estimation values, the direction in which the lens is to be moved and a lens position where the estimation value is maximum, i.e., a lens position where the lens is in focus.

The microcomputer 64 has a ROM 65 which stores a program used for calculating the twenty-four estimation values in accordance with a predetermined flowchart. As shown in FIG. 7, the ROM 65 stores twenty-four weight data $W_i$ corresponding to the respective twenty-four estimation values $E_i$ (i=1, 2, . . . 24) output from the twenty-four estimation value generating circuits (62a to 62l and 63a to 63l). These weight data $W_i$ are data used for giving priority to the twenty-four estimation values $E_i$. The higher values the weight data $W_i$ have, the higher priority the corresponding estimation value $E_i$ have. The weight data $W_i$ have fixed values preset upon shipment from a factory.

The microcomputer 64 has a RAM 66 for storing the twenty-four estimation values $E_i$ (i=1, 2, . . . 24) respectively supplied from the twenty-four estimation value generating circuits (62a to 62l and 63a to 63l) in connection with the position of the focus lens. It is assumed that estimation values generated when the lens is located at a position $X_1$ are represented by $E_1(X_1)$ to $E_{24}(X_1)$. Initially, the estimation values $E_1(X_1)$ to $E_{24}(X_1)$ generated when the lens is located at a position $X_1$ are stored in the RAM 66. Further, when the lens is moved from the position $X_1$ to a position $X_2$, estimation values $E_1(X_2)$ to $E_{24}(X_2)$ generated when the lens is moved to the position $X_2$ are stored in a RAM 66. Since the RAM 66 stores data in a ring buffer system, the previously stored estimation values $E_1(X_1)$ to $E_{24}(X_1)$ are not erased until the RAM becomes full of stored data. These estimation values $E_i$ are stored in the RAM 64 when designation of a pointer by the microcomputer 64.

Figure 8:
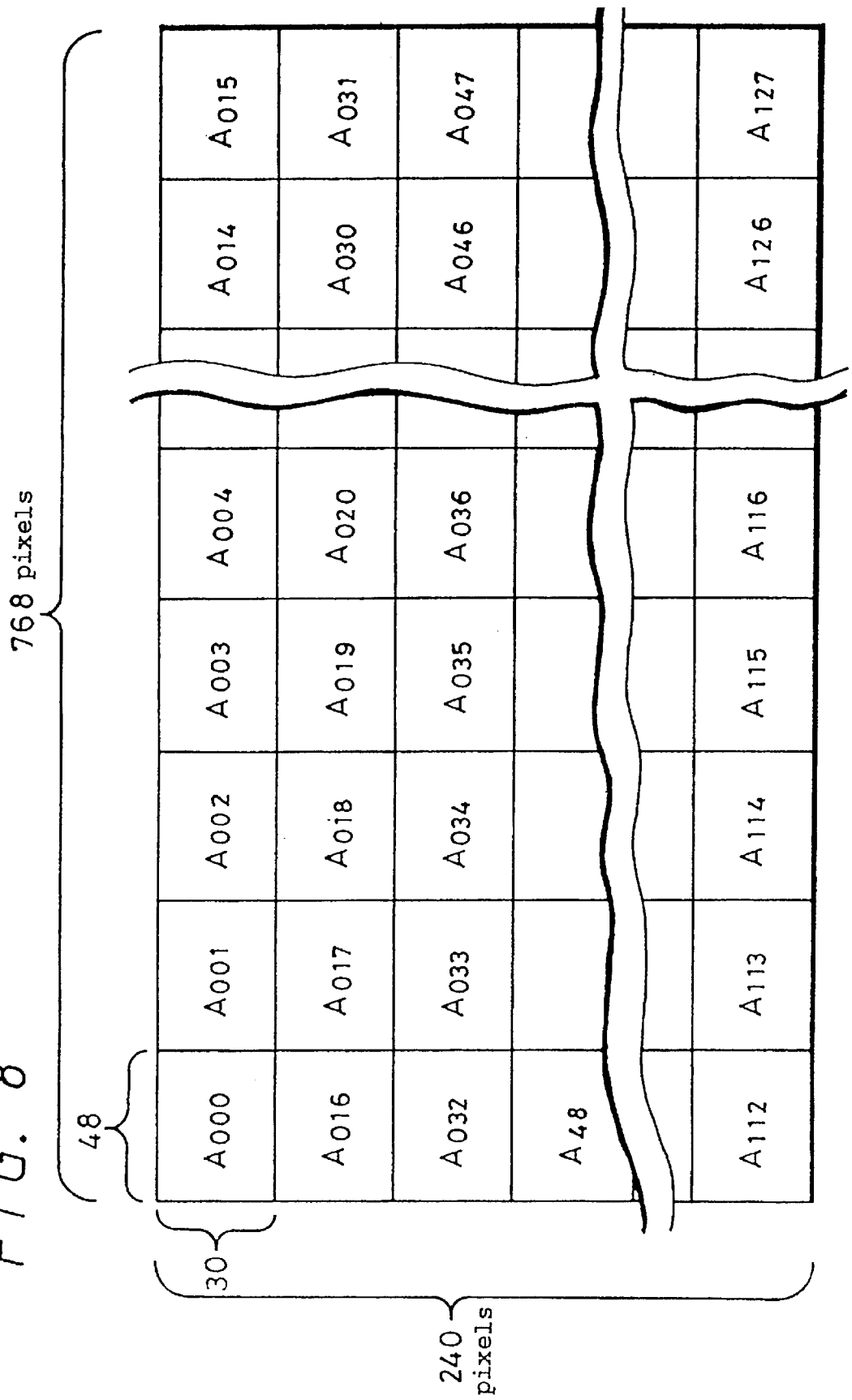
FIG. 8 is a diagram showing divided areas of a picture presented by an area detecting circuit 38.
Figure 9:
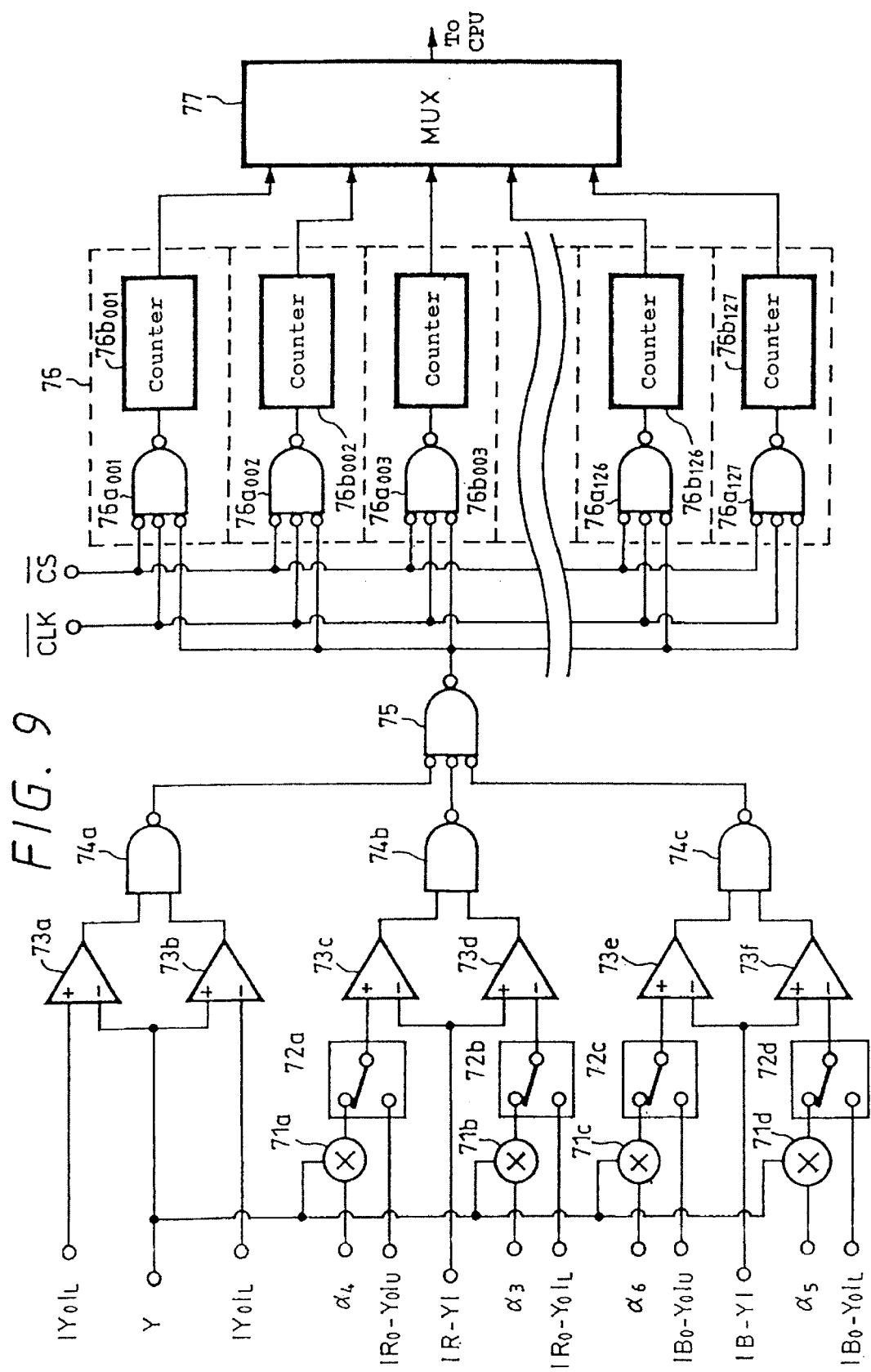
FIG. 9 is a diagram showing a specific circuit arrangement of the area detecting circuit 38.

The area detecting circuit 38 will be described with reference to FIGS. 8 to 9.

The area detecting circuit 38 is a circuit for dividing a picture into one hundred and twenty-eight areas and for determining in which of the divided areas a pixel data having the same color as that of the object set as the target object exists. The area detecting circuit 38 has a logic circuit for judging all the pixel data supplied from the encoder. Specifically, as shown in FIG. 8, when one area is set so as to have a size of 48 pixels×30 pixels, a picture is divided into 16 portions in the horizontal direction and into 8 portions in the vertical direction and consequently one hundred and twenty-eight areas can be defined in one picture. As shown in FIG. 8, the one hundred and twenty-eight areas are defined as area numbers $A_{000}$ to $A_{127}$ in that order.

A specific arrangement of the area detecting circuit 38 will be described with reference to FIG. 9. The encoder 37 supplies the luminance signal Y, the color difference signal |R−Y| and the color difference signal |B−Y| of every pixel data to the area detecting circuit 38. The area detecting circuit 38 is supplied with an upper limit luminance signal $|Y_0|_U$, a lower limit luminance signal $|Y_0|_L$, an upper limit color difference signal $|R_0-Y_0|_U$, a lower limit color difference signal $|R_0-Y_0|_L$, an upper limit color difference signal $|B_0-Y_0|_U$, and a lower limit color difference signal $|B_0-Y_0|_L$ from the CPU 4. Further, the area detecting circuit is supplied from the CPU 4 with multiplication coefficients $\alpha_3$, $\alpha_4$, $\alpha_5$, $\alpha_6$ to be multiplied with the luminance signal Y supplied from the encoder 37.

The upper limit luminance signal $|Y_0|_U$, the lower limit luminance signal $|Y_0|_L$, the upper limit color difference signal $|R_0-Y_0|_U$, the lower limit color difference signal $|R_0-Y_0|_L$, the upper limit color difference signal $|B_0-Y_0|_U$, and the lower limit color difference signal $|B_0-Y_0|_L$ supplied from the CPU 4 will be described. The luminance signal $Y_0$, the color difference signal $|R_0-Y_0|$ and the color difference signal $|B_0-Y_0|$ are signals obtained based on the luminance signal and the color difference signal obtained by image pickup of the object which a camera man determines as a target object. Therefore, once the target object is set, the values of the signals will never be changed. In order to allow judgement that if a luminance signal of a certain pixel data has a value between the upper limit luminance signal $|Y_0|_U$ and the lower limit luminance signal $|Y_0|_L$, then the luminance signal is determined as a luminance signal having the substantially same level as that of the luminance signal $Y_0$ of the target object, the upper limit luminance signal $|Y_0|_U$ and the lower limit luminance signal $|Y_0|_L$ are set so as to have values approximate to that of the luminance signal $|Y_0|$ of the target object. Similarly, in order to allow judgement that if a color difference signal |R−Y| of a certain pixel data has a value between the upper limit color difference signal $|R_0-Y_0|_U$ and the lower limit color difference signal $|R_0-Y_0|_L$, then the color difference signal |R−Y| of the certain pixel data is determined as a color difference signal having the substantially same level as that of the color difference signal $|R_0-Y_0|$ of the target object, the upper limit color difference signal $|R_0-Y_0|_U$ and the lower limit color difference signal $|R_0-Y_0|_L$ are set so as to have values approximate to that of the color difference signal $|R_0-Y_0|$ of the target object. In order to allow judgement that if a color difference signal |B−Y| of a certain pixel data has a value between the upper limit color difference signal $|R_0-Y_0|_U$ and the lower limit color difference signal $|B_0-Y_0|_L$, then the color difference signal |B−Y| of the certain pixel data is determined as a color difference signal having the substantially same level as that of the color difference signal $|B_0-Y_0|$ of the target object, the upper limit color difference signal $|B_0-Y_0|_U$ and the lower limit color difference signal $|B_0-Y_0|_L$ are set so as to have values approximate to that of the color difference signal $|B_0-Y_0|$ of the target object.

The area detecting circuit 38 has a multiplier circuit 71a for multiplying the multiplication coefficient $\alpha_4$ with the luminance signal Y supplied from the encoder 37, a multiplier circuit 71b for multiplying the multiplication coefficient $\alpha_3$ with the luminance signal Y, a multiplier circuit 71c for multiplying the multiplication coefficient $\alpha_6$ with the luminance signal Y, and a multiplier circuit 71d for multiplying the multiplication coefficient $\alpha_5$ with the luminance signal Y. The area detecting circuit 38 further has a switch circuit 72a for selecting either of a multiplied output signal from the multiplier circuit 71a and the upper limit color difference signal $|R_0-Y_0|_U$, a switch circuit 72b for selecting either of a multiplied output signal from the multiplier circuit 71b and the lower limit color difference signal $|R_0-Y_0|_L$, a switch circuit 72c for selecting either of a multiplied output signal from the multiplier circuit 71c and the upper limit color difference signal $|B_0-Y_0|_U$, and a switch circuit 72d for selecting either of a multiplied output signal from the multiplier circuit 71d and the lower limit color difference signal $|B_0-Y_0|_L$. The area detecting circuit 38 has a comparator 73a supplied with the luminance signal Y and the upper limit luminance signal $|Y_0|_U$, a comparator 73b supplied with the luminance signal Y and the lower limit luminance signal $|Y_0|_L$, a comparator 73c supplied with a signal from the switch circuit 72a and the color difference signal |R−Y|, a comparator 73d supplied with a signal from the switch circuit 72b and the color difference signal |R−Y|, a comparator 73e supplied with a signal from the switch circuit 72c and the color difference signal |B−Y|, and a comparator 73f supplied with a signal from the switch circuit 72d and the color difference signal |B−Y|. The area detecting circuit 38 also has a gate circuit 74a supplied with an output signal from the comparator 73a and an output signal from the comparator 73b, a gate circuit 74b supplied with an output signal from the comparator 73c and an output signal from the comparator 73d, a gate circuit 74c supplied with an output signal from the comparator 73e and an output signal from the comparator 73f, and a gate circuit 75 supplied with an output signal from the gate circuit 74a, an output signal from the gate circuit 74b, and an output signal from the gate circuit 74c.

Further, the area detecting circuit 38 has a flag signal generating circuit 76 formed of one hundred and twenty-eight chip circuits. The one hundred and twenty-eight chip circuits are provided so as to correspond to the one hundred and twenty-eight areas $A_{001}$ to $A_{127}$ shown in FIG. 8. Each of the chip circuits is supplied with an output signal from the gate circuit 75, a pixel clock signal CLK and a chip select signal CS. The pixel clock signal CLK and the chip select signal CS are supplied from the CPU 4 so as to correspond to the luminance signal and the color difference signal of every pixel data supplied from the encoder 37. The pixel clock signal CLK is a clock signal corresponding to a timing of a processing of each pixel data. If a timing of a pixel data processed by the logic circuit at the preceding stage is agreed with a processing timing of the pixel data, then a "Low"-level pixel clock signal is supplied to the chip circuit, and in other cases, a "High"-level pixel clock signal is supplied thereto. A "Low"-level chip select signal CS is supplied only to the chip circuit selected from the 128 chip circuits, and a "High"-level chip select signal is supplied to other chip circuits which are not selected.

Each of the chip circuits provided in the flag signal generating circuit 76 has a gate circuit 76a and a counter 76b. Therefore, the flag signal generating circuit 76 have the one hundred and twenty-eight gate circuits 76a and the one hundred and twenty-eight counters 76b. The gate circuit 76a outputs a "Low"-level signal only when all of the output signal supplied from the gate circuit 75, the pixel clock signal CLK and the chip select signal CS are at "Low" level. The counter 76b is a counter for responding to a clock timing of the pixel clock signal CLK and for counting up only when it is supplied with a "Low"-level signal from the gate circuit 76a. The counter generates a flag signal when its count value becomes a predetermined number or greater (5 counts or greater in this embodiment). The generated flag signal is supplied to a multiplexer 77.

The multiplexer 77 receives the flag signal output from each of the chip circuits of the flag signal generating circuit 76 and supplies the same to the CPU 4. At this time, the multiplexer 77 supplies the number of the chip circuit outputting the flag signal to the CPU 4. The CPU 4 can select the area where the pixel data having the same color component as that obtained by image pickup of the target object with reference to the number.

Before the area detecting circuit 38 carries out a processing for detecting an area, the switch circuits 72a, 72b, 72c and 72d provided in the area detecting circuit 38 must carry out the switching operations. Therefore, the switching operations will be described.

For switching the switch circuits 72a, 72b, 72c and 72d, it is necessary to select an object mode based on the luminance signal $|Y_0|$, the color difference signal $|R_0−Y_0|$ and the color difference signal $|B−Y_0|$ obtained from image pickup of an object which a cameraman set as a target object. The object mode has four modes. Modes 0 to 3 will hereinafter be described successively.

The mode 0 is a mode selected when the object set as the target object has color information to some degree. Specifically, it means that both of values of $|R_0−Y_0|/Y_0$ and $|B_0−Y_0|/Y_0$ indicative of color components obtained by image pickup of the object have a predetermined level or higher. In other words, this mode is selected when the selected target object has strong tint. Accordingly, the mode 0 is selected when a relationship among the luminance signal $|Y_0|$, the color difference signal $|R_0−Y_0|$ and the color difference signal $|B_0−Y_0|$ obtained by image pickup of the set target object satisfies conditions expressed by $$\alpha_3 \times |Y_0| \leq |R_0−Y_0| \leq \alpha_4 \times |Y_0|$$

and $$\alpha_5 \times |Y_0| \leq |B_0−Y_0| \leq \alpha_6 \times |Y_0| \qquad (70)$$

When the CPU 4 selects the mode 0 as the object mode, the CPU 4 supplies control signals to the switch circuits 72a, 72b, 72c and 72d to thereby respectively set the switch states of the switch circuits 72a, 72b, 72c and 72d to "Up", "Up", "Up", and "Up". Once the switch states are set, these switch states will never be changed until the object mode is changed.

The mode 1 is a mode a mode selected when the object set as the target object has color components including red color components exceeding a predetermined level and blue color components which does not exceed a predetermined level. Specifically, it means that the value of $|R_0−Y_0|/Y_0$ indicative of color components obtained by image pickup of the object has a predetermined level or higher but the value of $|B_0−Y_0|/Y_0$ does not have a predetermined level or higher. Accordingly, the mode 1 is selected when a relationship between the luminance signal $|Y_0|$ and the color difference signal $|R_0−Y_0|$ obtained by image pickup of the set target object satisfies conditions expressed by $$\alpha_3 \times |Y_0| \leq |R_0−Y_0| \leq \alpha_4 \times |Y_0|$$

and $$|B_0−Y_0| \leq \alpha_5 \times |Y_0| \qquad (71)$$

When the CPU 4 selects the mode 1 as the object mode, the CPU 4 supplies control signals to the switch circuits 72a, 72b, 72c and 72d to thereby respectively set the switch states of the switch circuits 72a, 72b, 72c and 72d to "Up", "Up", "Down", and "Down".

The mode 2 is a mode a mode selected when the object set as the target object has color components including blue color components exceeding a predetermined level and red color components which does not exceed a predetermined level. Specifically, it means that the value of $|B_0−Y_0|/Y_0$ indicative of color components obtained by image pickup of the object has a predetermined level or higher but the value of $|R_0−Y_0|/Y_0$ does not have a predetermined level or higher. Accordingly, the mode 2 is selected by the CPU 4 when a relationship among the luminance signal $|Y_0|$ and the color difference signal $|B_0-Y_0|$ obtained by image pickup of the set target object satisfies conditions expressed by $$R_0-Y_0 \leq \alpha_5 \times |Y_0|$$

and $$\alpha_5 \times |Y_0| \leq |B_0-Y_0| \leq \alpha_6 \times |Y_0| \tag{72}$$

When the CPU 4 selects the mode 2 as the object mode, the CPU 4 supplies control signals to the switch circuits 72a, 72b, 72c and 72d to thereby respectively set the switch states of the switch circuits 72a, 72b, 72c and 72d to "Down", "Down", "Up", and "Up".

The mode 3 is a mode selected when the object set as the target object has color components including both of the blue color components and the red color components which do not exceed a predetermined level. Specifically, it means that either of values of $|R_0-Y_0|/Y_0$ and $|B_0-Y_0|/Y_0$ indicative of color components obtained by image pickup of the object does not have a predetermined level or higher. In other words, this mode is selected when the selected target object does not have tint. Accordingly, the mode 3 is selected by the CPU 4 when a relationship among the luminance signal $|Y_0|$, the color difference signal $|R_0-Y_0|$ and the color difference signal $|B_0-Y_0|$ obtained by image pickup of the set target object does not satisfy either of the above equations (70), (71) and (72). When the CPU 4 selects the mode 3 as the object mode, the CPU 4 supplies control signals to the switch circuits 72a, 72b, 72c and 72d to thereby respectively set the switch states of the switch circuits 72a, 72b, 72c and 72d to "Down", "Down", "Down", and "Down".

When the above switching operation is finished, the area detecting circuit 38 carries out a processing of detecting an object. The detecting processing will subsequently be described with reference to FIG. 9 in correspondence with each of the object modes.

1) When the Mode 0 is Selected

Regardless of the selected mode, the comparator 73a compares the upper limit luminance signal $|Y_0|_U$ with the luminance signal Y supplied from the encoder 37. When $$Y \leq |Y_0|_U$$

is established, the comparator outputs a "high"-level signal, and when $$|Y_0|_U \leq Y$$

is established, the comparator outputs a "Low"-level signal. The comparator 73b compares the lower limit luminance signal $|Y_0|_L$ with the luminance signal y supplied from the encoder. When $$|Y_0|_L \leq Y$$

is established, the comparator outputs a "high"-level signal, and when $$Y \leq |Y_0|_L$$

is established, the comparator outputs a "Low"-level signal. The gate circuit 74a receives the output signals from the comparator 73a and the comparator 73b, and, when both of the output signals from the comparators 73a, 73b are at "high" level, outputs a "Low"-level signal to the gate circuit 75 at the succeeding stage.

Specifically, the calculation carried out by the comparators 73a, 73b and the gate circuit 74a is defined as $$|Y_0|_L \leq Y \leq |Y_0|_U \tag{74}$$

In other words, if the luminance signal Y supplied from the encoder satisfies the condition defined by the equation (74), then the gate circuit 74a outputs a "Low"-level signal.

Since the switch states of the switch circuits 72a, 72b are respectively set to "Up" and "Up" when the mode 0 is selected, the comparator 73c is supplied with data $Y \times \alpha_4$ and $|R-Y|$ and the comparator 73d is supplied with data $Y \times \alpha_3$ and $|R-Y|$. The luminance signal Y and the color difference signal $|R-Y|$ are data supplied from the encoder 37. The comparator 73c compares the data $Y \times \alpha_4$ with the data $|R-Y|$. When $$|R-Y| \leq Y \times \alpha_4$$

is established, the comparator outputs a "High"-level signal, and when $$Y \times \alpha_4 \leq |R-Y|$$

is established, the comparator outputs a "Low"-level signal. The comparator 73d compares the data $Y \times \alpha_3$ with the data $|R-Y|$. When $$Y \times \alpha_3 \leq |R-Y|$$

is established, the comparator outputs a "High"-level signal, and when $$|R-Y| \leq Y \times \alpha_3$$

is established, the comparator outputs a "Low"-level signal. The gate circuit 74b receives signals output from the comparator 73c and the comparator 73d, and, when both of the output signals from the comparators 73c, 73d are at "High" level, outputs a "Low"-level signal to the gate circuit 75 at the succeeding stage.

Specifically, the calculation carried out by the comparators 73c, 73d and the gate circuit 74b is defined as $$Y \times \alpha_3 \leq |R-Y| \leq Y \times \alpha_4 \tag{75}$$

In other words, if the color difference signal $|R-Y|$ supplied from the encoder satisfies the condition defined by the equation (75), then the gate circuit 74b outputs a "Low"-level signal.

Further, since the switch states of the switch circuits 72c, 72d are respectively set to "Up" and "Up" when the mode 0 is selected, the comparator 73e is supplied with data $Y \times \alpha_6$ and $|B-Y|$ and the comparator 73f is supplied with data $Y \times \alpha_5$ and $|B-Y|$. The luminance signal Y and the color difference signal $|B-Y|$ are data supplied from the encoder 37. The comparator 73e compares the data $Y \times \alpha_6$ with the data $|B-Y|$. When $$|B-Y| \leq Y \times \alpha_6$$

is established, the comparator outputs a "High"-level signal, and when $$Y \times \alpha_6 \leq |B-Y|$$

is established, the comparator outputs a "Low"-level signal. The comparator 73d compares the data $Y \times \alpha_5$ with the data $|B-Y|$. When $$Y \times \alpha_5 \leq |B-Y|$$

is established, the comparator outputs a "High"-level signal, and when $$|B-Y| \leq Y \times \alpha_5$$

is established, the comparator outputs a "Low"-level signal. The gate circuit 74c receives signals output from the comparator 73e and the comparator 73f, and, when both of the output signals from the comparators 73e, 73f are at "High" level, outputs a "Low"-level signal to the gate circuit 75 at the succeeding stage.

Specifically, the calculation carried out by the comparators 73e, 73f and the gate circuit 74c is defined as $$Y \times \alpha_5 \leq |B-Y| \leq Y \times \alpha_6 \tag{76}$$

In other words, if the color difference signal |B−Y| supplied from the encoder satisfies the condition defined by the equation (76), then the gate circuit 74c outputs a "Low"-level signal.

The gate circuit 75 receives the output signals from the gate circuits 74a, 74b and 74c, and, only when all of the output signals from the gate circuits 74a, 74b and 74c are at "high" level, outputs a "Low"-level signal to the respective chip circuits of the flag generating circuit 76.

Specifically, since the conditions of the equations (70), (71) and (72) are satisfied when the mode 0 is selected as the object mode, the calculations carried out by the comparators 73a to 73f, the gate circuits 74a to 74c and the gate circuit 75 can be defined by $$|Y_0|_L \leq Y \leq |Y_0|_U$$

and $$Y \times \alpha_3 \leq |R-Y| \leq Y \times \alpha_4$$

and $$Y \times \alpha_5 \leq |B-Y| \leq Y \times \alpha_6 \tag{700}$$

When the mode 0 is selected, satisfaction of the conditions of the equation (700) means that the luminance signal Y, the color difference signal |R−Y| and the color difference signal |B−Y| of the pixel data supplied from the encoder 37 are substantially equal to the luminance signal $Y_0$, the color difference signal $|R_0-Y_0|$ and the color difference signal $|B_0-Y_0|$ obtained by image pickup of the object set as the target object. Only when the color of the target object is equal to the color indicated by the pixel data as described above, the gate circuit 75 outputs the "Low"-level signal.

2) When the Mode 1 is Selected

The operations carried out when the mode 1 is selected are exactly similar to those carried out when the mode 0 is selected, and hence need not to be described in detail.

Since the operations are similar to those carried out when the mode 0 is selected, when the mode 1 is selected as the object mode, the calculations carried out by the comparators 73a to 73f, the gate circuits 74a to 74c and the gate circuit 75 can be defined by $$|Y_0|_L \leq Y \leq |Y_0|_U$$

and $$Y \times \alpha_3 \leq |R-Y| \leq Y \times \alpha_4$$

and $$|B_0-Y_0|_L \leq |B-Y| \leq |B_0-Y_0|_L \tag{701}$$

When the mode 1 is selected, satisfaction of the conditions of the equation (701) means that the luminance signal Y, the color difference signal |R−Y| and the color difference signal |B−Y| of the pixel data supplied from the encoder 37 are substantially equal to the luminance signal $Y_0$, the color difference signal $|R_0-Y_0|$ and the color difference signal $|B_0-Y_0|$ obtained by image pickup of the object set as the target object. Similarly to the operations carried out when the mode 0 is selected, only when the color of the target object is equal to the color indicated by the pixel data as described above, the gate circuit 75 outputs the "Low"-level signal.

3) When the Mode 2 is Selected

The operations carried out when the mode 2 is selected are exactly similar to those carried out when the mode 0 or the mode 1 is selected, and hence need not to be described in detail.

Since the operations are similar to those carried out when the mode 0 is selected, when the mode 2 is selected as the object mode, the calculations carried out by the comparators 73a to 73f, the gate circuits 74a to 74c and the gate circuit 75 can be defined by $$|Y_0|_L \leq Y \leq |Y_0|_U$$

and $$|R_0-Y_0|_L \leq |R-Y| \leq |R_0-Y_0|_L$$

and $$Y \times \alpha_5 \leq |B-Y| \leq Y \times \alpha_6 \tag{702}$$

When the mode 2 is selected, satisfaction of the conditions of the equation (701) means that the luminance signal Y, the color difference signal |R−Y| and the color difference signal |B−Y| of the pixel data supplied from the encoder 37 are substantially equal to the luminance signal $Y_0$, the color difference signal $|R_0-Y_0|$ and the color difference signal $|B_0-Y_0|$ obtained by image pickup of the object set as the target object. Similarly to the operations carried out when the mode 0 is selected, only when the color of the target object is equal to the color indicated by the pixel data as described above, the gate circuit 75 outputs the "Low"-level signal.

4) When the Mode 3 is Selected

The operations carried out when the mode 3 is selected are exactly similar to those carried out when the mode 0, the mode 1 or the mode 2 is selected, and hence need not to be described in detail.

Since the operations are similar to those carried out when the mode 0 is selected, when the mode 3 is selected as the object mode, the calculations carried out by the comparators 73a to 73f, the gate circuits 74a to 74c and the gate circuit 75 can be defined by $$|Y_0|_L \leq Y \leq |Y_0|_U$$

and $$Y \times \alpha_3 \leq |R-Y| \leq Y \times \alpha_4$$

and $$Y \times \alpha_5 \leq |B-Y| \leq Y \times \alpha_6 \tag{703}$$

When the mode 3 is selected, satisfaction of the conditions of the equation (703) means that the luminance signal Y, the color difference signal |R−Y| and the color difference signal

|B−Y| of the pixel data supplied from the encoder 37 are substantially equal to the luminance signal $Y_0$, the color difference signal |$R_0$−$Y_0$| and the color difference signal |$B_0$−$Y_0$| obtained by image pickup of the object set as the target object. Similarly to the operations carried out when the mode 0 is selected, only when the color of the target object is equal to the color indicated by the pixel data as described above, the gate circuit 75 outputs the "Low"-level signal.

Further, a total operation carried out by the area detecting circuit 38 when the mode 0 is selected as the object mode and a plurality of pixel data indicating the same color as that of the target object exist only in the thirty-sixth area $A_{035}$ shown in FIG. 8 will be described with respect to FIG. 9.

The luminance signal Y, the color difference signal |R−Y| and the color difference signal |B−Y| are successively supplied from the encoder 37 to the area detecting circuit 38 so as to correspond to the raster scan. Specifically, the area detecting circuit 38 is supplied with all the pixel data from the encoder 37 and determines whether or not each of the pixel data satisfies the conditions of the equation (700).

Although the area detecting circuit 38 is supplied with all the pixel data, a hardware circuit formed of the switch circuits 72a to 72d, the comparators 73a to 73f and the gate circuits 74a to 74c determines whether or not each of the pixel data satisfies the conditions of the equation (700). Therefore, it is possible to carry out the determination on a real time base without any processing load on the CPU 4.

Since any pixel data indicative of the same color as that of the set target object does not exist in areas other than the area $A_{035}$ in this example, even if any pixel data of the areas other than the area $A_{035}$ are supplied to the area detecting circuit 38, the gate circuit 75 outputs a "High"-level signal. After the area detecting circuit 38 is supplied with the pixel data indicative of the same color of that of the target object in the area $A_{035}$, the gate circuit 75 outputs the "Low"-level signal. At this time, the "Low"-level chip select signal CS is supplied only to the 36th chip circuit corresponding to the area $A_{035}$, while the "High"-level chip select signal is supplied to other chip circuits. The "Low"-level pixel clock signal is supplied to the chip circuits at the timing at which the pixel data indicative of the same color as that of the target object is supplied. Therefore, only when a gate circuit $76a_{035}$ of the 36th chip circuit is supplied with the "Low"-level signal from the gate circuit 75, the "Low"-level pixel clock signal CLK and the "Low"-level chip select signal, the gate circuit $76a_{035}$ supplies a "Low"-level signal to a counter $76b_{035}$. When being supplied with the "Low"-level signal from the gate circuit $76a_{035}$ the counter $76b_{035}$ counts the supply up and, when the count value becomes 5, outputs a flag signal to the multiplexer 77. This operation means that if there are fourteen thousand and forty pixel data in the area $A_{035}$ and there are the five pixel data or greater indicative of the same color as that of the set target object among them, then the chip circuit corresponding to the area $A_{035}$ outputs the flag signal. As a result, in this example, only the counter $76b_{035}$ of the chip circuit corresponding to the area $A_{035}$ outputs the flag signal and the counters 76b corresponding to the area $A_{035}$ other than the area $A_{035}$ are prevented from outputting the flag signal.

The multiplexer 77 outputs the flag signal output from each of the chip circuits to the CPU 4 in correspondence with the area. In this case, the multiplexer outputs to the CPU 4 the flag signal output from the 36th chip circuit corresponding to the area $A_{035}$.

Since the area detecting circuit 38 formed of a hardware is operated as described above, the CPU 4 can recognize on a real time base which area the pixel indicative of the same color as the color of the set target pixel exists in.

An operation of a video camera apparatus will be described with reference to FIGS. 10 to 16 which are flowcharts therefor.

A focus control operation will initially be described.

An autofocus operation will be described with reference to FIGS. 8 to 13 which are flowcharts therefor and FIG. 14. A focus mode is shifted from a manual focus mode to an autofocus mode when a camera man presses an autofocus button provided in an operation button 5. The autofocus mode includes a continuous mode in which the autofocus mode is continued after the button is pressed until a command of mode shift to the manual focus mode is issued, and a non-continuous mode in which, after an object is brought into focus, the autofocus mode is stopped and the mode is automatically shifted to the manual focus mode. The continuous mode will be described in the following explanation with reference to the flowcharts. In processings in steps S100 to S131, it is determined to which direction the lens is to be moved. In processings in steps S201 to S221, the lens position is calculated so that the estimation value should be maximum.

As shown in FIG. 17, in steps S100 to S104, based on a command from the CPU 4, the focus lens is moved to the position $X_1$ which is distant in the Far direction from an initial lens position $X_0$ by a distance of D/2, subsequently moved to a position $X_2$ which is distant in the Near direction from the position $X_1$ by a distance of D, and then moved to a position which is distant from the position $X_2$ in the Far direction by a distance of D/2, i.e., returned to the initial lens position $X_0$. The Near direction depicts a direction in which the lens is moved toward the imaging devices, and the Far direction depicts a direction in which the lens is moved away from the imaging devices. Reference symbol D depicts a focal depth. The microcomputer 64 stores in the RAM 66 the estimation values $Ei(X_0)$, the estimation values $E_f(X_1)$, and the estimation values $E_f(X_2)$ generated in the horizontal-direction estimation value generating circuit 62 and the vertical-direction estimation value generating circuit 63.

The reason for preventing the focus lens from being moved from the position $X_0$ by a distance exceeding D/2 will be described. The focal depth is a data indicating a range within which the lens is in focus around a focus point. Therefore, even if the focus lens is moved within the range of the focal depth, then it is impossible for a man to recognize deviation of focus resulting from such movement. Contrary, when the lens is moved from the position $X_1$ to the position $X_2$, if the lens is moved by a distance exceeding the focal depth, then deviation of the focus resulting from the movement influences the video signal obtained by image pickup. Specifically, when a maximum movement amount of the lens is set within the focal depth, the deviation of the focus cannot be recognized.

The processing in each of steps S100 to S104 will be described in detail with reference to FIG. 17.

In step S100, the microcomputer 64 stores in the RAM 66 the estimation values $E_1(X_0)$ to the estimation values $E_{24}(X_0)$ newly generated by the horizontal-direction estimation value generating circuit 62 and the vertical-direction estimation value generating circuit 63. After finishing storing the above estimation values, the microcomputer 64 issues to the CPU 4 a command to move the focus lens in the Far direction by a distance of D/2.

In step S101, the CPU 4 outputs a command to the focus-lens motor drive circuit 12c to move the focus lens in the Far direction by a distance of D/2.

In step S102, the microcomputer 64 stores in the RAM 66 the estimation values $E_1(X_1)$ to the estimation values $E_{24}(X_1)$ newly generated by the horizontal-direction estimation value generating circuit 62 and the vertical-direction estimation value generating circuit 63. After finishing storing the above estimation values, the microcomputer 64 issues to the CPU 4 a command to move the focus lens in the Near direction by a distance of D.

In step S103, the CPU 4 outputs a command to the focus-lens motor drive circuit 12c to move the focus lens in the Near direction by a distance of D.

In step S104, the microcomputer 64 stores in the RAM 66 the estimation values $E_1(X_2)$ to the estimation values $E_{24}(X_2)$ newly generated by the horizontal-direction estimation value generating circuit 62 and the vertical-direction estimation value generating circuit 63. After finishing storing the above estimation values, the microcomputer 64 issues to the CPU 4 a command to move the focus lens in the Near direction by a distance of D/2.

Therefore, when the processing in step S104 is finished, the estimation values $E_1(X_0)$ to the estimation values $E_{24}(X_0)$ generated when the lens is located at the position $X_0$, the estimation values $E_1(X_1)$ to the estimation values $E_{24}(X_1)$ generated when the lens is located at the position $X_1$, and the estimation values $E_1(X_2)$ to the estimation values $E_{24}(X_2)$ generated when the lens is located at the position $X_0$ are stored in the RAM 66 of the microcomputer 64.

Processings in steps S105 to S115 are processings for selecting an improper estimation value from the twenty-four estimation values.

A basic concept of operations in steps S105 to S115 will be described with reference to FIG. 18A and FIG. 18B.

Figure 18A:
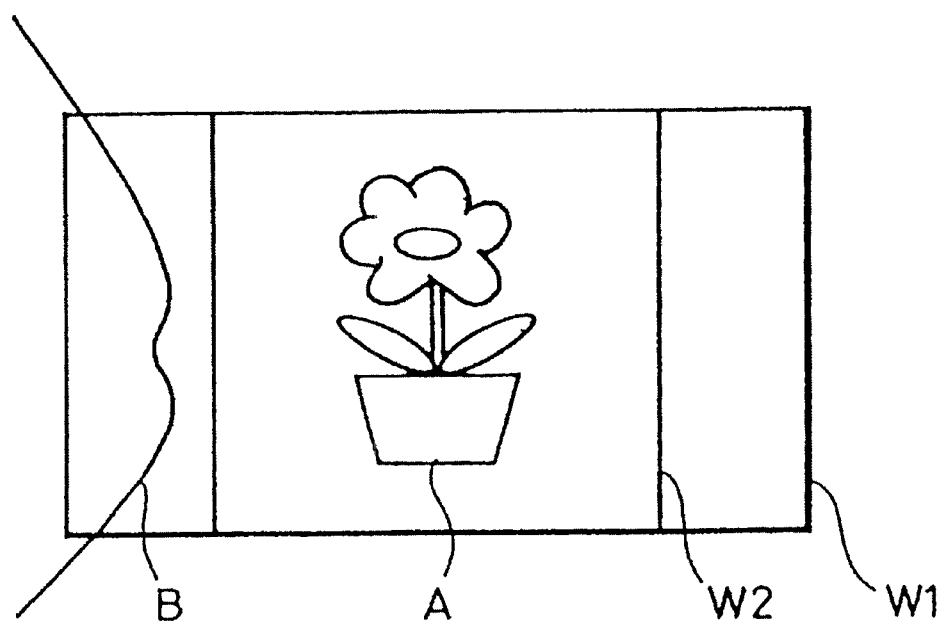
FIGS. 18A and 18B are diagrams showing a state that a non-target object lies in a window.
Figure 18B:
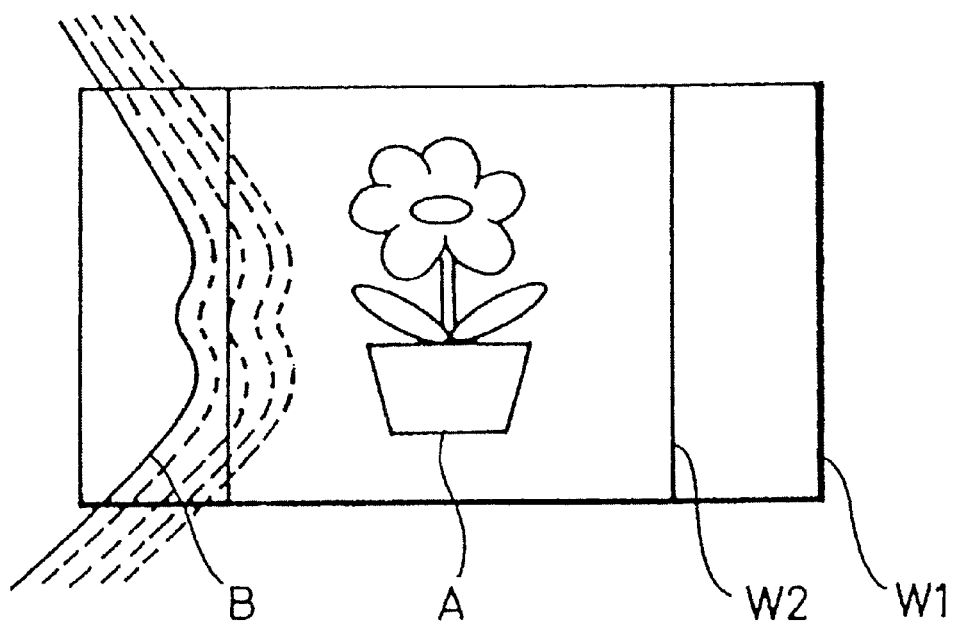

FIGS. 18A and 18B show that a target object A to be brought into focus is imaged in a window W2 and a non-target object B having high contrast and located on the front side of the target object A is imaged in a window W1 but outside of the window W2. At this time, since the object B exists within the window W1, the estimation value $E_1$ generated by the first horizontal-direction estimation value generating circuit 62a having a preset window size value of the window W1 inevitably includes high-frequency components resulting from the object B and hence is improper as the estimation value of the object A. Therefore, the estimation value $E_1$ inevitably becomes considerably large as compared with the estimation value $E_2$ generated by the second horizontal-direction estimation value generating circuit 62b having the preset value of the window W2. Similarly, the estimation value $E_7$ generated by the seventh horizontal-direction estimation value generating circuit 62g having a preset window size value of the window W1 inevitably includes high-frequency components resulting from the object B and hence is improper as the estimation value of the object A. Therefore, the estimation value $E_7$ inevitably becomes considerably large as compared with the estimation value $E_8$ generated by the eighth horizontal-direction estimation value generating circuit 62h having the preset value of the window W2.

It is not always determined that the estimation value $E_2$ or the estimation value $E_8$ is proper on the basis of only the fact that the non-target object B does not exist in the window W2. The reason for this will be described with reference to FIG. 18B. FIG. 18B shows windows obtained when the lens is moved so as to be focused on the object A. The more the lens is adjusted so as to be focused on the object A, the more the lens becomes considerably out of focus with respect to the object B. When the lens becomes considerably out of focus with respect to the object B, an image of the object B becomes blurred considerably and the blurred image thereof enters the window W2. Therefore, in a state shown in FIGS. 18A and 18B, the estimation value $E_2$ generated by the second horizontal-direction estimation value generating circuit 62b having the preset value of the window W2 is not always proper. Similarly, the estimation value $E_8$ generated by the eighth horizontal-direction estimation value generating circuit 62h having the preset value of the window W2 is not always proper.

As described above, in order to determine whether or not the estimation values $E_1$ and $E_7$ obtained from the window W1 and the estimation values $E_2$ and $E_8$ obtained from the window W2 are proper, it is sufficient to discriminate whether or not $$|E_1-E_2| \leq E_1 \times \beta$$

and $$|E_7-E_8| \leq E_7 \times \beta \qquad (3)$$

are satisfied. $\beta$ is a coefficient previously set based on an experimental result. While in this embodiment the value thereof is set to $\beta=0.01$, if predetermined values obtained from experiments are used instead of $(E_1 \times \beta)$ and $(E_7 \times \beta)$, it is possible to obtain the same result without $(E_1 \times \beta)$ and $(E_7 \times \beta)$ being used in the equation (3).

In the determination based on the calculated result of the equation (3), if both of values of $|E_1-E_2|$ and $|E_7-E_8|$ are smaller than a predetermined value, then it can be determined that there is almost no difference between the estimation values $E_1$ and $E_2$ and it can be determined that there is almost no difference between the estimation values $E_7$ and $E_8$. Therefore, it is determined that there is no object such as the non-target object B shown in FIG. 18A. If both of values of $|E_1-E_2|$ and $|E_7-E_8|$ are larger than a predetermined value, then it can be determined that there is some difference between the estimation values $E_1$ and $E_2$ and it can be determined that there is some difference between the estimation values $E_7$ and $E_8$. Therefore, it is determined that there is an object such as the non-target object B shown in FIG. 18A. Specifically, when the equation (3) is calculated, if the equation (3) is satisfied, then the estimation values $E_1$ and $E_2$ and the estimation values $E_7$ and $E_8$ are proper. If on the other hand the equation (3) is not satisfied, then each of the estimation values $E_1$ and $E_2$ and the estimation values $E_7$ and $E_8$ is not proper.

Figure 10:
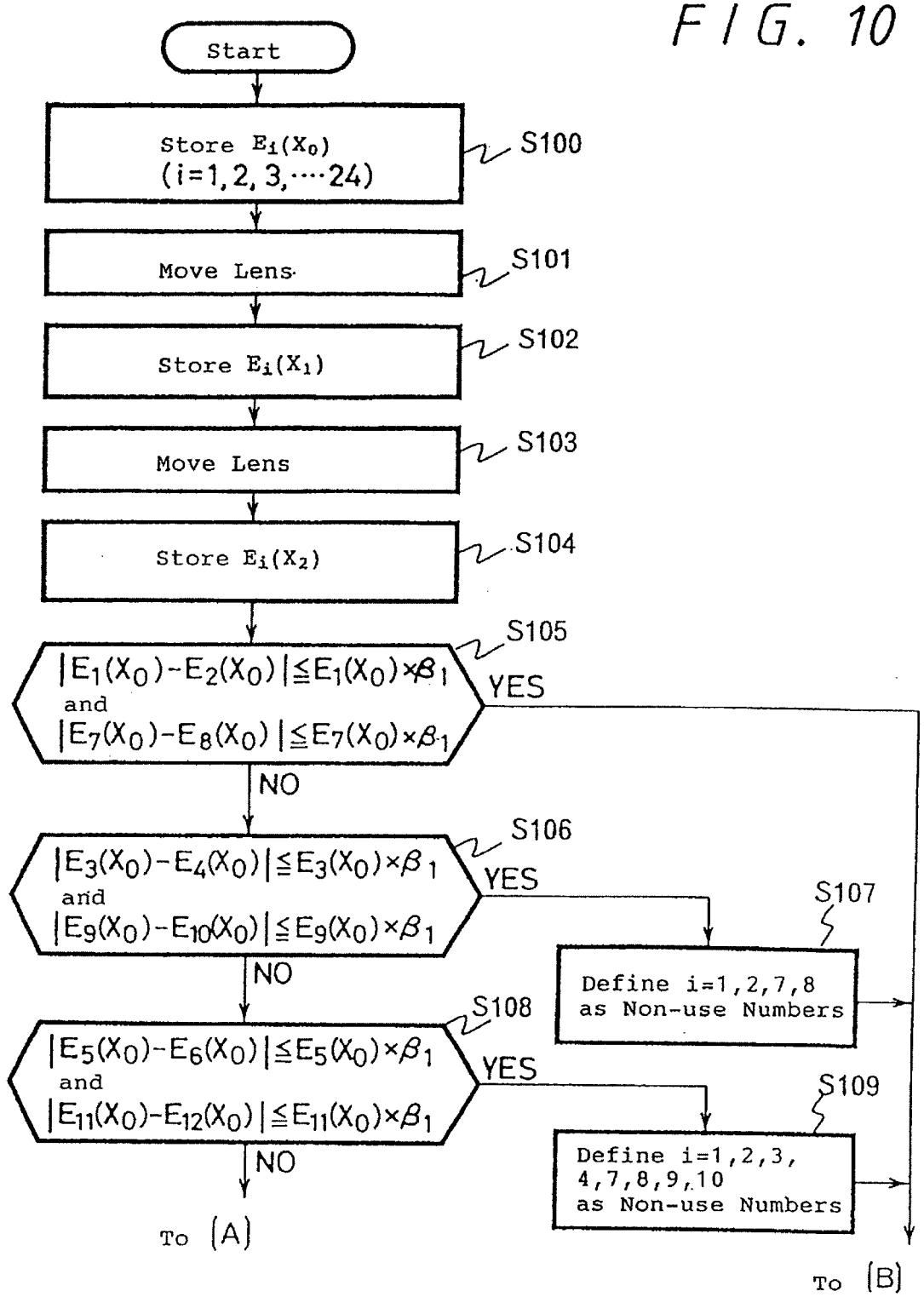
FIGS. 10 to 15 are flowcharts used to explain an autofocus operation.
Figure 11:
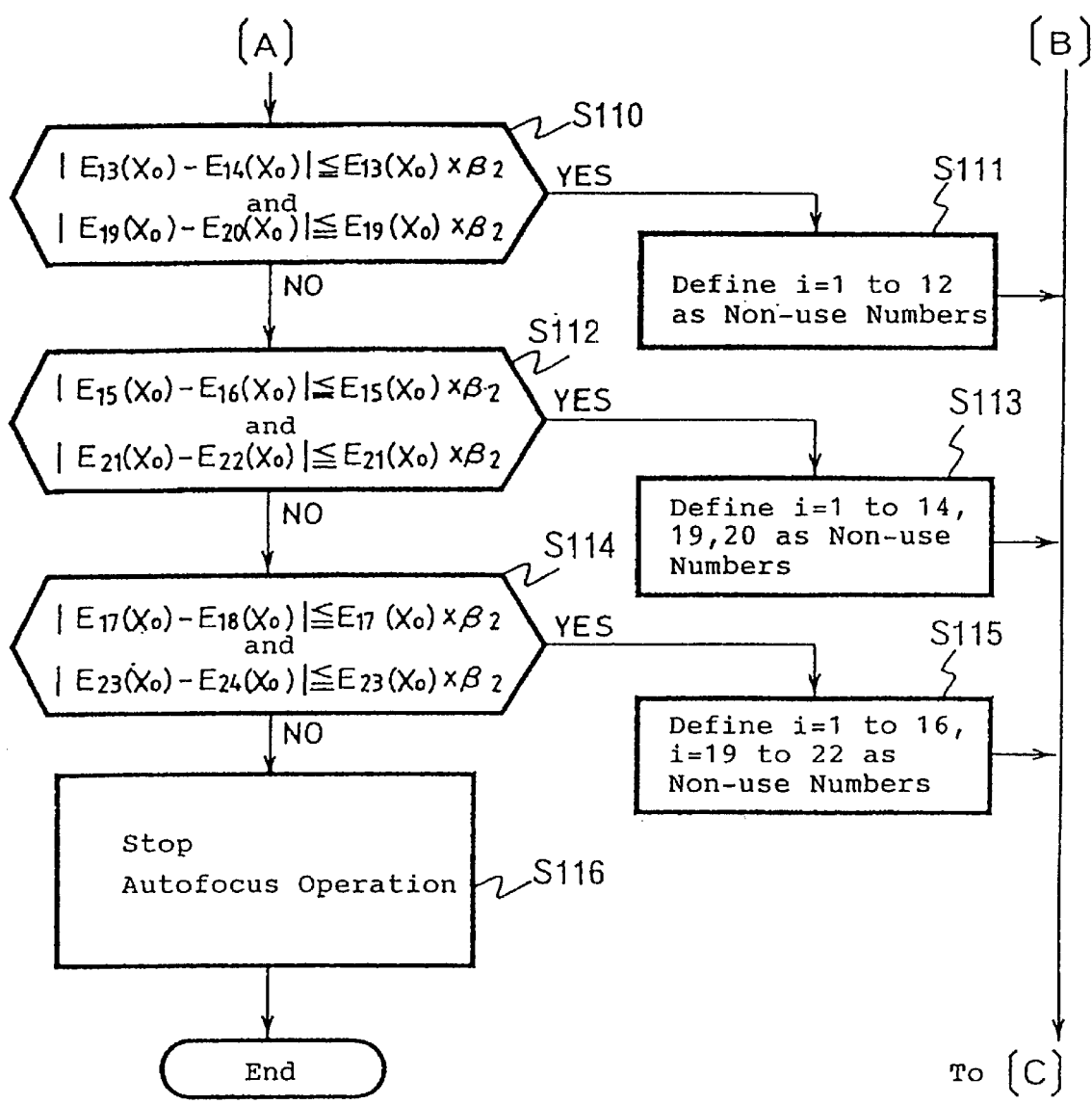

In consideration of the above basic concept, the processings in steps S105 to S115 will specifically be described with reference to FIGS. 10 and 11.

In step S105, it is determined by using the estimation values $E_1(X_0)$ to $E_{24}(X_0)$ obtained when the lens is located at the position $X_0$ whether or not $$|E_1(X_0)-E_2(X_0)| \leq E_1(X_0) \times \beta_1$$

and $$|E_7(X_0)-E_8(X_0)| \leq E_7(X_0) \times \beta_1 \qquad (105)$$

are satisfied. If the estimation values $E_1$, $E_2$, $E_7$, $E_8$ satisfy the equation (105), then it is determined that the estimation values $E_1$, $E_2$, $E_7$, $E_8$ are proper values, and then the processing proceeds to step S117. If on the other hand the estimation values $E_1$, $E_2$, $E_7$, $E_8$ do not satisfy the equation (105), then it is determined that at least the estimation values $E_1$, $E_2$, $E_7$, $E_8$ are improper values, and then the processing proceeds to step S106.

Since it is determined based on the calculated result of step S105 that the estimation values $E_1$, $E_2$, $E_7$, $E_8$ are improper, in step S106, the estimation values $E_3$ and $E_9$ obtained from the window W3 which is a large window next to the window W1 are used and the estimation values $E_4$ and $E_{10}$ obtained from the window W4 which is a large window next to the window W2 are used.

In step S106, similarly to step S105, it is determined by using the estimation values $E_1(X_0)$ to $E_{24}(X_0)$ obtained when the lens is located at the position $X_0$ whether or not $$|E_3(X_0)-E_4(X_0)| \leq E_3(X_0) \times \beta_1$$

and $$|E_9(X_0)-E_{10}(X_0)| \leq E_9(X_0) \times \beta_1 \qquad (106)$$

are satisfied. If the estimation values $E_3$, $E_4$, $E_9$, $E_{10}$ satisfy the equation (106), then it is determined that the estimation values $E_3$, $E_4$, $E_9$, $E_{10}$ are proper values, and then the processing proceeds to step S107. If on the other hand the estimation values $E_3$, $E_4$, $E_9$, $E_{10}$ do not satisfy the equation (106), then it is determined that at least the estimation values $E_3$, $E_4$, $E_9$, $E_{10}$ are improper values, and then the processing proceeds to step S108.

The reason for employing the windows W3 and W4 having larger sizes will be described. As described above, since the estimation values $E_1$ and $E_2$ and the estimation values $E_7$ and $E_8$ are improper in the state shown in FIG. 18A, it is impossible to bring either the target object A or the non-target object B into focus. However, when the windows W3 and W4 larger than the windows W1 and W2 are used, it is considered that the non-target object B lies in the range of the window W4. If the whole non-target object B lies within the window W4, then difference between the estimation value $E_3$ and the estimation value $E_4$ becomes small and difference between the estimation value $E_9$ and the estimation value $E_{10}$ becomes small. Specifically, it is determined that the estimation values $E_3$, $E_4$, $E_9$, and $E_{10}$ satisfy the equation (106). As a result, since the estimation values $E_3$, $E_4$, $E_9$, and $E_{10}$ become proper values, the non-target object B is brought into focus. Indeed, the lens should be focused on the target object A. But, if the lens is adjusted so as to be focused on the object A, then it is impossible to obtain the proper estimation values. As a result, the autofocus control circuit 34 repeatedly executes the processing of a control loop and keeps the focus lens moving for a long time. Therefore, while the autofocus control circuit repeatedly executes the control loop, the video signal indicative of a blurred image must continuously be output. However, if the lens is focused on the non-target object B, then it is possible to prevent the video signal indicative of the blurred image from being output continuously by repeating the control loop for a long period of time.

In step S107, numbers of i=1, 2, 7, 8 are defined as non-use numbers based on the result in step S105 that the estimation values $E_1$, $E_2$, $E_7$, and $E_8$ are improper values and on the result in step S106 that the estimation values $E_3$, $E_4$, $E_9$, and $E_{10}$ are proper values. Then, the processing proceeds to step S117. Since in step S107 the numbers of i=1, 2, 7, 8 are defined as the non-use numbers, the estimation values $E_1$, $E_2$, $E_7$, and $E_8$ will not be used in step S107 and the succeeding steps.

In step S108, since it is determined based on the result of the calculation in step S106 that the estimation values $E_3$, $E_4$, $E_9$, and $E_{10}$ are improper, the estimation values $E_5$ and $E_{11}$ obtained from the window W5 which is large next to the window W3 are used and the estimation values $E_6$ and $E_{12}$ obtained from the window W6 which is large next to the window W4 are used.

In step S108, similarly to step S106, it is determined by using the estimation values $E_1(X_0)$ to $E_{24}(X_0)$ generated when the lens is located at the position $X_0$, whether $$|E_5(X_0)-E_6(X_0)| \leq E_5(X_0) \times \beta_1$$

and $$|E_{11}(X_0)-E_{12}(X_0)| \leq E_{11}(X_0) \times \beta_1 \qquad (108)$$

are satisfied. If the estimation values $E_5$, $E_6$, $E_{11}$, $E_{12}$ satisfy the equation (108), then it is determined that the estimation values $E_5$, $E_6$, $E_{11}$, $E_{12}$ are proper values, and then the processing proceeds to step S109. If on the other hand the estimation values $E_5$, $E_6$, $E_{11}$, $E_{12}$ do not satisfy the equation (108), then it is determined that at least the estimation values $E_5$, $E_6$, $E_{11}$, $E_{12}$ are improper values, and then the processing proceeds to step S110.

In step S109, only numbers of i=1, 2, 3, 4, 7, 8, 9, 10 are defined as non-use numbers based on the result in step S105 that the estimation values $E_1$, $E_2$, $E_7$, and $E_8$ are improper values, on the result in step S106 that the estimation values $E_3$, $E_4$, $E_9$, and $E_{10}$ are improper values, and on the result in step S108 that the estimation values $E_5$, $E_6$, $E_{11}$, and $E_{12}$ are proper values. Then, the processing proceeds to step S117. Since in step S109 the numbers of i=1, 2, 3, 4, 7, 8, 9, 10 are defined as the non-use numbers, the estimation values $E_1$, $E_2$, $E_3$, $E_4$, $E_7$, $E_8$, $E_9$ and $E_{10}$ will not be used in step S109 and the succeeding steps.

In step S108, since it is determined based on the result of the calculation in step S106 that the estimation values $E_3$, $E_4$, $E_9$, and $E_{10}$ are improper, the estimation values $E_5$ and $E_{11}$ obtained from the window W5 which is large next to the window W3 are used and the estimation values $E_6$ and $E_{12}$ obtained from the window W6 which is large next to the window W4 are used.

In step S110, similarly to step S108, it is determined by using the estimation values $E_1(X_0)$ to $E_{24}(X_0)$ generated when the lens is located at the position $X_0$, whether $$|E_{13}(X_0)-E_{14}(X_0)| \leq E_{13}(X_0) \times \beta_2$$

and $$|E_{19}(X_0)-E_{20}(X_0)| \leq E_{19}(X_0) \times \beta_2 \qquad (110)$$

are satisfied. If the estimation values $E_{13}$, $E_{14}$, $E_{19}$, $E_{20}$ satisfy the equation (110), then it is determined that the estimation values $E_{13}$, $E_{14}$, $E_{19}$, $E_{20}$ are proper values, and then the processing proceeds to step S111. If on the other hand the estimation values $E_{13}$, $E_{14}$, $E_{19}$, $E_{20}$ do not satisfy the equation (110), then it is determined that at least the estimation values $E_{13}$, $E_{14}$, $E_{19}$, $E_{20}$ are improper values, and then the processing proceeds to step S112.

In step S111, only numbers of i=1 to 12 are defined as non-use numbers based on the result in step S105 that the estimation values $E_1$, $E_2$, $E_7$, and $E_8$ are improper values, on the result in step S106 that the estimation values $E_3$, $E_4$, $E_9$, and $E_{10}$ are improper values, on the result in step S108 that the estimation values $E_5$, $E_6$, $E_{11}$, and $E_{12}$ are improper values, and on the result in step S110 that the estimation values $E_{13}$, $E_{14}$, $E_{19}$, and $E_{20}$ are proper values. Then, the processing proceeds to step S117. Since in step S111 the numbers of i=1 to 12 are defined as the non-use numbers, the estimation values $E_1$ to $E_{12}$ will not be used in step S111 and the succeeding steps.

In step S112, similarly to step S110, it is determined by using the estimation values $E_1(X_0)$ to $E_{24}(X_0)$ generated when the lens is located at the position $X_0$, whether $$|E_{15}(X_0)-E_{16}(X_0)| \leq E_{15}(X_0) \times \beta_2$$

and $$|E_{21}(X_0)-E_{22}(X_0)| \leq E_{21}(X_0) \times \beta_2 \quad (112)$$

are satisfied. If the estimation values $E_{15}$, $E_{16}$, $E_{21}$, $E_{22}$ satisfy the equation (112), then it is determined that the estimation values $E_{15}$, $E_{16}$, $E_{21}$, $E_{22}$ are proper values, and then the processing proceeds to step S113. If on the other hand the estimation values $E_{15}$, $E_{16}$, $E_{21}$, $E_{22}$ do not satisfy the equation (112), then it is determined that at least the estimation values $E_{15}$, $E_{16}$, $E_{21}$, $E_{22}$ are improper values, and then the processing proceeds to step S114.

In step S113, only numbers of i=1 to 14, 19 and 20 are defined as non-use numbers based on the result in step S105 that the estimation values $E_1$, $E_2$, $E_7$, and $E_8$ are improper values, on the result in step S106 that the estimation values $E_3$, $E_4$, $E_9$, and $E_{10}$ are improper values, on the result in step S108 that the estimation values $E_5$, $E_6$, $E_{11}$, and $E_{12}$ are improper values, on the result in step S110 that the estimation values $E_{13}$, $E_{14}$, $E_{19}$, and $E_{20}$ are improper values, and on the result in step S112 that the estimation values $E_{15}$, $E_{16}$, $E_{21}$, and $E_{22}$ are proper values. Then, the processing proceeds to step S117. Since in step S113 the numbers of i=1 to 12, 19 and 20 are defined as the non-use numbers, the estimation values $E_1$ to $E_{14}$, $E_{19}$ and $E_{20}$ will not be used in step S113 and the succeeding steps.

In step S114, similarly to step S110, it is determined by using the estimation values $E_1(X_0)$ to $E_{24}(X_0)$ generated when the lens is located at the position $X_0$, whether $$|E_{17}(X_0)-E_{18}(X_0)| \leq E_{17}(X_0) \times \beta_2$$

and $$|E_{23}(X_0)-E_{24}(X_0)| \leq E_{23}(X_0) \times \beta_2 \quad (114)$$

are satisfied. If the estimation values $E_{17}$, $E_{18}$, $E_{23}$, $E_{24}$ satisfy the equation (114), then it is determined that the estimation values $E_{17}$, $E_{18}$, $E_{23}$, $E_{24}$ are proper values, and then the processing proceeds to step S115. If on the other hand the estimation values $E_{17}$, $E_{18}$, $E_{23}$, $E_{24}$ do not satisfy the equation (114), then it is determined that at least the estimation values $E_{17}$, $E_{18}$, $E_{23}$, $E_{24}$ are improper values, and then the processing proceeds to step S116.

In step S115, only numbers of i=1 to 16 and 19 to 22 are defined as non-use numbers based on the result in step S105 that the estimation values $E_1$, $E_2$, $E_7$, and $E_8$ are improper values, on the result in step S106 that the estimation values $E_3$, $E_4$, $E_9$, and $E_{10}$ are improper values, on the result in step S108 that the estimation values $E_5$, $E_6$, $E_{11}$, and $E_{12}$ are improper values, on the result in step S110 that the estimation values $E_{13}$, $E_{14}$, $E_{19}$, and $E_{20}$ are improper values, on the result in step S112 that the estimation values $E_{15}$, $E_{16}$, $E_{21}$, and $E_{22}$ are improper values, and on the result in step S114 that the estimation values $E_{17}$, $E_{18}$, $E_{23}$, and $E_{24}$ are proper values. Then, the processing proceeds to step S117. Since in step S115 the numbers of i=1 to 16 and 19 to 22 are defined as the non-use numbers, the estimation values $E_1$ to $E_{16}$ and $E_{19}$ to $E_{22}$ will not be used in step S115 and the succeeding steps.

When the processing reaches step S116, it is inevitably determined that all the estimation values $E_1$ to $E_{24}$ are improper. Therefore, it is determined that the autofocus operation cannot be carried out. Then, the mode is shifted to the manual focus mode and the processing is ended.

Then, the processings in steps for selecting the improper estimation values from the twenty-four estimation values is ended.

Figure 12:
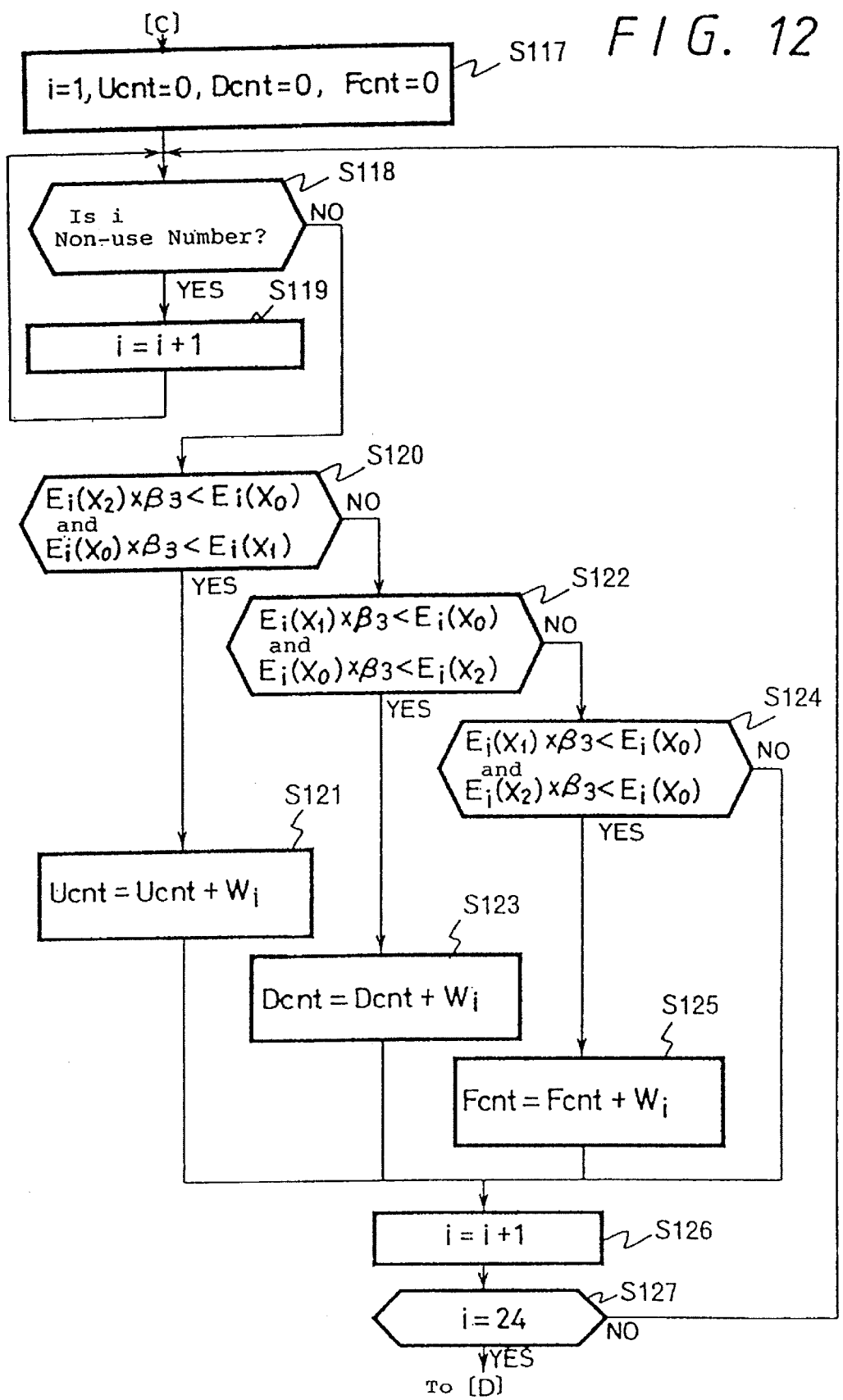
Figure 13:
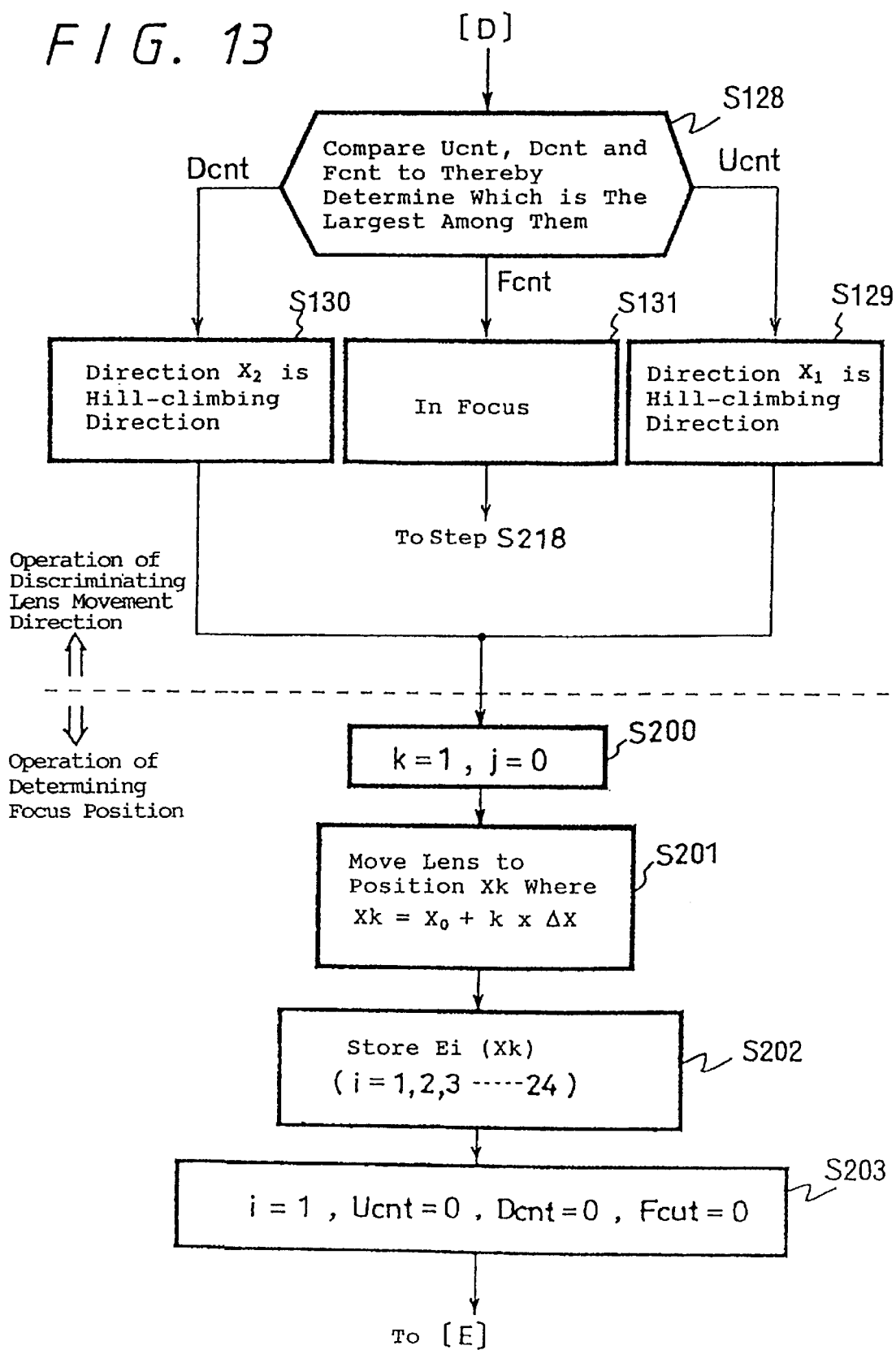
Figure 14:
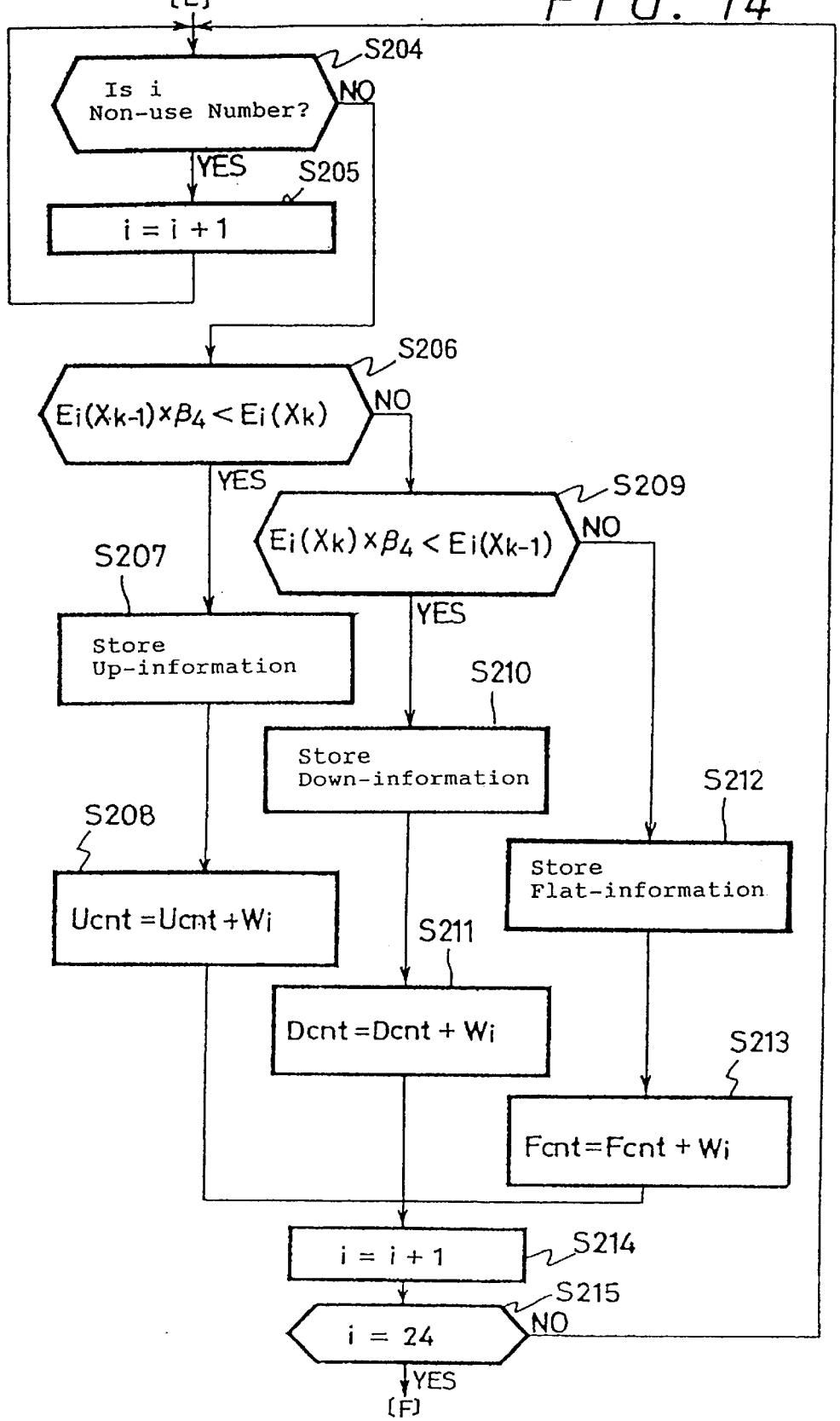
Figure 15:
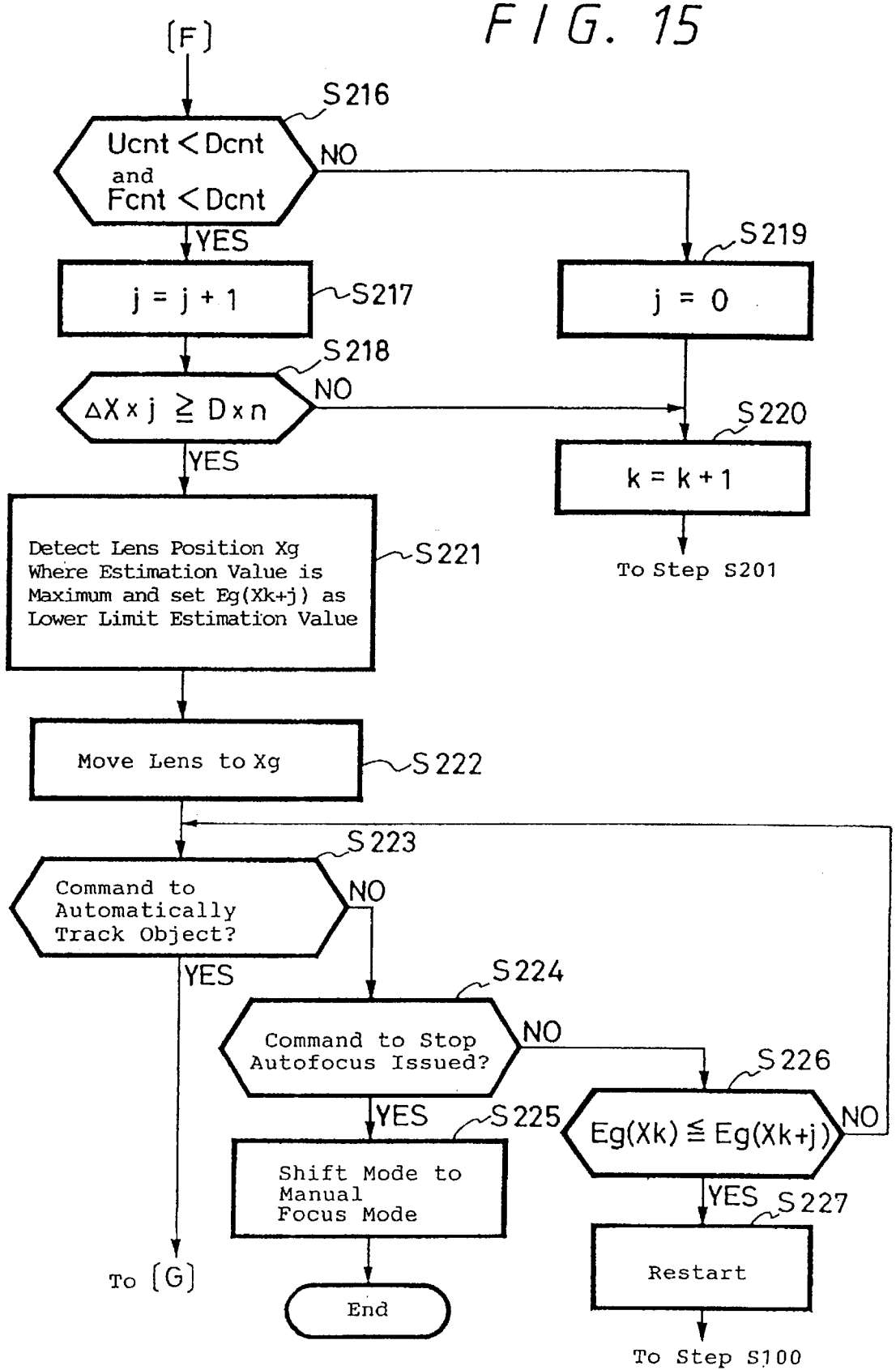

As shown in FIGS. 12 and 13, processings in steps S117 to S131 are those in flowcharts for a specific operation for determining the lens movement direction. Processings in steps S117 to S131 are those carried out by the microcomputer 64.

In step S117, the number is set to i=1 and a count-up value $U_{cnt}$, a count-down value $D_{cnt}$ and a flat count value $F_{cnt}$ are reset.

In step S118, it is determined whether or not the number i is a number defined as a non-use number. If it is determined that the number i is not defined as the non-use number, then the processing proceeds to step S120. If it is determined that the number i is defined as the non-use number, then in step S119 the number i is incremented and then the next number of i is determined.

A processing in step S120 is a processing carried out when the estimation value $E_i(X_0)$ has not a value substantially equal to $E_i(X_2)$ but a value larger than $E_i(X_2)$ to some degree and when the estimation value $E_i(X_1)$ has not a value substantially equal to $E_i(X_0)$ but a value larger than $E_i(X_0)$ to some degree. To facilitate this processing further, the processing is that of determining, if the focus lens is moved in the Far direction from the position $X_2$ through the position $X_0$ to the position $X_1$, whether or not the estimation values are increased in an order of the estimation values $E_i(X_2)$, $E_i(X_0)$, $E_i(X_1)$. Specifically, it is determined by calculating the following equations;

$$E_i(X_2) \times \beta_3 < E_i(X_0)$$

and $$E_i(X_0) \times \beta_3 < E_i(X_1) \quad (120)$$

where $\beta_3$ is a coefficient experimentally obtained and set to $\beta_3 = 1.03$ in this embodiment. If the above estimation values satisfy the equation (120), it means that as the focus lens is moved from the position $X_2$ through the position $X_0$ to the position $X_1$, the estimation values are increased in an order of the estimation values corresponding thereto. Then, the processing proceeds to the next step S121. If the above estimation values do not satisfy the equation (120), then the processing proceeds to step S122.

In step S121, the count-up value $U_{cnt}$ is added with the weight data Wi, and then the processing proceeds to step S126.

A processing in step S122 is a processing carried out when the estimation value $E_i(X_0)$ has not a value substantially equal to $E_i(X_1)$ but a value larger than $E_i(X_1)$ to some degree and when the estimation value $E_i(X_2)$ has not a value substantially equal to $E_i(X_0)$ but a value larger than $E_i(X_0)$ to some degree. To facilitate this processing further, the processing is that of determining, if the focus lens is moved in the Far direction from the position $X_2$ through the position $X_0$ to the position $X_1$, whether or not the estimation values are decreased in an order of the estimation values $E_i(X_2)$, $E_i(X_0)$, $E_i(X_1)$. Specifically, it is determined by calculating the following equations;

$$E_i(X_1) \times \beta_3 < E_i(X_0)$$

and $$E_i(X_0) \times \beta_3 < E_i(X_2) \quad (122).$$

If the above estimation values satisfy the equation (122), it means that as the focus lens is moved from the position $X_2$ through the position $X_0$ to the position $X_1$, the estimation values are decreased in an order of the estimation values corresponding thereto. Then, the processing proceeds to the next step S123. If the above estimation values do not satisfy the equation (122), then the processing proceeds to step S124.

In step S123, the count-down value $D_{cnt}$ is added with the weight data Wi, and then the processing proceeds to step S126.

A processing in step S124 is a processing carried out when the estimation value $E_i(X_0)$ has not a value substantially equal to $E_i(X_1)$ but a value larger than $E_i(X_1)$ to some degree and when the estimation value $E_i(X_0)$ has not a value substantially equal to $E_i(X_2)$ but a value larger than $E_i(X_2)$ to some degree. To facilitate this processing further, the processing is that of determining, if the focus lens is moved in the Far direction from the position $X_2$ through the position $X_0$ to the position $X_1$, whether the peak of the estimation values lies in the estimation value $E_i(X_0)$. Specifically, it is determined by calculating the following equations;

$$E_i(X_1) \times \beta_3 < E_i(X_0)$$

and $$E_i(X_2) \times \beta_3 < E_i(X_0) \quad (124).$$

If the above estimation values satisfy the equation (124), it means that when the focus lens is moved from the position $X_2$ through the position $X_0$ to the position $X_1$, the peak value of the estimation values is the estimation value $E_i(X_0)$. Then, the processing proceeds to the next step S125. If the above estimation values do not satisfy the equation (120), then the processing proceeds to step S126.

In step S125, the flat-count value $F_{cnt}$ is added with the weight data Wi, and then the processing proceeds to step S126.

In step S126, the number of i is incremented, and then the processing proceeds to step S127.

In step S127, it is determined whether or not the number of i is 24 because the horizontal-direction estimation value generating circuit 62 and the vertical-direction estimation value generating circuit 63 generate the twenty-four estimation values E. If the value of i is 24, then it is determined that calculations of all the estimation values are finished, and then the processing proceeds to step S128. If the value of i is not 24, then the processing loop formed of steps S118 to S127 is repeatedly carried out.

In step S128, it is determined by comparing the count-up value $U_{cnt}$, the count-down value $D_{cnt}$ and the flat-count value $F_{cnt}$, which is the largest value among the above count values. If it is determined that the count-up value $U_{cnt}$ is the largest, then the processing proceeds to step S129. If it is determined that the count-down value $D_{cnt}$ is the largest, then the processing proceeds to step S130. If it is determined that the flat-count value $F_{cnt}$ is the largest, then the processing proceeds to step S131.

In step S129, the microcomputer 64 determines that the direction toward the position $X_1$ is the hill-climbing direction of the estimation value, i.e., the direction in which the lens is to be in focus, and then supplies to the CPU 4 a signal designating the Far direction as the lens movement direction.

In step S130, the microcomputer 64 determines that the direction toward the position $X_2$ is the hill-climbing direction of the estimation value, i.e., the direction in which the lens is to be in focus, and then supplies to the CPU 4 a signal designating the Near direction as the lens movement direction.

In step S131, the microcomputer 64 determines that the position $X_o$ is the position at which the lens is in focus, and then the processing proceeds to step S218.

Figure 19:
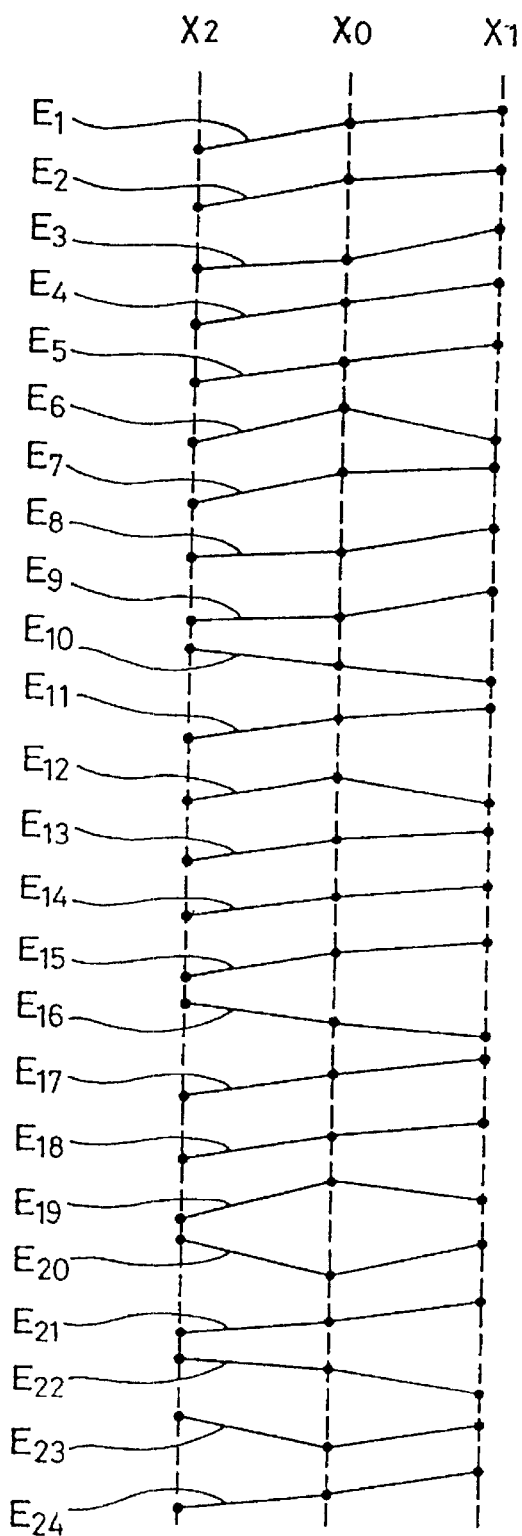
FIG. 19 is a diagram showing fluctuation of estimation values stored in a RAM 66 when the lens movement direction is determined.

The operations in steps S118 to S131 will plainly be described with reference to the example shown in FIG. 19. FIG. 19 is a diagram showing transition of change of the estimation values $E_i(X_2)$, $E_i(X_0)$, $E_i(X_1)$ respectively obtained when the lens is located at the lens positions $X_2$, $X_0$, $X_1$, by way of example.

Initially, it is determined in step S118 whether or not the number of i is the non-use number. In this case, it is assumed that all the numbers of i are numbers of the estimation values which can be used.

In the first processing loop, the estimation values $E_1$ are estimated. Since $E_1(X_2) < E_1(X_0) < E_1(X_1)$ is established, then this relationship satisfies the condition in step S120 and hence the processing proceeds to step S121. Therefore, in step S121, the calculation of $U_{cnt} = 0 + W_1$ is carried out.

In the second processing loop, the estimation values $E_2$ are estimated. Since $E_2(X_2) < E_2(X_0) < E_2(X_1)$ is established, then this relationship satisfies the condition in step S120 and hence the processing proceeds to step S121. Therefore, in step S121, the calculation of $U_{cnt} = W_1 + W_2$ is carried out.

In the third, fourth and fifth processing loops, the calculations similar to those carried out in the first and second processing loops are carried out. In step S121 of the fifth processing loop, the calculation of $U_{cnt} = W_1 + W_2 + W_3 + W_4 + W_5$ is carried out.

In the sixth processing loop, the estimation values $E_6$ are estimated. Since $E_2(X_2) < E_2(X_0) > E_2(X_1)$ is established, then this relationship satisfies the condition in step S124 and hence the processing proceeds to step S125. Therefore, in step S125, the calculation of $F_{cnt} = 0 + W_6$ is carried out.

After the processing loops are repeatedly carried out twenty-four times as described above, finally the calculation of $$U_{cnt} = W_1 + W_2 + W_3 + W_4 + W_5 + W_7 + W_8 + W_9 + W_{11} + W_{13} + W_{14} + W_{15} + W_{17} + W_{18} + W_{21} + W_{24}$$

$$D_{cnt} = W_{10} + W_{16} + W_{22}$$

$$F_{cnt} = W_6 + W_{12} + W_{19}$$

has been carried out. If the values of the weight data $W_i$ shown in FIG. 7 by way of example are substituted for the above count-up value $U_{cnt}$, the above count-down value $D_{cnt}$ and the above flat count value $F_{cnt}$, then the following results are obtained.

$U_{cnt} = 124$ $D_{cnt} = 13$ $F_{cnt} = 18$

Therefore, since the count-up value $U_{cnt}$ has the largest value among them at the time of determination in step S128, the processing proceeds to step S129 in the example shown in FIG. 19. As a result, the direction toward $X_1$ is determined as the focus direction.

Processings in steps S200 to S221 are those for determining the lens position at which the estimation value becomes maximum. The flowcharts used to explain the processings are those carried out by the microcomputer 64. The processings in steps S200 to S221 will specifically be described with reference to FIGS. 13 to 15.

For clear explanation of the processings in step S200 and the succeeding steps, the following equations are defined.

$$X_1 = X_0 + \Delta X \quad (200)$$

$$X_2 = X_0 + 2 \times \Delta X$$

-continued $$X_3 = X_0 + 3 \times \Delta X$$

$$\vdots$$

$$X_k = X_0 + k \times \Delta X$$

$$X_{k+1} = X_0 + (k+1) \times \Delta X$$

$$\vdots$$

$$X_{k+j} = X_0 + (k+j) \times \Delta X$$

Since the estimation value is sampled in every field in this embodiment, a distance depicted by $\Delta X$ is defined as a distance by which the focus lens is moved in one field. Therefore, the distance $\Delta X$ depicts the distance by which the lens is moved in one field period. This distance $\Delta X$ not only depicts the distance by which the lens is moved in one field period but also has a polarity of $\Delta X$ determined based on the lens movement direction obtained in the processing in steps S100 to S130. For example, if the lens movement direction is the Far direction, the value of the distance $\Delta X$ is set so as to have a positive polarity. If the lens movement direction is the Near direction, the value of the distance $\Delta X$ is set so as to have a negative polarity.

A sampling frequency is not limited to this embodiment. For example, the sampling may be carried out twice per one field, and th e change can be properly effected.

In step S200, K=1 is set.

In step S201, the microcomputer 64 issues to the CPU 4 a command to move the lens to a position $X_k$. The lens position $X_k$ is defined based on equation (200) as $$X_k = X_0 + k \times \Delta X$$

In step S202, the microcomputer 64 stores in the RAM 66 the estimation values $E_1(X_k)$ to the estimation values $E_{24}(X_k)$ newly generated by the horizontal-direction estimation value generating circuit 62 and the vertical-direction estimation value generating circuit 63. The twenty-four estimation values $E_i$ are stored as a table shown in FIG. 16.

In step S203, i=1 and j=1 are set, and the count-up value $U_{cnt}$, the count-down value $D_{cnt}$ and the flat count value $F_{cnt}$ are reset.

In step S204, it is determined whether or not the number of i is defined as the non-use number. If the number of i is not defined as the non-use number, then the processing proceeds to step S206. If the number of i is defined as the non-use number, then in step S205 the value of i is incremented and the processing returns to step S204 again.

In step S206, it is determined whether or not the estimation values $E_i(X_k)$ obtained when the focus lens is moved from a position $X_{k-1}$ to a position $X_k$ are increased to a certain degree or more as compared with the estimation values $E_i(X_{k-1})$. Specifically, it is determined based on a calculation of $$E_i(X_{k-1}) \times \beta_4 < E_i(X_k) \quad (206)$$

where $\beta_4$ is a coefficient experimentally obtained and is set to $\beta_4 = 1.05$ in this embodiment. The satisfaction of the condition of the equation (206) leads to the fact that the estimation values $E_i(X_k)$ are increased to a certain degree or more as compared with the estimation values $E_i(X_{k-1})$. In this case, the processing proceeds to the next step S207. If the condition of the equation (206) is not satisfied, then the processing proceeds to step S209.

In step S207, since the estimation values $E_i(X_k)$ are increased to a certain degree or more as compared with the estimation values $E_i(X_{k-1})$, a 2-bit data "01" indicative of increase of the estimation value is stored in the RAM 66 as a U/D information (up/down information) in connection with the estimation value $E_i(X_k)$.

In step S208, similarly to step S121, the count-up value $U_{cnt}$ is added with the weight data $W_i$, and then the processing proceeds to step S214.

In step S209, it is determined whether or not the estimation values $E_i(X_k)$ obtained when the focus lens is moved from the position $X_{k-1}$ to the position $X_k$ are decreased to a certain degree or more as compared with the estimation values $E_i(X_{k-1})$. Specifically, it is determined based on a calculation of $$E_i(X_k) \times \beta_4 < E_i(X_{k-1}) \quad (209)$$

The satisfaction of the condition of the equation (209) leads to the fact that the estimation values $E_i(X_k)$ are decreased to a certain degree or more as compared with the estimation values $E_i(X_{k-1})$. In this case, the processing proceeds to the next step S210. If the condition of the equation (209) is not satisfied, then the processing proceeds to step S212.

In step S210, since the estimation values $E_i(X_k)$ are decreased to a certain degree or more as compared with the estimation values $E_i(X_{k-1})$, a 2-bit data "10" indicative of decrease of the estimation value is stored in the RAM 66 as the U/D information (up/down information) in connection with the estimation value $E_i(X_k)$.

In step S211, similarly to step S123, the count-down value $D_{cnt}$ is added with the weight data $W_i$, and then the processing proceeds to step S214.

In consideration of the conditions of the processings in step S206 and S209, the fact that the processing reaches step S212 means that the estimation values $E_i(X_k)$ obtained when the focus lens is moved from the position $X_{k-1}$ to the position $X_k$ are not changed to a certain degree or more relative to the estimation values $E_i(X_{k-1})$.

Therefore, in step S212, a 2-bit data "00" indicative of flatness of the estimation value is stored in the RAM 66 as the U/D information (up/down information) in connection with the estimation value $E_i(X_k)$.

In step S213, similarly to step S125, the flat-count value $F_{cnt}$ is added with the weight data $W_i$, and then the processing proceeds to step S214.

In step S214, the value of i is incremented, and then the processing proceeds to step S215.

In step S215, it is determined whether or not the value of i is 24. If it is determined that the value of i is 24, then it is determined that calculations of all the estimation values are finished, and then the processing proceeds to step S216. If it is determined the value of i is not 24, then the processing loop from step S204 to step S215 is repeatedly carried out until the value of i reaches 24.

A processing in step S216 is that for determining whether or not the count-down value $D_{cnt}$ is the largest among the count values. The processing in step S216 will be described by using an example shown in FIG. 20. FIG. 20 is a table showing a state of the respective estimation values and the respective up/down informations stored in the RAM 66. As shown in FIG. 20, the microcomputer 64 stores in the RAM 66 the respective estimation values and the respective up/down informations set in connection with the former so that these values and informations should correspond to the position $X_k$ to which the lens is moved.

When the lens is located at the position $X_k$, if the processing loop from step S204 to step S215 is repeatedly carried out, then the count-up value $U_{cnt}$, the count-down value $D_{cnt}$ and the flat-count value $F_{cnt}$ are as follows.

$$U_{cnt}=W_1+W_2+W_4+W_5+W_8+W_9+W_{11}+W_{14}+W_{15}+W_{16}+W_{19}+W_{23}$$

$$D_{cnt}=W_7+W_{10}+W_{17}+W_{18}+W_{20}+W_{21}+W_{24}$$

$$F_{cnt}=W_3+W_6+W_{12}+W_{13}+W_{22}$$

If the values of the weight data $W_i$ shown in FIG. 7 by way of example are substituted for the above count-up value $U_{cnt}$, the above count-down value $D_{cnt}$ and the above flat count value $F_{cnt}$, then the following results are obtained.

$U_{cnt}=95$ $D_{cnt}=34$ $F_{cnt}=31$

Specifically, although a value is increased, decreased or not changed depending upon each of the values, it is possible to judge in consideration of all the estimation values that the estimation value is increased.

An estimation value obtained by a synthetic judgement thus made in step S216 will hereinafter be referred to as "a total estimation value". Therefore, in other words, the processing in step S216 can be expressed as that for determining whether or not the total estimation value is decreased.

It will be described how to judge estimation values generated when the lens is located at the position $X_{k+1}$ as shown in FIG. 20. When the lens is located at the position $X_{k+1}$, if the processing loop from step S204 to step S215 is repeatedly carried out, then the count-up value $U_{cnt}$ the count-down value $D_{cnt}$ and the flat-count value $F_{cnt}$ are as follows.

$$U_{cnt}=W_5+W_{11}+W_{12}+W_{17}+W_{18}+W_{20}+W_{23}$$

$$D_{cnt}=W_1+W_2+W_3+W_6+W_7+W_8+W_{10}+W_{13}+W_{14}+W_{15}+W_{16}+W_{19}+W_{21}+W_{22}+W_{24}$$

$$F_{cnt}=W_4+W_9$$

If the values of the weight data $W_i$ shown in FIG. 7 by way of example are substituted for the above count-up value $U_{cnt}$, the above count-down value $D_{cnt}$ and the above flat count value $F_{cnt}$, then the following results are obtained.

$U_{cnt}=29$ $D_{cnt}=113$ $F_{cnt}=18$

Specifically, study of the above results can lead to determination that the total estimation value is decreased. If it is determined in step S216 that the total estimation value is decreased, then the processing proceeds to step S217.

In step S217, the value of j is incremented, and then t he processing proceeds to step S218. Th is value of j is a value indicative of how many times the determination result in step S216 is continuously YES, i.e., how many times the total estimation value is continuously decreased.

Assuming that the first lens position where the total estimation value starts continuously decreasing is the position $X_{k+1}$, it is determined in step S218 whet her or not the lens movement distance ($X_{k+j}$ from the position $X_k$ is larger than D×n. An equation actually used for the determination is expressed by $$\Delta X \times j \geq D \times n \quad (218)$$

where D depicts a focal depth of the focus lens and n depicts a previously set coefficient. Study of experimental results reveals that when the value of n is set within the range of $1 \leq n \leq 10$, the autofocus operation at an optimum speed can be realized.

Figure 21:
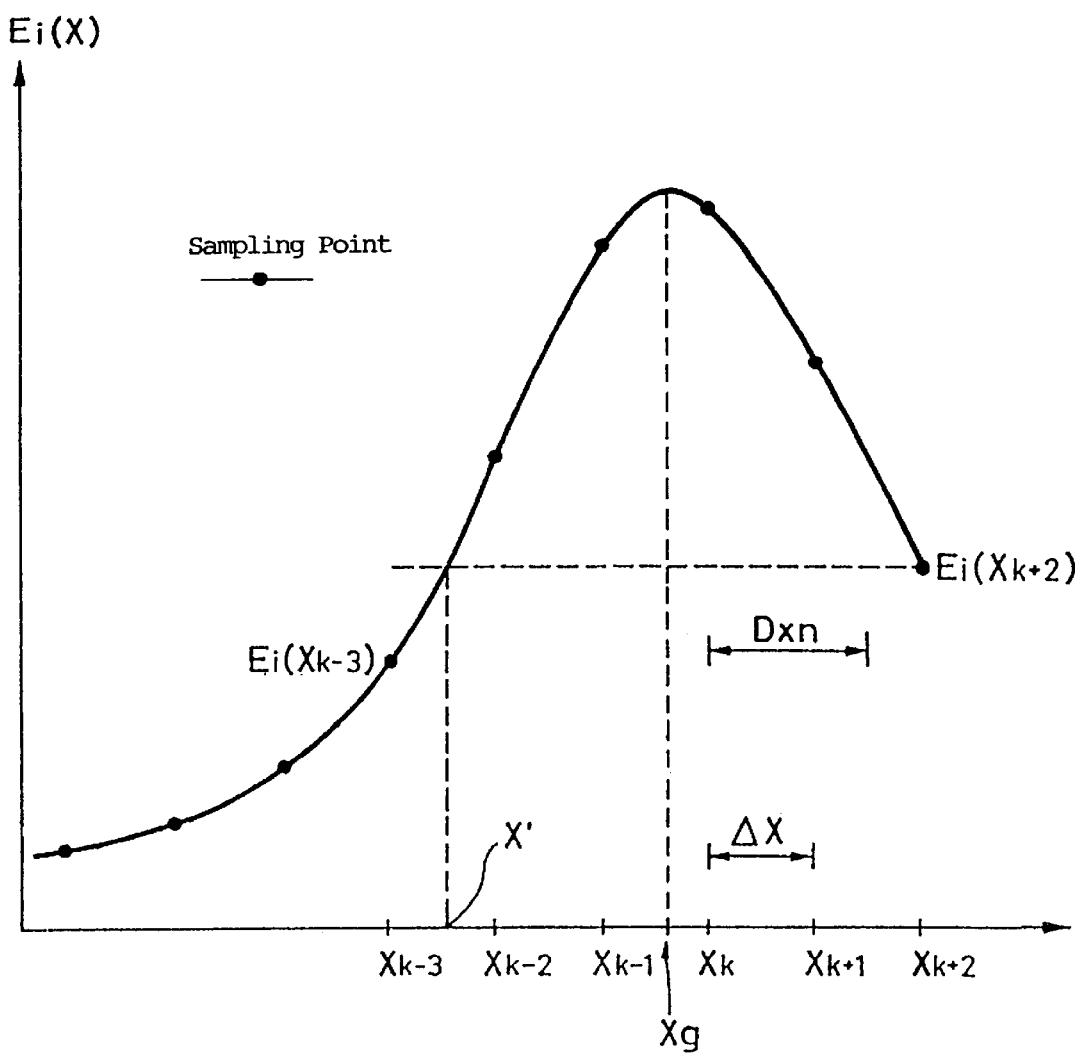
FIG. 21 is a graph showing change of the estimation values obtained upon the autofocus operation.

A determination carried out in step S218 will be described with reference to FIG. 21. An abscissa of a graph shown in FIG. 21 represents a lens position X, and an ordinate thereof represents an estimation value E(X) corresponding to the lens position.

When j=1 is established, the total estimation value is that obtained at the lens position where the total estimation value is decreased first time, and hence the lens position corresponding to j=1 is the lens position $X_{k+1}$. Therefore, a right side (ΔX×j) of the equation (218) represents the distance between the lens position $X_k$ located immediately before the total estimation value has been decreased and the first lens position $X_{k+1}$ where the total estimation value starts decreasing first. Therefore, study of FIG. 21 reveals that the result of determination in step S218 is NO when j=1 is established.

When j=2 is established, the total estimation value is that obtained at the lens position where the total estimation value has been decreased continuously twice, and hence the lens position corresponding to j=2 is the lens position $X_{k+2}$. Therefore, as shown in FIG. 21, a right side (ΔX×j) of the equation (218) represents the distance between the lens position $X_k$ located immediately before the total estimation value has been decreased and the lens position $X_{k+2}$ where the total estimation value has been decreased continuously twice. Therefore, study of FIG. 21 reveals that the result of determination in step S218 is NO when j=2 is established.

If on the other hand it is determined in step S216 that the count-down value $D_{cnt}$ does not have the largest value, then it is determined that the total estimation value is not decreased, and then the processing proceeds to step S219.

In step S219, the value of i is set to j=0. This processing is that for resetting the value of j. The reason for resetting the value of j is that j is the value indicative of how many times the total estimation value has been decreased continuously. Moreover, since the fact that the processing reaches step S219 means that it is determined in step S216 that the total estimation value is not decreased, the continuous decrease of the total estimation value is stopped at the time of determination in step S216. Accordingly, in step S219, the value of j is reset.

Since the value of j is reset when the continuous decrease of the total estimation value is stopped, even if a certain estimation value $E(X_k)$ has a maximum value produced simply by a noise, then the value of j is reset in the processing loop for the estimation values $E(X_{k+1})$ or $E(X_{k+2})$ or $E(X_{k+3})$ and hence the estimation value $E(X_k)$ is prevented from being estimated as the largest value.

In step S220, the value of k is incremented in order to further move the focus lens. Then, the processing returns to step S201.

If the result of the determination in step S218 is YES, then the processing proceeds to step S221. In step S221, a lens position $X_g$ where the estimation value becomes maximum is calculated by interpolation. In the following description, the position Xg is defined as a just focus position. This calculation for interpolation is a barycentric calculation.

$$Xg = \frac{\int_{X\,start}^{X\,end} E(X) \cdot X \cdot dX}{\int_{X\,start}^{X\,end} E(X) dX} \quad (10)$$

The reason for calculation the just focus position Xg by the barycentric calculation is that even if there is any noise, the noise seldom influences a calculation result of the focus position and that unlike it is unnecessary to determine a shape of an estimation value curve E(X) as a method of least squares requires (since the number of shapes of the objects is infinite, the estimation value curve E(X) can not be modeled by using the estimation value curve E(X).).

X start and X end in the above equation depicts a start position and an end position of an integration range. X depicts a lens position, and E(X) depicts an estimation value obtained when the focus lens is located at the lens position X.

This barycentric calculation (the calculation according to the equation (10)) permits the lens position where the estimation value becomes maximum to be calculated even if the lens position Xg where the estimation value becomes maximum and the sample point of the estimation value are not overlapped each other.

The integration range must be properly set to increase the accuracy of the barycentric calculation according to the equation (10).

A method of setting the integration range start position Xstart and end position Xend of the equation (10) will be described with reference to FIG. 21 which shows an example of the estimation value curve. In the example shown in FIG. 21, it is determined in step S218 that when the focus lens is moved to a position $X_{K+2}$, an estimation value $E(X_K)$ sampled at the lens position $X_k$ two fields before is the maximum value among all the sampled estimation values. In this embodiment, a focus lens position $X_{K+2}$ obtained when the maximum sampled estimation value is determined is employed as the end position Xend of the integration range in the equation (10). As shown in FIG. 21, it is assumed that a focus lens position corresponding to an estimation value having the same value of the estimation value $E(X_{K+2})$ sampled at the integration end position $X_{K+2}$ and located on the opposite side of the integration end position $X_{K+2}$ relative to the lens position $X_K$ where the maximum sampled estimation value $E(X_K)$ in the estimation value curve is selected is X'. In this embodiment, it is assumed that the focus lens position X' is the integration range start position Xstart in the equation (10). Specifically, the integration range in the equation (10) ranges from the lens position X' to the lens position $X_{K+2}$.

However, since the sampled estimation values are not continuous values in the X-axis direction (in the lens movement direction) but discrete values obtained at every field, a continuous integration calculated in accordance with the equation (10) cannot be carried out. Therefore, the values between adjacent sampling points are calculated for interpolation.

In this embodiment, a discrete calculation is carried out in accordance with the following equation (11) to carry out a high-accuracy interpolation calculation.

$$Xg = \frac{\sum_{X=Xstart}^{Xend} E(X) \cdot X \cdot \Delta X}{\sum_{X=Xstart}^{Xend} E(X) \cdot \Delta X} \quad (11)$$

If the lens position X' obtained as the integration start position Xstart is agreed with any of the sampled lens positions ($X_0$ to $X_{K-1}$), then the agreed lens position is employed as the integration start position in the equation (11). If on the other hand the lens position X' obtained as the integration start position Xstart is not agreed with any of the sampled lens positions, then a lens position in which an estimation value is smaller than $E(X_{K+2})$ and which is closest to the lens position X' is selected from the sampled lens positions ($X_0$ to $X_{K-1}$) stored in the RAM 66. In the example shown in FIG. 21, a lens position $X_{K-3}$ in which an estimation value is smaller than $E(X_{K+2})$ and which is closest to the lens position X' is selected as the integration start position Xstart. Therefore, the integration range in the equation (11) is a range from the lens position $X_{K-3}$ to the lens position $X_{K+2}$.

Since it is sufficient to obtain a position close to the lens position X' as the integration start position Xstart, the present invention is not limited to this embodiment.

In this case, although the integration range is not balanced relative to the maximum estimation value Xg, practically such unbalance does not influence the calculation accuracy so much because of the following reasons.

① If the movement speed of the focus lens is large in the vicinity of the peak (maximum) estimation value, then the estimation value $E(X_{K-3})$ is sufficiently small as compared with a peak of an ordinary estimation value and hence does not contribute to the integration calculation largely. Therefore, such unbalance does not influence the calculation accuracy of the just focus position Xg so much.

② If the movement speed of the focus lens is small in the vicinity of the peak (maximum) estimation value, then the estimation value $E(X_{K-3})$ contributes to the integration calculation largely. However, since an interval between an estimation value (data) and an estimation value (data) is small, the calculation accuracy of the just focus position Xg is improved, which cancels the lowering of the calculation accuracy resulting from the above large contribution of the estimation value to the integration calculation.

An estimation value used in the interpolation calculation expressed in the equation (11) will be described. The estimation value used in the interpolation calculation is the estimation value selected from the twenty-four estimation values $E_1$ to $E_{24}$ generated by the horizontal-direction estimation value generating circuit 62 and the vertical-direction estimation value generating circuit 63. Specifically, of the estimation values having an estimation value curve and increased and decreased in the curve as the total estimation value, the estimation value having the largest weight data Wi is selected.

This selection will be described with reference to the examples shown in FIGS. 20 and 21. When the lens position is the lens positions $X_{K-3}$, $X_{K-2}$, $X_{K-1}$ and $X_K$, it is determined in step S216 that the total estimation value is increased. When the lens position is the lens positions $X_{K+1}$ and $X_{K+2}$, it is determined in step S216 that the total estimation value is decreased. The estimation values, similarly to the total estimation value, increased when the lens position is the lens positions $X_{K-3}$, $X_{K-2}$, $X_{K-1}$ and $X_K$ and decreased when the lens position is the lens positions $X_{K+1}$ and $X_{K+2}$ are the estimation values $E_1$, $E_2$, $E_{14}$, and $E_{16}$ in the example shown in FIG. 20. Study of the relationship between the estimation value E and the weight data Wi shown in FIG. 7 reveals that the values of the weight data $W_1$, $W_2$, $W_{14}$, and $W_{16}$ set for these selected estimation values $E_1$, $E_2$, $E_{14}$, and $E_{16}$ are 20, 15, 5 and 3, respectively. Since the estimation value having the largest weight data Wi is the estimation value $E_1$, the barycentric calculation is carried out in accordance with the equation (11) by using the $E_1(X_{K-3})$, $E_1(X_{K-2})$, $E_1(X_{K-1})$, $E_1(X_K)$, $E_1(X_{K+1})$ and $E_1(X_{K+2})$. Thus, the lens position Xg where the estimation value becomes maximum is obtained with high accuracy. The barycentric calculation for interpolation allows the lens position Xg to be calculated with high accuracy even if the sample point is not the lens position Xg as shown in FIG. 21.

Since the lens position Xg where the estimation value becomes maximum is approximate to a position at which an area obtained by the integration of the above integration range can be divided into two equal halves, the position at which the area can be divided into two equal halves may be employed as the lens position Xg. Since the lens position Xg where the estimation value becomes maximum is approximate to a middle point of the above integration range, the middle point position may be employed as the lens position Xg.

While in the above embodiment the calculation according to the equation (11) is carried out by using only one estimation value selected from the twenty-four estimation values selected from the estimation value generating circuits, a plurality of estimation values selected from the twenty-four estimation values may be weighed by adding the weight data thereto, the weighed data being employed as the estimation value for use in the equation (11).

When the maximum estimation value $Eg(X_K)$ is defined, the lower-limit estimation value corresponding thereto is defined as $Eg(X_{K+1})$. The maximum estimation value $Eg(X_K)$ is updated at every field even after the lens is fixed on the lens position $X_K$ to focus the focus lens, while the lower-limit estimation value is fixed to $Eg(X_{K+1})$.

In step S222, the microcomputer 64 supplies the control signal to the CPU 4 so that the focus lens should be moved to this lens position Xg.

In step S223, it is determined whether or not a command to track the object is issued to the CPU 4. The command to track the object is a command to control a tilt/pan operation of the video camera to track the movement of the object and also to change a position of the estimation value detection window used for the autofocus operation of the video camera. For example, this track command is issued to the CPU 4 when the camera man presses a track command button provided in the operation unit 5. If the track command is supplied from the operation unit 5, then the processing proceeds to step S300. If on the other hand the track command is not supplied, then the processing proceeds to step S224.

In step S224, it is determined whether or not a command to stop the autofocus operation is issued. If the camera man operates a button to cancel the autofocus mode, then the processing proceeds to step S225, wherein the mode is shifted to the manual focus mode.

If it is determined in step S224 that the command to stop the autofocus mode is not issued, then the processing proceeds to step S226, wherein the maximum estimation value $E_g(X_k)$ and the lower limit estimation value $E_g(X_{k+1})$ are compared. If the value of the maximum estimation value $E_g(X_k)$ becomes smaller than the lower limit estimation value $E_g(X_{k+1})$ due to change of an object or the like, then the processing proceeds to step S227, wherein the autofocus mode is restarted. When the autofocus mode is restarted, the processing returns to step S100 again.

An operation of recognizing a set object will be described with reference to FIG. 16 which is a flowchart therefor starting from step S300. The flowchart therefor starting from step S300 shows a processing carried out by the CPU 4. The processing will be described also with reference to an example shown in FIG. 22 for a comprehensive description of the flowchart.

Figure 22:
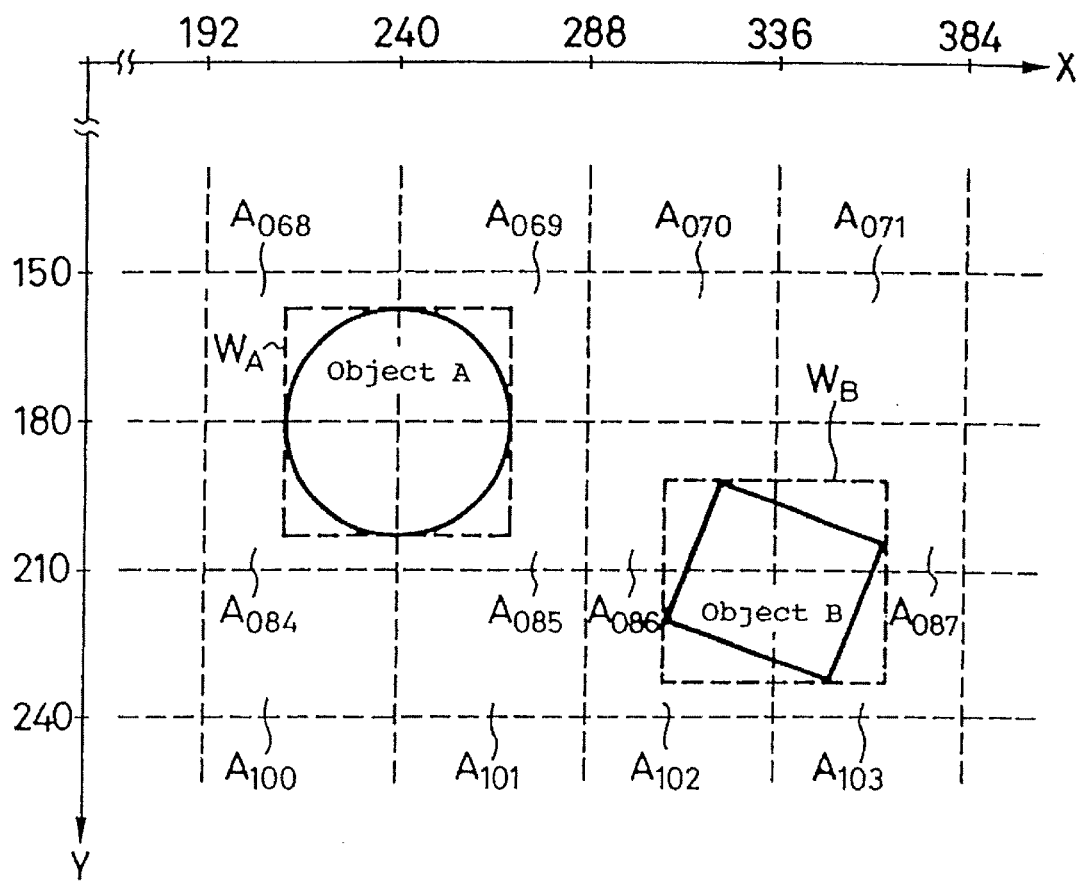
FIG. 22 is diagram showing a state of image pickup of an object A and an object B having the same color.

FIG. 22 shows a state in which a round object A and a rectangular object B are imaged. It is assumed that in this example both of the object A and the object B have the same color as that of the set target object. As shown in FIG. 22, with reference to a raster scan start point (at an uppermost left position of the picture screen) as an origin, a horizontal scanning direction and a vertical scanning direction are respectively defined as an X-axis direction and a Y-axis direction. Therefore, coordinates of the raster scan start point, of a raster scan end point and of the center of the picture screen are respectively set as (0,0), (768,240) and (384,120).

Figure 16:
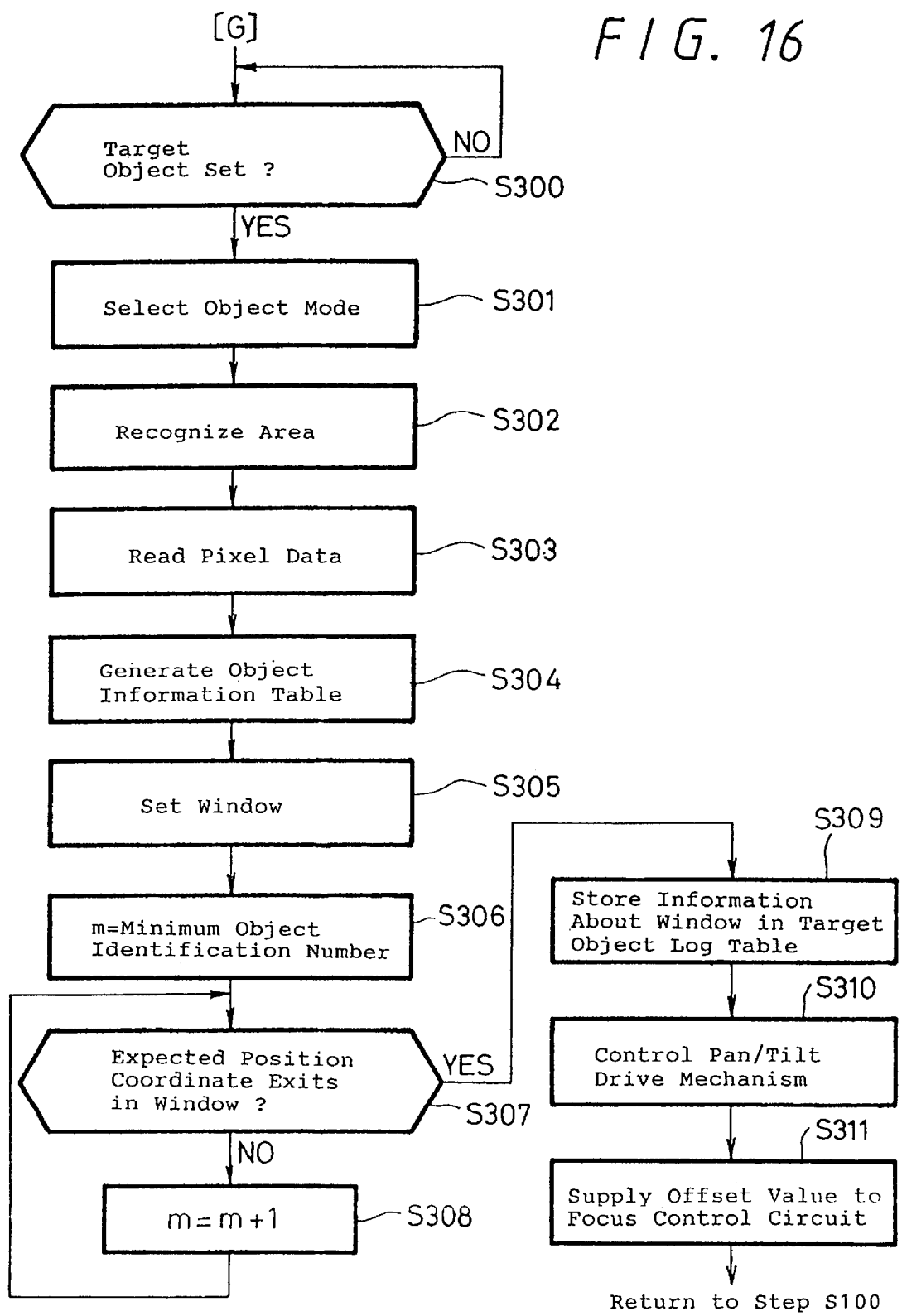
FIG. 16 is a flowchart used to explain an operation of determining a target object.

In step S223, if the CPU 4 receives the automatic track command from the operation unit 5, then the processing proceeds to step S300 in the flowchart shown in FIG. 16.

In step S300, it is determined whether or not the object to be a target object is set by the camera man's operation of the operation unit 5. A method of setting the object to be the target object will be described. The camera man carries out an image pickup so that a desired object to be the target object should be positioned at the center of the picture screen. When the camera man presses a target object confirmation button provided in the operation unit 5 in a state in which the target object is located at the center of the picture screen, the CPU 4 recognizes the object located at the center of the picture screen as the desired target object which the cameraman sets, and stores a color information about this object in a RAM 4a. The method of setting the target object is not limited to the above method and may be that of setting an object having a predetermined color (e.g., a flesh color or the like) as the target object. After the color information of the object set as the target object is stored in the RAM 4a in step S300, the processing proceeds to step S301.

In step S301, the CPU 4 selects the object mode most suitable for the target object set in step S300 from the four object modes (modes 0, 1, 2, 3) which have been described above. The CPU 4 controls the switching operations of the switch circuits 72a, 72b, 72c and 72d in response to the selected object mode.

When in step S301 the CPU 4 selects the object mode and controls the switching operations of the switch circuits 72a, 72b, 72c and 72d, the area detecting circuit 38 detects an area where the pixel data indicating the same color component as the of the object set as the target object exists. An important point of the present invention lies in that this detection processing is not a processing carried out by the CPU 4 but a processing carried out by the area detecting circuit 38 provided as a hardware circuit. In other words, since the area detecting circuit 38 is formed of a hardware circuit as described above, it is possible to determine satisfaction of the conditions with respect to all the pixel data from the encoder 37 on a real time base. Since the operation of the area detecting circuit has been described with reference to FIG. 9, it will not be described again.

In step S302, the CPU 4 recognizes, based on the signal indicative of the number of the chip circuit and supplied from the area detecting circuit 38, in which area the pixel data indicative of the same color as that of the target object exists. Thus, the CPU 4 can select only the area where the data indicative of the same color of that of the object set as the target object exists. In the example shown in FIG. 22, eight areas $A_{068}$, $A_{069}$, $A_{084}$, $A_{085}$, $A_{086}$, $A_{087}$, $A_{102}$ and $A_{103}$ are selected as the area having the same color as that of the target object.

In step S303, the CPU 4 reads out all the pixel data of the area selected in step S302 from the frame memory 39 in an order of the raster scan. At this time, any of the pixel data of the areas which have not been selected in step S302 are not read out therefrom. Since the same address is supplied to the frame memory 39, each of the pixel data formed of Y data, (R−Y) data and (B−Y) data is read out therefrom. In the example shown in FIG. 22, only the pixel data of the eight areas $A_{068}$, $A_{069}$, $A_{084}$, $A_{085}$, $A_{086}$, $A_{087}$, $A_{102}$ and $A_{103}$ are read out from the frame memory 39 by the CPU 4. At this time, any of the pixel data of the areas other than the eight selected areas are not read out from the frame memory 39. Since the CPU 4 determines the areas including the pixel data to be read out from the frame memory 39 based on the detected result of the area detecting circuit 38 as described above, it is possible to reduce the pixel data amount which the CPU 4 receives from the frame memory 39. Therefore, the CPU 4 processes all the pixel data supplied from the frame memory 39 on a real time base.

In step S304, when the mode 0 is selected as the object mode, based on the read pixel data formed of the Y data, the (R−Y) data and the (B−Y) data, the CPU 4 determines whether or not the conditions shown in equation (700) are satisfied. when the mode 1 is selected as the object mode, the CPU determines whether or not the conditions shown in equation (701) are satisfied. When the mode 2 is selected as the object mode, the CPU determines whether or not the conditions shown in equation (702) are satisfied. When the mode 3 is selected as the object mode, the CPU determines whether or not the conditions shown in equation (703) are satisfied. When the CPU 4 carries out calculation for determining whether or not the conditions shown in the equation (700), (701), (702) or (703) are satisfied, the luminance signal Y, the color difference signal |R−Y| and the color difference signal |B−Y| defined in the equations (700), (701), (702) and (703) are signals read out from the frame memory 39. Each of programs for determining whether or not the conditions shown in the equation (700), (701), (702) or (703) are satisfied is previously stored in the RAM 4a.

If the all the pixel data stored in the frame memory 39 are subjected to the above processing of determining whether or not the conditions are satisfied, then the processing must be carried out many times, which prevents the processing of determining whether or not the conditions are satisfied from being carried out on a real time base. However, according to this embodiment, since only the pixel data of the selected area are subjected to the above the processing of determining whether or not the conditions are satisfied, it is possible for the CPU 4 to carry out the processing of determining whether or not the conditions are satisfied on a real time base.

Therefore, the CPU 4 obtains a result of determination whether or not each of the pixel data of the selected area satisfies the conditions defined by the equation (700), (701), (702) or (703). The result that the pixel data satisfy the conditions defined by the equation (700), (701), (702) or (703) means that the color indicated by the pixel data is similar to the color of the object set as the target object.

Further, in step S304, the CPU 4 generates an object information table, which will be described later on, while carrying out the above processing of determining whether or not the conditions are satisfied and stores the same in the RAM 4a. In the object information table, there are recorded a coordinate information indicating on which line and from and to which pixel positions the color of the object set as the target exits and an object identification number indicating which number is allocated to the object having the same color as the color of the target object.

The object information table will be further described in detail with reference to FIG. 23. FIG. 23 shows an object information table obtained from the example shown in FIG. 22. A line position indicates, with a Y-axis coordinate, on which lines where an object having the same color as that of the target object exists. A start pixel position indicates, with an X-axis coordinate, a coordinate of the first pixel data of the object having the same color as that of the target object. An end pixel position indicates, with an X-axis coordinate, a coordinate of the last pixel data of the object having the same color as that of the target object. An object identification number is a number indicating which number the object recognized as the object having the same color as that of the target object has.

For example, since the object A shown in FIG. 22 exists in an area ranging from the 245th pixel to the 246th pixel of the 161st line, as shown in FIG. 23, data "161", "245", "246" are respectively stored as the line number, the start pixel position and the end pixel position in the object information table, and further the data "1" is stored as the object identification number indicative of the object A therein. Data of the rest of the object existing from the 162th line to the 190th line are stored similarly to the above data, and hence need not to be described. Since the object A exists on the 191st line within the range from the 221th pixel to 319th pixel and the object B exists between the 318th pixel to the 319th pixel as shown in FIG. 23, data "191", "221", "258" and "1" as information indicative of the object A are respectively stored as the line number, the start pixel position, the end pixel position and the object identification number in the object information table as shown in FIG. 23. Further, data "191", "318", "319" and "2" as information indicative of the object B are respectively stored as the line number, the start pixel position, the end pixel position and the object identification number in the object information table.

In step S305, a window of a minimum size for surrounding the object having the same color as that of the target object is set. In the example shown in FIG. 22, a window $W_A$ defined within the range of $216 \leq X \leq 273$ and $161 \leq Y \leq 202$ is set as the minimum window for surrounding the object A, and a window $W_B$ defined within the range of $309 \leq X \leq 358$ and $191 \leq Y \leq 231$ is set as the minimum window for surrounding the object B.

In step S306, a value of m is initially set to a minimum number among the object identification numbers stored in the object information table. However, the symbol m is only a variable having any value of the minimum object identification number to the maximum object identification number stored in the object information table.

In step S307, it is determined based on a window center vector stored in a target object log table described later on whether or not an expected position coordinate exists within an mth window set in step S305. This determination is carried out to determine which the target object is, the object A or the object B.

The target object log table will be described with reference to FIG. 24. FIG. 24 is a table showing an example of the target object log table. Information about a coordinate position of an object determined as the target object at every field is stored in this target object log table. A field number is a temporarily allocated number which is reset at every 30th field and also a sequential number successively allocated in every field. A window X coordinate is a data indicating the X-axis direction range of the window set in step S305 with an X-axis coordinate. A window Y coordinate is a data indicating the Y-axis direction range of the window set in step S305 with a Y-axis coordinate. The window center vector ($\Delta X$, $\Delta Y$) is a vector indicating in which direction and how much the center position of the window set in step S305 is displaced from the center position (X=384, Y=120) of the picture obtained by the image pickup.

For example, the example of the target object log table shown in FIG. 24 shows that at the time shown by the filed number 17 the window area set for the target object is defined by $312 \leq X \leq 362$ and $186 \leq Y \leq 228$. The example also shows that the center position of the window is displaced from the center position of the picture obtained by the image pickup in the direction and distance indicated by the window center vector (−47, +87). The window X-axis coordinates, the window Y-axis coordinates and the window center vectors generated at the times indicated by the filed numbers 18 and 19 are shown on the target object log table similarly to those as described above and hence need not to be described.

The data of window center vectors stored at the field number 17, the field number 18 and the field number 19 will be considered. Any considerable difference is not found among these values of the data indicated by these three window center vectors. This results not from the fact that the target object is not moved but from the fact that the window center vector indicates a movement vector of the target object relative to the position thereof at the previous field. In this embodiment, the CPU 4 controls the pan/tilt drive mechanism 16 so that the center position of the window indicating the moving target object should be located at the center of the picture obtained by the image pickup. Therefore, since the window center vector is defined as the vector indicative of the direction and distance of displacement from the center of the picture obtained by the image pickup, the window center vector indicates the movement vector of the target object relative to the position thereof at the previous field.

The processing in step S307 will be described again with reference to the above-mentioned target object log table. In step S307, it is determined whether or not the expected position coordinate exists in the first window $W_A$ ($216 \leq X \leq 273$, $161 \leq Y \leq 202$) corresponding to the object A. The expected position coordinate is a position coordinate obtained from the window center vector at the previous field stored in the above target object log table. For example, since the window center vector ($\Delta X_{19}$, $\Delta Y_{19}$) set at the time indicated by field number 19 is a vector (−49, +89), it is possible to expect that the window center vector obtained at the time indicated by the field number 20 will be substantially equal to the vector (−49, +89). Therefore, since the window center vector stored in the target object log table indicates displacement amount of the coordinates relative to the picture center coordinates (384, 120) and the direction of the displacement thereof, the center position coordinate of the window set for the target object at the time indicated by the field number 20 can be considered as (335, 209). This center position coordinate of the window is the expected position coordinate.

Specifically, it is determined in step S307 that the expected position coordinate (335, 209) obtained from the target object log table does not exist in the window $W_A$ defined as the minimum window for surrounding the object A within the range of $216 \leq X \leq 273$ and $161 \leq Y \leq 202$. Therefore, the CPU 4 determines that the object A is not the set target object, and the processing proceeds to step S308.

In step S308, the value of m is incremented, and then the processing returns to step S307 again.

Returning to step S307 again, it is determined therein whether or not the expected position coordinate (335, 209) exists in the window $W_B$ defined as the minimum window for surrounding the object B within the range of $309 \leq X \leq 358$ and $191 \leq Y \leq 231$. In this step, since the expected position coordinate (335, 209) exists in the window $W_B$, the CPU 4 determines that the object B is the set target object, and then the processing proceeds to step S309.

In step S309, the CPU 4 stores the coordinates of the window $W_B$ defined within the range of $309 \leq X \leq 358$ and $191 \leq Y \leq 231$ as a window X-axis coordinate and a window Y-axis coordinate in an area, indicated by the field number 20, of the target object log table of the RAM 4a. The CPU 4 calculates a center coordinate of the window $W_B$ from the coordinates of the window $W_B$ and stores a center coordinate of this window as the window center vector in the RAM 4a. In the above example, the vector (−52, +91) is stored therein as the window center vector.

In step S310, based on the window center vector newly stored in step S309, the CPU 4 controls the tilt/pan drive mechanism 16 so that the center of the window $W_2$ should be agreed with the center of the picture. Specifically, based on the window center vector, the CPU 4 supplies the control signal to the motor drive circuit 16b.

In step S311, based on the window center vector, the CPU 4 supplies an offset value to the estimation value generating circuit 62 of the focus control circuit 34. The offset value is an offset value supplied to each of the counters respectively provided in the window pulse generating circuits 625, 635 shown in FIGS. 3 and 4. When the offset values are not supplied to the counters of the window pulse generating circuits 625 and 635, as shown in FIGS. 6A and 6B, each of the center coordinates of the windows W1 to W11 is agreed with the center coordinate of the picture obtained by image pickup. However, when the offset values are respectively supplied to the counters of the window pulse generating circuits 625 and 635 from the CPU 4, the count values of the respective counters are changed based on the offset values. Therefore, the center coordinates of the windows W1 to W11 are changed based on the offset values. If in step S311 the offset values are supplied to the focus control circuit 34, then the processing returns to step S100.

The present invention achieves the following effects. Initially, since a plurality of estimation values can be obtained by combination of a plurality of filter coefficients and a plurality of window sizes, it is possible to handle various objects.

Since the weight data are allocated to the estimation value generating circuits and hence the total estimation value can be obtained based on the plurality of estimation values and the weight data respectively corresponding to the estimation values, the accuracy of the estimation value finally obtained is improved. As the accuracy of the estimation value is improved, the estimation-value curve describes a smooth parabola around the focus point, which allows high speed determination of the maximum estimation value. Therefore, the autofocus operation itself can be carried out at high speed.

Since the estimation values determined as the improper estimation values when the total estimation value is calculated are selected from the plurality of estimation values and the selected estimation values are not used for the determination of the total estimation value, the accuracy of the estimation values is further improved. For example, if the proper estimation value cannot be obtained with a small window, then the lens is focused on an object by using the estimation value corresponding to a window larger than the above small window. Therefore, it is possible to focus the lens on some object, which prevents the autofocus operation from being continued for a long period of time.

Moreover, when the lens movement direction is determined in order to focus the lens on an object, a plurality of changed estimation values are estimated by employing decision by majority thereof and the weight data. Therefore, it is possible to precisely determine the focus direction by employing the sampling points of small number and a fine movement in the focal depth of the lens.

When it is determined whether or not the maximum point of the estimation value represents the maximum estimation value, the lens is moved from the maximum point by a distance which is predetermined times as long as the focal depth. As a result, even if the hill of the estimation values is flat, it is possible to determine whether or not the maximum point represents the maximum estimation value when the lens is moved by a predetermined distance. Therefore, there can be obtained the effect in which the focus point can be determined at high speed. For example, it is possible to avoid output of an image which becomes considerably blurred and strange because the lens becomes considerably out of focus when it is determined whether or not the maximum point represents the maximum estimation value.

When the maximum estimation value obtained when the lens is located at the focus point is calculated, the estimation value satisfying that the up/down state of the total estimation value and the up/down information stored in the RAM 66 are agreed with each other and having the largest weight data is selected as the maximum estimation value. Therefore, it is possible to achieve the effect in which the precise value of the maximum estimation value can be obtained.

According to this embodiment, since the just focus position Xg is calculated by barycentric calculation, for example, based on a plurality of selected estimation values and the lens positions corresponding to the plurality of selected estimation values, even if the estimation value includes a noise or the estimation value constantly includes a noise when the luminance is low, it is possible to calculate the just focus position Xg and hence it is possible to carry out the focus control with high accuracy.

Since the just focus position Xg is calculated by barycentric calculation, for example, if the focus lens is passed by the just focus position at least once, then it is possible to calculate the just focus position. Therefore, it is possible to determine the just focus position at high speed to that extent.

Since the area detecting circuit 38 selects the area where the pixel data indicative of the same color of that of the target object exists and carries out the processing of determining only whether or not the pixel data of the selected area satisfies the conditions, it is possible to detect the position of the target object without the processing load on the CPU 4.

Since the object mode is set in response to the color of the set target object and the calculation of the area detecting circuit 38 for determining whether or not the conditions are satisfied and the calculation of the CPU 4 for determining whether or not the conditions are satisfied are changed in response to the set object mode, it is possible to precisely recognize the object regardless of the color of the set object.

Since all the processings of the area detecting circuit 38 for determining whether or not the conditions are satisfied are carried out by the hardware circuit, it is possible to carry out the processing for determining whether or not each of the pixel data supplied from the encoder 37 satisfies the conditions, on a real time base.

Since the object information table including a positional information of each object and the target object log table including information about a movement log of the target object are generated even if a plurality of objects have the same colors as that of the target object, it is possible to precisely recognize the target object.

Since the position to which the target object is moved is calculated and the offset values obtained based on the position are supplied to the window pulse generating circuits, the center coordinates of the respective windows W1 to W11 are changed so as to correspond to the target object. Therefore, even if the target object is moved, then it is possible to precisely set the windows for the moved target object, which allows the precise estimation values with respect to the moved target object to be obtained. As a result, it is possible to carry out the autofocus control with high accuracy.

What is claimed is:

1. A focus control apparatus having an imaging means for imaging an object through a focus lens to output an electric signal corresponding to said object, said focus control apparatus comprising;

extracting means for extracting a high-frequency component of the electric signal output from said imaging means;

estimation value generating means for generating an estimation value indicative of a focus state of said object based on said high-frequency component output from said extracting means;

storage means for storing a number of sets of estimation values a number of focus lens positions in which each set has a plurality of estimation values and in which the estimation values of each respective set have the same focus lens position;

selecting means for selecting a set of estimation values from the number of sets of said estimation values stored in said storage means such that the selected plurality of estimation values at the same focus lens position have a difference therebetween less than one of a predetermined value and a predetermined percentage of one of the estimation values; and control means for calculating a just focus position based on the plurality of estimation values selected by said selecting means and the lens position or positions corresponding to said plurality of selected estimation values.

2. In a focus control apparatus as claimed in claim 1, said focus control apparatus, characterized in that said estimation value generating means generates said estimation value at a predetermined time interval.

3. In a focus control apparatus as claimed in claim 2, said focus control apparatus, characterized in that when said focus lens is moved to said just focus position, said focus lens is passed by said just focus position once.

4. In a focus control apparatus as claimed in claim 2, said focus control apparatus, characterized in that said selecting means selects estimation values at a start position and an end position from the estimation values stored in said storage means, and said just focus position is obtained by calculation of a range of said focus corresponding to said estimation value at the start position based on a value indicative of said focus lens position and said estimation value corresponding to said focus lens position.

5. In a focus control apparatus as claimed in claim 4, said focus control apparatus, characterized in that said calculation is a calculation of a barycenter of said range.

6. In a focus control apparatus as claimed in claim 4, said focus control apparatus, characterized in that said calculation is to divide an area obtained by integration of said range into two substantially equal halves.

7. In a focus control apparatus as claimed in claim 4, said focus control apparatus, characterized in that said calculation is to obtain a substantial middle point of said range.

8. In a focus control apparatus as claimed in claim 4, said focus control apparatus, characterized in that when said selecting means reads out a plurality of estimation values stored in said storage means and said estimation values are continuously decreased times of a predetermined number, said selecting means selects a last estimation value of the estimation values continuously decreased times of a predetermined number as the estimation value of the end position.

9. In a focus control apparatus as claimed in claim 8,
said focus control apparatus, characterized in that said selecting means selects as said estimation value at the start position an estimation value substantially equal to said estimation value at the end position and located on the opposite side of a hill of said estimation values with respect to said estimation value at the end position.

10. In a focus control apparatus as claimed in claim 8,
said focus control apparatus, characterized in that said selecting means selects as said estimation value at the start position an estimation value which is located on the opposite side of a hill of said estimation values with respect to said estimation value at the end position and which is substantially equal to said estimation value at the end position or an estimation value closest to and smaller than said estimation value at the end position.

11. A focus control method of moving a focus lens of a video camera to a just focus position, said focus control method comprising;
   a) a step of extracting a high-frequency component of an electric signal output from an imaging means;
   b) a step of generating an estimation value indicative of a focus state of an object based on said high-frequency component extracted in said step a;
   c) a step of storing a number of sets of estimation values for a number of focus lens positions in which each set has a plurality of estimation values and in which the estimation values of each respective set have the same focus lens position;
   d) a step of selecting a set of estimation values from the number of sets of said estimation values stored in step c such that the selected plurality of estimation values at the same focus lens position have a difference therebetween less than one of a predetermined value and a predetermined percentage of one of the estimation values;
   e) a step of calculating the just focus position based on the plurality of estimation values selected in said step d and the lens position or positions corresponding to said plurality of selected estimation values; and
   f) a step of moving said focus lens to said just focus position.

12. In a focus control method as claimed in claim 11,
said focus control method, characterized in that in said step b), said estimation value is generated at a predetermined time interval.

13. In a focus control method as claimed in claim 12,
said focus control method, characterized in that in said step c), when a plurality of said estimation values are stored in response to said focus lens position, said focus lens is passed by said just focus position once.

14. In a focus control method as claimed in claim 12,
said focus control method, characterized in that in said step d), estimation values at a start position and an end position are selected from the estimation values stored in said step c), and in said step e), said just focus position is obtained by calculation of a range from said focus lens position corresponding to said estimation value at the start position selected in said step d) to said focus lens position corresponding to said estimation value at the end position selected in said step d) based on a value indicative of said focus lens position and said estimation value corresponding to said focus lens position.

15. In a focus control method as claimed in claim 14,
said focus control method, characterized in that in said step e), a barycenter of said range is calculated.

16. In a focus control method as claimed in claim 14,
said focus control method, characterized in that in said step e), an area obtained by integration of said range is divided into two substantially equal halves.

17. In a focus control method as claimed in claim 14,
said focus control method, characterized in that in said step e), a substantial middle point of said range is calculated.

18. In a focus control method as claimed in claim 14,
said focus control method, characterized in that in said step d), when a plurality of estimation values stored in said step c) are read out and said estimation values are continuously decreased times of a predetermined number, a last estimation value of the estimation values continuously decreased times of a predetermined number is selected as the estimation value of the end position.

19. In a focus control method as claimed in claim 18,
said focus control method, characterized in that in said step d), an estimation value substantially equal to said estimation value at the end position and located on the opposite side of a hill of said estimation values with respect to said estimation value at the end position is selected as said estimation value at the start position.

20. A focus control apparatus for controlling a focus of a video camera, comprising;
   estimation value generating means for generating an estimation value indicative of a focus state of an object by extracting a high-frequency component of an image pickup signal output from an imaging means as a focus lens is moved; and
   control means for detecting a focus lens position where the estimation values generated by said estimation value generating means becomes maximum and calculating a just focus position by interpolation based on a plurality of estimation values generated when a focus lens is located at a lens position in the vicinity of said detected focus lens position, wherein said plurality of estimation values at the same focus lens position have a difference therebetween less than one of a predetermined value and a predetermined percentage of one of the estimation values.

21. In a focus control apparatus as claimed in claim 20,
said focus control apparatus, characterized in that said control means comprises a storage means for storing the estimation values generated by said estimation value generating means so that said estimation values should correspond to lens positions of the focus lens which is continuously moved.

22. In a focus control apparatus as claimed in claim 21,
said focus control apparatus, characterized in that said control means calculate said just focus position by barycentric calculation based on said plurality of estimation values and said plurality of lens positions corresponding to said plurality of estimation values.

23. In a focus control apparatus as claimed in claim 21,
said focus control apparatus, characterized in that said just focus position is calculated in accordance with $$Xg = \frac{\int E(X) \cdot X \cdot dX}{\int E(X) dX}$$

where Xg depicts said just focus position, X depicts a lens position in the vicinity of the focus lens position where an estimation value becomes maximum, and E(X) depicts an estimation value obtained when a focus lens is located at a lens position X.

24. In a focus control apparatus as claimed in claim 21, said focus control apparatus, characterized in that said control means further comprises a selecting means for selecting a plurality of estimation values to be used for calculation of said just focus position by interpolation from a plurality of estimation values stored in said storage means.

25. In a focus control apparatus as claimed in claim 24, said focus control apparatus, characterized in that when said focus lens is moved within a predetermined field from a first lens position where the estimation value generated by said estimation values generating means become maximum to a second lens position, if the estimation values generated by said estimation value generating means are continuously decreased, then said control means determines that the estimation value generated when said focus lens is located at the first lens position as the maximum estimation value among the estimation values generated by said estimation value generating means.

26. In a focus control apparatus as claimed in claim 25, said focus control apparatus, characterized in that said selecting means selects estimation values generated while said focus lens is moved to said second lens position from a third lens position located such that said first lens position is located between said second lens position and it.

27. In a focus control apparatus as claimed in claim 25, said focus control apparatus, characterized in that said selecting means selects estimation values generated while said focus lens is moved to said second lens position from a third lens position which is a lens position where an estimation value having a level substantially equal to a level of a second estimation value generated when said focus lens is located at said second lens position and which is located such that said first lens position is located between said second lens position and it.

28. In a focus control apparatus as claimed in claim 27, said focus control apparatus, characterized in that said just focus position is calculated in accordance with $$Xg = \frac{\sum_{X_3}^{X_2} E(X) \cdot X \cdot \Delta X}{\sum_{X=X_3}^{X_2} E(X) \cdot \Delta X}$$

where Xg depicts said just focus position, $X_2$ depicts the second lens position, $X_3$ depicts the third lens position, and $\Delta X$ depicts a distance by which the lens is moved in one field.

29. In a focus control apparatus as claimed in claim 28, said focus control apparatus, characterized in that said estimation value generating means is formed of a plurality of estimation value generating circuits respectively having different conditions for generating said estimation values, and said control means determines fluctuations of a plurality of estimation values obtained from said plurality of estimation value generating circuits to thereby obtain said first lens position.

30. In a focus control apparatus as claimed in claim 27, said focus control apparatus, characterized in that said estimation value generating means is formed of a plurality of estimation value generating circuits respectively having different conditions for generating said estimation values, and said control means determines fluctuations of a plurality of estimation values by utilizing weight coefficients respectively corresponding to said plurality of estimation values obtained from said plurality of estimation value generating circuits.

31. In a focus control apparatus as claimed in claim 30, said focus control apparatus, characterized in that a condition of generating estimation values set for said plurality of estimation value generating means is determined based on a condition for determining a filter characteristic for extracting a high-frequency component of said video signal and on a condition for determining a size of a detection window for said video signal.

32. In a focus control apparatus as claimed in claim 30, said focus control apparatus, characterized in that said control means carries out a lens movement direction discriminating processing for discriminating a direction in which said estimation value is increased when said focus lens is moved forward or backward by a distance ranging within a focal depth of said focus lens, and then carries out a lens position detecting processing for detecting said first lens position while said focus lens is being moved in said discriminated direction.

33. In a focus control apparatus as claimed in claim 32, said focus control apparatus, characterized in that said lens movement direction discriminating processing is carried out by determining a focus lens movement direction based on a plurality of estimation values obtained when the focus lens is located at an initial lens position where it is to be located initially, a plurality of estimation values obtained when the focus lens is located at a first movement position located away from said initial lens position by a predetermined distance in a direction toward an object, and a plurality of estimation values obtained when the focus lens is located at a second movement position located away from said initial lens position by a predetermined distance in a direction toward an imaging device.

34. In a focus control apparatus as claimed in claim 33, said focus control apparatus, characterized in that said predetermined distance is equal to or shorter than the focal depth of said focus lens.

35. In a focus control apparatus as claimed in claim 34, said focus control apparatus, characterized in that said control means further comprises an estimation value determining means for comparing a first estimation value obtained from the estimation value generating circuit having a first detection window and a second estimation value obtained from the estimation value generating circuit having a second detection window with a size larger than that of the first detection window to thereby determine whether or not said first estimation value is a proper estimation value indicative of a focus degree with respect to a desired object.

36. In a focus control apparatus as claimed in claim 20, said focus control apparatus, characterized in that said control means discriminates a direction in which said estimation value is increased when said focus lens is moved forward and backward by a distance which does not exceed a focal depth, and then controls said estimation value generating means to continuously generate an estimation value at every field while said focus lens is being moved at a speed at which it moves by a distance longer than said focal depth within one field.

37. In a focus control apparatus as claimed in claim 30, said focus control apparatus, characterized in that said control means discriminates, by totally determining a plurality of estimation values from said plurality of estimation value generating circuits, a direction in which said estimation value is increased when said focus lens is moved forward and backward by a distance which does not exceed a focal depth, and then controls said plurality of estimation value generating circuits to continuously generate an estimation value at every field while said focus lens is being moved at a speed at which it moves by a distance longer than said focal depth within one field in a discriminated direction, whereby said first focus position is detected by totally judging fluctuations of a plurality of estimation values from said plurality of estimation value generating circuits at every field.

38. A focus control method of controlling a focus of a video camera, said focus control method comprising;
 a) a step of generating an estimation value by extracting a high-frequency component of an image pickup signal output from an imaging means at every field as a focus lens is moved;
 b) a step of detecting a lens position where the maximum estimation value among the estimation values generated in said step a is generated;
 c) a step of calculating a just focus position where the estimation value becomes maximum by interpolation based on a plurality of estimation values generated where the focus lens is located at a lens position in the vicinity of said detected lens position, wherein said plurality of estimation values at the same focus lens position have a difference therebetween less than one of a predetermined value and a predetermined percentage of one of the estimation values; and
 d) a step of moving said focus lens to said just focus position.

* * * * *